US010924775B2

(12) United States Patent
Lo et al.

(10) Patent No.: US 10,924,775 B2
(45) Date of Patent: Feb. 16, 2021

(54) UPLINK AND DOWNLINK METHODS FOR EFFICIENT OPERATION OF LIVE UPLINK STREAMING SERVICES

(71) Applicant: QUALCOMM Incorporated, San Diego, CA (US)

(72) Inventors: Charles Nung Lo, San Diego, CA (US); Nikolai Konrad Leung, San Francisco, CA (US); Carlos Marcelo Dias Pazos, Carlsbad, CA (US); Ralph Akram Gholmieh, San Diego, CA (US); Min Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/441,909

(22) Filed: Jun. 14, 2019

(65) Prior Publication Data
US 2019/0394498 A1 Dec. 26, 2019

Related U.S. Application Data

(60) Provisional application No. 62/689,904, filed on Jun. 26, 2018, provisional application No. 62/722,847, filed on Aug. 25, 2018.

(51) Int. Cl.
*H04N 7/173* (2011.01)
*H04N 21/2187* (2011.01)
(Continued)

(52) U.S. Cl.
CPC ..... *H04N 21/2187* (2013.01); *H04N 21/2183* (2013.01); *H04N 21/236* (2013.01); *H04N 21/2402* (2013.01)

(58) Field of Classification Search
None
See application file for complete search history.

(56) References Cited

U.S. PATENT DOCUMENTS

2003/0093790 A1* 5/2003 Logan ............... G06F 16/739
725/38
2007/0277205 A1* 11/2007 Grannan ........... H04N 21/4667
725/80

(Continued)

FOREIGN PATENT DOCUMENTS

WO 2009093252 A1 7/2009

OTHER PUBLICATIONS

International Search Report and Written Opinion—PCT/US2019/037450—ISA/EPO—dated Sep. 20, 2019, 14 pages.

*Primary Examiner* — William J Kim
(74) *Attorney, Agent, or Firm* — The Marbury Law Group, PLLC

(57) ABSTRACT

Systems, methods, and devices of the various aspects enable uplink delivery and downlink distribution of media content to users in live uplink streaming services. In various embodiments, media in a live uplink streaming service may be distributed by unicast and/or broadcast delivery methods. Various embodiments may include receiving, in a processor of a live uplink streaming sink computing device, assistance data for a live streaming session, selecting, by the processor, one or more delivery methods for processed media of the live streaming session based at least in part on the assistance data, and transmitting, by the processor, the processed media using the selected delivery methods.

38 Claims, 23 Drawing Sheets

(51) Int. Cl.
  *H04N 21/2183* (2011.01)
  *H04N 21/236* (2011.01)
  *H04N 21/24* (2011.01)

(56) References Cited

U.S. PATENT DOCUMENTS

| | | | |
|---|---|---|---|
| 2008/0059884 A1* | 3/2008 | Ellis | H04N 21/25891 |
| | | | 715/721 |
| 2008/0229379 A1* | 9/2008 | Akhter | H04N 21/2393 |
| | | | 725/139 |
| 2008/0307453 A1* | 12/2008 | Haberman | H04N 21/25866 |
| | | | 725/32 |
| 2009/0025027 A1* | 1/2009 | Craner | H04N 21/6543 |
| | | | 725/32 |
| 2009/0031384 A1* | 1/2009 | Brooks | H04N 21/2405 |
| | | | 725/127 |
| 2009/0133086 A1* | 5/2009 | Trimper | H04N 21/47202 |
| | | | 725/116 |
| 2009/0150917 A1* | 6/2009 | Huffman | H04H 60/31 |
| | | | 725/9 |
| 2009/0150943 A1* | 6/2009 | Vasudevan | H04N 21/2385 |
| | | | 725/86 |
| 2009/0165064 A1* | 6/2009 | Gong | H04N 21/6405 |
| | | | 725/93 |
| 2010/0218231 A1* | 8/2010 | Frink | H04N 1/23439 |
| | | | 725/118 |
| 2013/0294321 A1 | 11/2013 | Wang et al. | |
| 2014/0259051 A1* | 9/2014 | Strein | H04N 21/4882 |
| | | | 725/32 |
| 2014/0372624 A1 | 12/2014 | Wang et al. | |
| 2016/0007052 A1 | 1/2016 | Haitsuka et al. | |

* cited by examiner

UPLINK AND DOWNLINK METHODS FOR EFFICIENT OPERATION OF LIVE UPLINK STREAMING SERVICES

RELATED APPLICATIONS

This application claims the benefit of priority to U.S. Provisional Application No. 62/689,904, entitled "Uplink And Downlink Methods For Efficient Operation Of Live Uplink Streaming Services" filed Jun. 26, 2018 and U.S. Provisional Application No. 62/722,847, entitled "Uplink And Downlink Methods For Efficient Operation Of Live Uplink Streaming Services" filed Aug. 25, 2018, the entire contents of both of which are hereby incorporated by reference for all purposes.

BACKGROUND

Live uplink streaming (LUS) services can be provided as Over-The-Top (OTT) services. In live uplink streaming services, users, via their computing devices, can stream media content, such as video content, audio content, etc., to a network server associated with the live uplink streaming service. In live uplink streaming services, the streamed (or uploaded) content is in turn made available for viewing by other users via their respective computing devices. Both uplink and downlink network capacity can support upstream delivery and/or downlink distribution of media content in LUS services.

SUMMARY

The systems, methods, and computing devices of the various aspects enable uplink delivery and downlink distribution of media content to users in live uplink streaming services.

In an aspect, a live uplink streaming sink computing device may perform operations including receiving assistance data for a live streaming session, selecting one or more delivery methods for processed media of the live streaming session based at least in part on the assistance data, and transmitting the processed media using the selected one or more delivery methods.

In an aspect, a live uplink streaming source computing device may perform operations including caching encoded media content for a live uplink media stream, determining whether a viewership indication for the live uplink media stream is sufficient for distribution, and transmitting the cached encoded media content to a live uplink streaming sink computing device in response to determining that the viewership indication the live uplink media stream is sufficient for distribution.

In an aspect, a live uplink streaming source computing device may perform operations including determining whether a viewership indication for a live uplink media stream is sufficient for distribution, encoding media content for the live uplink media stream at a first quality level in response to determining that the viewership indication for the live uplink media stream is not sufficient for distribution, and encoding media content for the live uplink media stream at a second quality level in response to determining that the viewership indication for the live uplink media stream is sufficient for distribution.

In an aspect, a live uplink streaming source computing device may perform operations including determining whether a viewership indication for the live uplink media stream is sufficient for distribution, transmitting encoded media content for the live uplink media stream at a first bit rate to a live uplink streaming sink computing device in response to determining that the viewership indication for the live uplink media stream is not sufficient for distribution, and transmitting encoded media content for the live uplink media stream at a second bit rate to the live uplink streaming sink computing device in response to determining that the viewership indication for the live uplink media stream is sufficient for distribution.

In an aspect, a live uplink streaming source computing device may perform operations including encoding media content for a live uplink media stream at a first quality level and a second quality level.

In an aspect, a live uplink streaming sink computing device may perform operations including determining whether assistance data indicates one or more viewers for a live streaming session, and transmitting a viewership indication to a live uplink streaming sink computing device associated with the live streaming session in response to determining that the assistance data indicates one or more viewers for the live streaming session.

In an aspect, a live uplink streaming sink computing device may perform operations including receiving first quality level encoded media from a live uplink streaming source computing device associated with a live streaming session, processing the first quality level encoded media according to one or more determined session attributes for the live streaming session, receiving second quality level encoded media from a live uplink streaming source computing device associated with a live streaming session, and processing the second quality level encoded media according to one or more determined session attributes for the live streaming session.

In an aspect, a live uplink streaming viewing computing device may perform operations including transmitting assistance data for a live streaming session, receiving processed media of the live streaming session from a live uplink streaming sink computing device, and displaying the processed media of the live streaming session.

In an aspect, a live uplink streaming sink computing device may perform operations including monitoring one or more conditions associated with live streaming, determining whether a condition for controlling uplink behavior is occurring, and generating a requested action message in response to determining that the condition for controlling uplink behavior is occurring.

In an aspect, a live uplink streaming source computing device may perform operations including receiving a requested action message, determining whether a reason indicated in the requested action message supports taking an action indicated in the requested action message, and implementing one or more changes in one or more uplink associated behaviors according to the action in response to determining that the reason indicated in the action message supports taking the action indicated in the requested action message.

In an aspect, a live uplink streaming source computing device may perform operations including monitoring one or more conditions associated with live streaming, determining whether the one or more conditions support changing one or more uplink associated behaviors, and determining one or more changes in one or more uplink associated behaviors based at least in part on the one or more conditions in response to determining that the one or more conditions support changing one or more uplink associated behaviors.

Further aspects include a computing device having a processor configured with processor-executable instructions to perform operations of the methods summarized above. Further aspects include a computing device including means for performing functions of the methods summarized above. Further aspects include a non-transitory processor-readable storage medium having stored thereon processor-executable instructions configured to cause a computing device processor to perform operations of the methods summarized above. Further aspects include a server configured with processor executable instructions to perform operations of the methods summarized above. Further aspects include a server including means for performing functions of the methods summarized above. Further aspects include a non-transitory processor-readable storage medium having stored thereon processor-executable instructions configured to cause a server processor to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various aspects.

DETAILED DESCRIPTION

Figure 1:
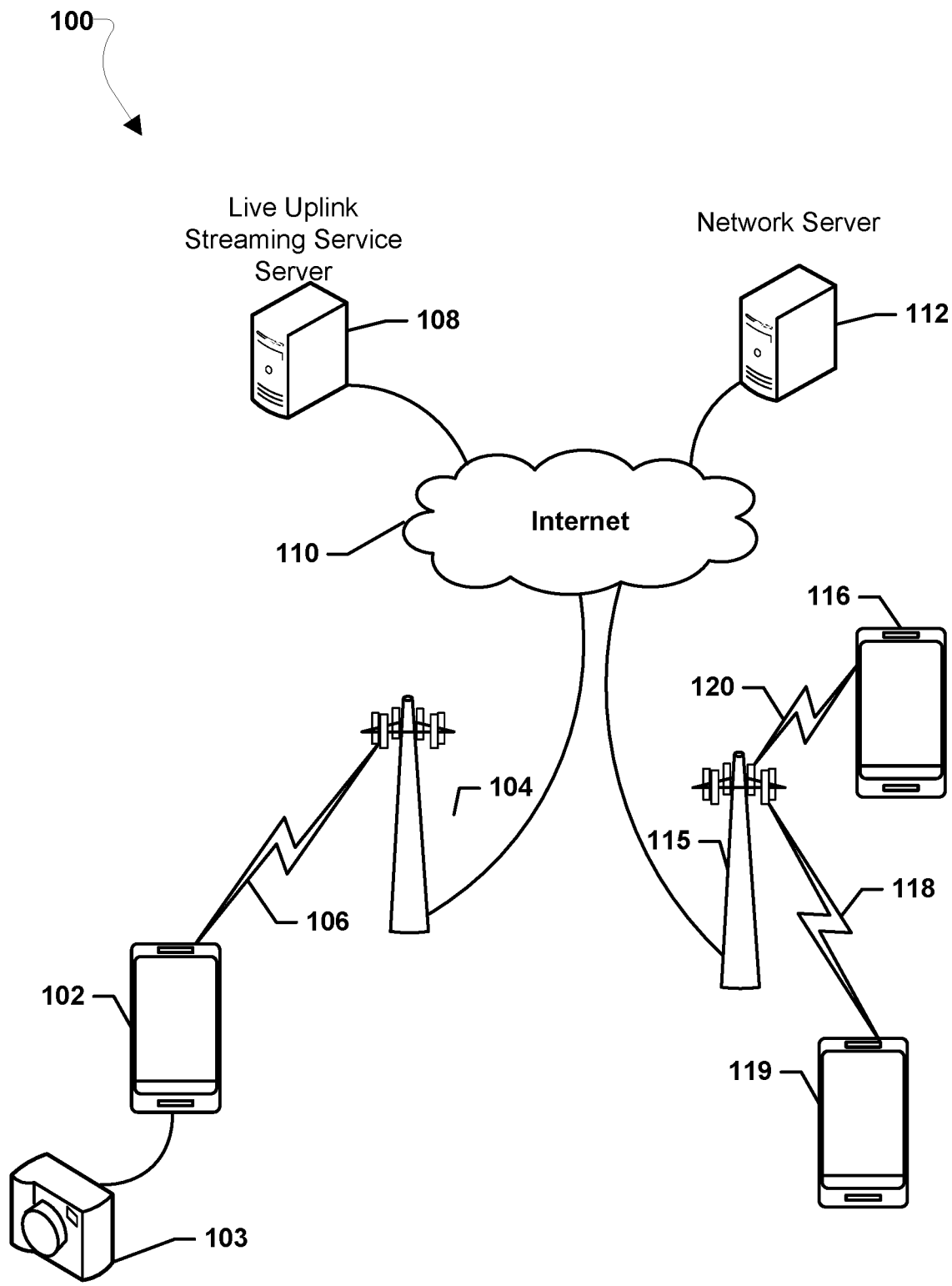
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the terms "mobile device", "receiver device", and "computing device" are used interchangeably herein to refer to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players (such as, ROKU™ or CHROMECAST™ or FIRE TV™), smart televisions, digital video recorders (DVRs), smart thermostats, voice activated assistants, smart appliances, in-vehicle systems, cameras, and similar electronic devices which include a programmable processor and memory and circuitry for receiving files.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

Live uplink streaming (LUS) services, such as Facebook Live, YouTube Live, Twitch, Periscope, Instagram Live, etc., may be provided as Over-The-Top (OTT) services. In live uplink streaming services, users, via their computing devices, may stream media content, such as video content, audio content, etc., to a network server associated with the live uplink streaming service. The computing devices streaming (or uploading) the media content to the server may be referred to herein as "live uplink streaming source computing devices." The servers receiving the streamed (or uploaded) media content may be referred to herein as "live uplink streaming sink computing devices." The media content may be ad-hoc/informally produced content and/or may be professionally generated. In live uplink streaming services, the streamed (or uploaded) content is in turn made available for viewing by other users via their respective computing devices by the live uplink streaming sink computing devices. These other user computing devices viewing the streamed (or uploaded) content may be referred to herein as "live uplink streaming viewing computing devices." The streamed (or uploaded) content may be made available from the live uplink streaming sink computing devices with low end-to-end latency to simulate a live video sharing experience and other users may be able to additionally engage with the viewed content via their respective live uplink streaming viewing computing devices by indicating likes, submit comments, sharing the video, etc.

The $3^{rd}$ Generation Partnership Project (3GPP) Release-15 (Rel-15) Framework for Live Uplink Streaming (FLUS) work item defines support for mobile operator provided live uplink streaming services. In the network architecture associated with FLUS, the live uplink streaming source computing device may employ different Hypertext Transfer Protocol (HTTP) based and/or Internet Protocol (IP) Multimedia Subsystem (IMS) multimedia telephony technology based streaming technologies to send content to a live uplink streaming sink computing device. Such streaming technologies may include Real-Time Messaging Protocol (RTMP), Moving Pictures Expert Group (MPEG) Dynamic Adaptive Streaming over HTTP (DASH) (MPEGDASH), Common Media Application Format (CMAF), HTTP Live Streaming (HLS), MPEG Media Transport Protocol (MMTP), User Datagram Protocol (UDP), Multimedia Telephony Services for IMS (MTSI), etc. In the network architecture associated with FLUS, the live uplink streaming sink computing device may perform processing of the incoming media data received from the live uplink streaming source computing device before transmitting the content to live uplink streaming viewing computing devices. Processing performed on the received media data by the live uplink streaming sink computing device may include transcoding, media re-formatting, media combining, applying codecs, changing codec profiles or levels, changing resolution, changing frame rates, changing bitrates, media stitching, mixing, and/or other type processing. In the network architecture associated with FLUS, the content may be sent from the live uplink streaming source computing device to one or more live uplink streaming viewing computing devices via unicast or broadcast delivery methods. Unicast delivery methods may include unicast transmission using Packet-switched Streaming Service (PSS) transmissions in a PSS network and broadcast delivery methods may include using is a Multimedia Broadcast Multicast Service (MBMS) transmissions in a MBMS network.

The systems, methods, and devices of the various embodiments enable uplink delivery and downlink distribution of media content to users in live uplink streaming services. Various embodiments may enhance the efficiency of one or both of uplink delivery and downlink distribution of media content to users in live uplink streaming services.

On the uplink side of live uplink streaming services, a significant portion of up-streamed content may never actually be watched. Various embodiments may reduce wasteful use of network uplink bandwidth and/or unnecessary charges to data plans associated with live uplink streaming source computing device by leveraging viewership information such that uplink streaming may not occur until a sufficient number of viewers are subscribed to the live uplink streaming session. The word "sufficient" is used herein to refer to a quantity of viewers (referred to as "viewership") that satisfies a criterion or threshold set by a provider of the live uplink streaming services at or above which uploading or distribution of the media content may be uploaded. This criterion or threshold may be any value set by the service provider and may depend on several factors as described below. For example, the criterion or threshold of viewers (i.e., sufficient viewership) may be one viewer. In this manner, all or a portion of the media content may not be uploaded by the live uplink streaming source computing device until the content may actually be viewed. Various embodiments may allocate network-based media processing resources of the live uplink streaming sink computing device, such as during high processing load times. For example, the processing of media streams associated with less-stringent delay requirements, such as those lacking viewership, may be delayed while those media streams with relatively more-stringent delay requirements, such as those having viewers, may not be delayed. Various embodiments may enable live uplink streaming source computing devices to up-stream media content at different bitrates and/or quality of service (QoS) settings as a tradeoff between desired video quality versus latency. In various embodiments, by utilizing network-provided information on actual or predicted viewership, which may include information on viewer interactivity with the viewed content, a live uplink streaming source computing device may choose to defer or delay the actual content uploading, select different grades of service in upstream delivery, and/or perform parallel or sequential content transmission.

On the downlink distribution side, strict use of unicast delivery for the uploaded media content by the uplink streaming source computing device to the uplink streaming viewing computing devices may not make the most efficient use of downlink network capacity in all situations. Various embodiments may leverage input metadata regarding QoS requirements, such as data rate, latency (e.g., end-to-end latency, processing latency, etc.), etc., content popularity information, such as predicated demand, measured demand, etc., location information, such as sender location data, recipient location data, etc., and/or other analytics data, such as estimated audience size based on correlated location and viewership history information, etc., to select between unicast or broadcast delivery methods for providing content from the live uplink streaming sink computing device to the live uplink streaming viewing computing devices. In some embodiments, selection of unicast delivery methods or broadcast delivery methods for distribution of content to live uplink streaming viewing computing devices may be a static selection, such as a selection made at the start of a live uplink streaming session based on pre-configuration of the live uplink streaming sink computing device. In some embodiments, selection of unicast delivery methods or broadcast delivery methods for distribution of content to live uplink streaming viewing computing devices may be a dynamic selection, such as a selection made more than once during a live uplink streaming session. For example, the live uplink streaming sink computing device may switch between unicast and broadcast delivery methods. Switching between unicast and broadcast delivery methods may be done in a manner similar to MBMS operation on Demand (MooD) as defined in 3GPP Technical Specification (TS) 26.346.

In various embodiments, upstream transmission from a live uplink streaming source computing device to a live uplink streaming sink computing device may begin upon live uplink streaming source computing device being aware of viewership sufficient for distribution for media content, such as viewership at or above a minimum threshold (e.g., at least one viewer, more than one viewer, etc.). In various embodiments, a viewership indication may be generated and transmitted from a live uplink streaming sink computing device to a live uplink streaming source computing device. The viewership indication may be a message indicating that one or more live uplink streaming viewing computing devices have subscribed to a live uplink streaming session associated with the live uplink streaming source computing device. As one example, the viewership indication may be a message, such as a control message, indicating that at least one live uplink streaming viewing computing device has subscribed to the live uplink streaming session. The viewership indication may include an attribute indicating the total number of subscribed live uplink streaming viewing computing devices.

In various embodiments, the viewership indication may be generated by the live uplink streaming sink computing device based on received assistance data. Assistance data, (also alternatively referred to as "downlink data") may be data received by the live uplink streaming sink computing device associated with a live uplink streaming service. Assistance data (or downlink data) may include popularity information for the live uplink streaming service and/or one or more live uplink streaming sessions. Assistance data (or downlink data) may include viewership/interaction information for a live uplink streaming session, such as a number of subscribed live uplink streaming viewing computing devices, an indication of an engagement level of subscribed live uplink streaming viewing computing devices, an indication that one or more live uplink streaming viewing computing devices subscribed to a live uplink streaming session, an indication that one or more live uplink streaming viewing computing devices unsubscribed from the live uplink streaming session, etc. Assistance data (or downlink data) may include location information, such as the location data (e.g., latitude and longitude, country, zip code, geographic area, zone, civic location, such as street, block, neighborhood, building, and/or landmark, etc.) of the live uplink streaming source computing device, location data of one or more live uplink streaming viewing computing devices, etc. Assistance data (or downlink data) may include network condition data, such as unicast network load information, error rate, network equipment status, delivery times, end-to-end delay estimates, etc. Assistance data (or downlink data) may include content characteristics, such as perceived reception demand, actual reception demand, viewership history, estimated audience size, estimated audience size based on correlated location and viewership history, etc. Assistance data (or downlink data) may include input metadata regarding QoS requirements for the live uplink streaming service and/or one or more live uplink streaming sessions, such as permissible end-to-end delivery latency, target data rate, target error rate, required data rate, delay settings, network policy information, viewing quality settings, etc. Assistance data (or downlink data) may include application level data from one or more live uplink streaming viewing computing devices. In various embodiments, assistance data (or downlink data) may be received at a live uplink streaming sink computing device from one or more sources. As examples, the source of assistance data (or downlink data) may be a network entity belonging to the same network operator providing the live uplink streaming sink computing device, the source of assistance data (or downlink data) may be a third party application server of a live uplink streaming service provider, and/or the source of assistance data (or downlink data) may be live uplink streaming viewing computing devices. Assistance data (or downlink data) may be sent over various network interfaces. As examples, in the case of 3GPP networks, when the assistance data (or downlink data) originates from a third-party application service provider, such interfaces may be the T8 reference point as defined in 3GPP TS 29.122, the xMB reference point as defined in 3GPP TS 29.116, the N33 reference point as defined in 3GPP TS 23.501, etc.

In various embodiments, a live uplink streaming source computing device may cache captured and encoded media content until there is sufficient viewership, such as at least one viewer. Caching the captured and encoded content may include storing the encoded content in a memory of the live uplink streaming source computing device, such as a transport buffer. Upstream transmission of the cached encoded media from the live uplink streaming source computing device to a live uplink streaming sink computing device may commence immediately upon the live uplink streaming source computing device determining a viewership indication is sufficient for distribution. The live uplink streaming source computing device may transmit the cached encoded media content on a first-in-first-out basis from the memory of the live uplink streaming source computing device, such as the transport buffer, until all the cached encoded media is transmitted. Upon all the cached encoded media being transmitted, further media of the live uplink streaming session may be transmitted to the live uplink streaming sink computing device as the media is encoded without further caching.

In various embodiments, a live uplink streaming source computing device may transmit only an initial portion of media, such as a first few seconds or minutes of streaming content, to a live uplink streaming sink computing device. After the live uplink streaming source computing device transmits the initial portion, the live uplink streaming source computing device may cache the media content. Upstream transmission of the cached encoded media from the live uplink streaming source computing device to a live uplink streaming sink computing device may commence immediately upon the live uplink streaming source computing device determining a viewership indication is sufficient for distribution. In this manner, when a live uplink streaming viewing computing device subscribes to the live uplink streaming session, the initial portion of the media already processed and queued for distribution at the live uplink streaming sink computing device may immediately be transmitted to the live uplink streaming viewing computing device. The live uplink streaming sink computing device may notify the live uplink streaming source computing device of a subscription of a viewer, and the live uplink streaming source computing device may commence transmission of the cached encoded media in response to the subscription of the viewer.

In various embodiments, the live uplink streaming source computing device may begin media up-streaming immediately and continuously at the commencement of a live uplink streaming session. The live uplink streaming source computing device may initially upload the media content using a higher bit rate and may signal the live uplink streaming sink computing device that there is a relaxed latency requirement for the media content while viewership is absent. As examples, the relaxed latency requirement may be a relaxed end-to-end latency requirement, a relaxed processing latency requirement, a relaxed uplink latency requirement, a relaxed downlink latency requirement, etc. In response determining that at least one or more live uplink streaming viewing computing devices are subscribing to the live uplink streaming session, the live uplink streaming source computing device may use a lower bit rate for uploading and may signal the live uplink streaming sink computing device to use a lower latency requirement for the media content. As examples, the lower latency requirement may be a lower end-to-end latency requirement, a lower processing latency requirement, a lower uplink latency requirement, a lower downlink latency requirement, etc. In this manner, the live uplink streaming source computing device may exchange a decrease in uploading bit rate for a lower delay guarantee on delivery of media to live uplink streaming viewing computing devices.

In various embodiments, the live uplink streaming source computing device may begin media up-streaming immediately and continuously at the commencement of a live uplink streaming session. The live uplink streaming source computing device may initially encode the media content using a higher quality level and may signal the live uplink streaming sink computing device that there is a relaxed latency requirement for the media content while viewership is absent. As examples, the relaxed latency requirement may be a relaxed end-to-end latency requirement, a relaxed processing latency requirement, a relaxed uplink latency requirement, a relaxed downlink latency requirement, etc. In response determining that at least one or more live uplink streaming viewing computing devices are subscribing to the live uplink streaming session, the live uplink streaming source computing device may use lower quality level for encoding and may signal the live uplink streaming sink computing device to use a lower latency requirement for the media content. As examples, the lower latency requirement may be a lower end-to-end latency requirement, a lower processing latency requirement, a lower uplink latency requirement, a lower downlink latency requirement, etc. In this manner, the live uplink streaming source computing device may exchange a decrease in quality level of the media content for a lower delay guarantee on delivery of media to live uplink streaming viewing computing devices.

In various embodiments, the live uplink streaming source computing device may begin media up-streaming immediately and continuously at the commencement of a live uplink streaming session. The live uplink streaming source computing device may encode two or more different versions of the media content and may transmit the two or more different versions of the media content separately from one another. In an embodiment, the live uplink streaming source computing device may encode one version of the media content at a higher quality level and another version of the media content at a lower quality level. In an embodiment, the higher quality level encoded content may be cached until the live streaming session is complete, while the lower quality level encoded content may be uploaded to the live uplink streaming sink computing device. In an embodiment, the two or more versions of the encoded content may be sent in parallel to the live uplink streaming sink computing device. For example, the higher quality level encoded content may be transmitted at a lower bit rate to the live uplink streaming sink computing device, while the lower quality level encoded content may be uploaded to the live uplink streaming sink computing device at a higher bit rate. The higher quality level encoded content may be used for higher latency requirement purposes, such as an on-demand video service provided after a live uplink streaming session has completed.

In various embodiments, a live uplink streaming sink computing device may distribute processed media to one or more live uplink streaming viewing computing devices using one or more selected delivery method. In various embodiments, a live uplink streaming sink computing device may include a distribution selection function that may select one or more delivery methods for processed media based at least in part on assistance data. In some embodiments, selection of unicast delivery methods or broadcast delivery methods for distribution of content to live uplink streaming viewing computing devices may be a static selection, such as a selection made at the start of a live uplink streaming session based on pre-configuration of the live uplink streaming sink computing device. In some embodiments, selection of unicast delivery methods or broadcast delivery methods for distribution of content to live uplink streaming viewing computing devices may be a dynamic selection, such as a selection made more than once during a live uplink streaming session. For example, the live uplink streaming sink computing device may switch between unicast and broadcast delivery methods. Switching between unicast and broadcast delivery methods may be done in a manner similar to MBMS operation on Demand (MooD) as defined in 3GPP Technical Specification (TS) 26.346.

In embodiments in which the selection of unicast delivery methods or broadcast delivery methods for distribution of content to live uplink streaming viewing computing devices may be a static selection, the live uplink streaming sink computing device may pre-determine the downlink delivery method based on forecast of the reception demand across different service areas of the media content. Such information may be derived, for example, by using predictive analytics methods based on historical consumption data or statistics, knowledge of the "following" among recipient live uplink streaming viewing computing devices to a particular sender live uplink streaming source computing device by the number of subscriptions to that sender's "channel", and/or other types of data. As one example, for content originating from certain "popular" senders, it may be desirable to always employ broadcast delivery to achieve expected network capacity efficiency gain over unicast distribution, whereas unicast delivery may be used for the distribution of contents uploaded by other less popular senders. Additionally, social feedback from live uplink streaming viewing computing devices in the form of likes, shares and comments may also be representative of content popularity.

In embodiments in which the selection of unicast delivery methods or broadcast delivery methods for distribution of content to live uplink streaming viewing computing devices may be a static selection, the live uplink streaming sink computing device may select the delivery method for a given sender live uplink streaming source computing device in a dynamic manner. For example, the live uplink streaming sink computing device may select the delivery method based on real-time measurement information of consumption by live uplink streaming viewing computing devices in an analogous manner to MooD.

The likelihood that the provider of a third-party live uplink streaming service, such as Facebook Live or YouTube Live, wishes to rely on the mobile operator to handle downlink delivery of user-generated streaming content may be highest for a venue-based event, such as a football game or a rock music concert. In such environments, the third-party provider might expect, or has determined, that one or more of its users will/to be uploading video pertaining to his/her presence at the live event, and furthermore, predicts/knows that a sizeable number of its users will be/are present at the same venue (e.g., stadium or concert arena) with interest in watching such content. Such viewership could be attributed to "buddies" of the sender, or affinity group members (e.g., local followers of a sports team, or fan club members of a music performer) interested in watching user-generated live footage at the venue. In various embodiments, the third-party provider may have established business agreements with the mobile operator such that venue-related uplink media streams collected by the third-party's network server will be routed to the live uplink streaming sink computing device of the mobile operator for downlink delivery over a 3GPP network. The third-party's network server may additionally transmit one or more of the following types of information associated with each content item as assistance data to the live uplink streaming sink computing device of the mobile operator, data on the popularity of the content (measured or predicted), location of the content sender, location of the expected viewers of the content, a latency objective for the downlink delivery (e.g., an end-to-end latency objective, a processing latency objective, an uplink latency objective, a downlink latency objective, etc.), and/or a number of expected viewers who are subscribers of the operator's cellular service. The mobile operator's live uplink streaming sink computing device may use the assistance data to decide whether a given content item should be delivered to the viewers via unicast (e.g., PSS) or broadcast (e.g., MBMS). The configuration of the download delivery method could be performed statically or dynamically based on expected or actual demand. The third-party originated user and control plane data might be carried over the xMB interface. In various embodiments, the live uplink streaming sink computing device may be a network operator broadcast multicast service center (BM-SC). In various embodiments, the live uplink streaming sink computing device of the network operator may choose to employ MBMS delivery to one or more specific geographical areas (for example, inside the stadium/arena of the venue-based event, its immediate surroundings which may include the entire nearby city), etc. In various embodiments, the live uplink streaming sink computing device of the network operator may choose to employ MBMS delivery during one or more time intervals (e.g., present time interval, future time interval, etc.), based on indication (expected or actual) of both live and time-shifted viewing demand for a given uploaded media content item from recipients located in one or more areas.

In various embodiments, the indication of the live uplink media stream to be offered and/or the live uplink streaming session attributes may indicate that the live uplink streaming source computing device is requesting that the live uplink streaming sink computing device store a copy of the processed media content for the live uplink streaming session for distribution to viewers requesting the content after the live uplink streaming session is complete. In such embodiments, the live uplink streaming sink computing device may cache a copy of the media content as it is processed for distribution to viewers after the live streaming session is complete. In this manner, the cached processed media content may be provided at a later time to viewers requesting the content after the completion of the session. For example, the cached processed media content may be provided as video-on-demand content to viewers after the session is completed.

In various embodiments, a live uplink streaming sink computing device may control or guide the transmitting behavior of a live uplink streaming source computing device by generating and transmitting one or more requested action messages. A requested action message may be a type of control message transmitted from a live uplink streaming sink computing device to a live uplink streaming source computing device to control or guide the live uplink streaming source computing device's behavior in transmission of encoded media content. In various embodiments, a requested action message may be a message indicating one or more requested actions for a live uplink streaming source computing device to take and one or more associated reasons for the live uplink streaming sink computing device requesting the live uplink streaming source computing device take the one or more requested actions. Example actions to take may include caching encoded media content at the live uplink streaming source computing device, transmitting encoded media content from the live uplink streaming source computing device, changing a quality level at which media content is encoded at by the live uplink streaming source computing device, changing a transmission bit rate used for transmitting encoded media content by the live uplink streaming source computing device, etc. Example reasons may include network congestion, QoS requirements, viewership absence, viewership presence, current (or expected) engagement presence, availability of excess bandwidth on a non-guaranteed bit rate (non-GBR) bearer, etc.

A requested action and the associated reason for that requested action may be an action/reason pair. In various embodiments, a requested action message may include an indication of an action/reason pair, such as in a message body, in a message header, etc. In various embodiments, the indication of an action/reason pair may be an action and reason code. In various embodiments, the indication of the action/reason pair may be indicated as optional or mandatory in the requested action message. For example, optional action/reason pairs may be identified as assistance type messages. As another example, mandatory messages may be identified as enforcement type messages. In various embodiments, a requested action message may indicate more than one action for a reason, more than one reason for an action, and/or more than one action and more than one reason pairing. In embodiments in which more than one action are indicated in a requested action message, one action may be indicated as mandatory while another action is indicated as optional. In embodiments in which two or more actions are indicated in a requested action message, mandatory actions may be given preference for implementation over optional actions.

In various embodiments, before or during the transmitting of media by a live uplink streaming source computing device, a live uplink streaming sink computing device may determine that a requested action message should be transmitted to control or guide the transmitting behavior of the live uplink streaming source computing device. For example, the live uplink streaming sink computing device may make such a determination by monitoring conditions associated with live streaming. The conditions associated with live streaming may include various conditions that impact live streaming, such as one or more of viewership conditions, interactivity conditions, network conditions, processing conditions, connection conditions, and/or distribution conditions. An example a network condition may be an indication that one or wireless access technologies (e.g., WiFi, 3G, 4G and 5G) are currently available to a computing device, such as a live uplink streaming source computing device, live uplink streaming sink computing device, etc. An example of a connection condition may be the bandwidth/transmission bit-rate available to, or expected delay to be incurred by, a computing device (e.g., a live uplink streaming source device, a live uplink streaming sink computing device, etc.), for transmitting media content. An example of a distribution condition may be an indication of whether the downlink delivery of streaming content, transmitted by the live uplink streaming source device to recipient viewers, employs unicast, multicast, or broadcast technology. The conditions may be monitored at least in part based on assistance data and/or other information received and/or generated by various sources. The live uplink streaming sink computing device may determine whether a condition for controlling uplink behavior is occurring based on the one or more monitored conditions.

In various embodiments, various sources and/or functions of the live uplink streaming sink computing device and/or in communication with the live uplink streaming sink computing device may indicate one or more conditions and the live uplink streaming sink computing device may translate those conditions into action/reason pairs to control and/or guide the sending behavior of a live uplink streaming source computing device. As an example, the live uplink streaming sink computing device may compare the one or more conditions to a table in a memory correlating conditions with requested actions and reasons and in response to determining a match between two conditions the live uplink streaming sink computing device may determine that one or more conditions for controlling and/or guiding the sending behavior of a live uplink streaming source computing device are occurring. In response to determining that one or more conditions for controlling and/or guiding the sending behavior of a live uplink streaming source computing device are occurring, the live uplink streaming sink computing device may generate and transmit a requested action message to the live uplink streaming source computing device. As an example, the requested action message may include an indication of an action/reason pair associated/correlated with the one or more conditions determined to be occurring.

As a specific example, a processing function of a live uplink streaming sink computing device may provide information to a FLUS control function of the live uplink streaming sink computing device that a high media processing load in being experienced. The high media processing load condition may imply that the live uplink streaming sink computing device temporarily cannot handle additional incoming streams and that media streams with non-stringent delay requirements will be de-prioritized for processing. Based on the high media processing load condition, the FLUS control function may generate and transmit a requested action message with an action indication that when no viewer is present the live uplink streaming source computing device should transmit encoded media using a lower transmission bit rate and a reason indication of network congestion.

As another specific example, a distribution function of a live uplink streaming sink computing device may provide information to a FLUS control function of the live uplink streaming sink computing device that a broadcast is to be employed for delivery to live uplink viewing computing devices. Broadcast delivery may imply guaranteed high-quality delivery to recipients. Based on the broadcast delivery condition, the FLUS control function may generate and transmit a requested action message with an action indication to transmit media with a high quality encoding and a high transmission bit rate and a reason indication of guaranteed high quality edge to edge delivery.

As another specific example, a viewership measurement function of a live uplink streaming sink computing device may provide information to a FLUS control function of the live uplink streaming sink computing device that there is an absence of viewers or a presence of viewers. Absence of viewers may imply that it is wasteful for the FLUS source to upload entire video clips. Presence of viewers may imply that uploading is necessary to provide a low-latency "live" experience. Based on an absence of viewers, the FLUS control may generate and transmit a requested action message with an action indication to defer uplink streaming or only upload initial chunks until viewership is present and a reason indication of viewership absence. Based on a presence of viewers, the FLUS control function may generate and transmit a requested action message with an action indication to upload the entire or remaining contents of a cache and a reason indication of viewership presence.

As another specific example, an interactive engagement function of a live uplink streaming sink computing device may provide information to a FLUS control function of the live uplink streaming sink computing device that there is a presence of live engagement and an expectation of non-real time engagement with the content in the future. The presence of live engagement and an expectation of non-real time engagement with the content in the future may imply a requirement for low latency in uploading and edge to edge delivery and a desirability for high quality stored versions for future viewing and engagement. Based on the presence of live engagement and an expectation of non-real time engagement with the content in the future, the FLUS control function may generate and transmit a requested action message with an action indication to upload a lower quality if necessary while requesting low latency edge to edge delivery and in parallel to upload the same content at a high quality by relaxed delay requirement with a reason indication of engagement presence now and expected in the future.

As another specific example, network information may be provided to a FLUS control function that there is an availability of excess non-GBR bandwidth. The excess bandwidth may imply that in the absence of viewers, uploading is possible using a non-GBR bearer. Based on the excess bandwidth, the FLUS control function may generate and transmit a requested action message with an action indication to upload at lower-quality on a non-GBR bearer prior to awareness of active viewership and upload at a higher quality on a GBR bearer when aware of viewership presence with a reason indication of availability of non-GBR bandwidth.

The foregoing specific examples are intended to be non-limiting examples of some combinations and permutations of conditions and translated recommendations that a FLUS control function may identify and make, and are provided merely as examples to better illustrate aspects of the various embodiments, and are not intended to limit the various embodiments in any way. Other combinations and permutations of conditions and translated recommendations may be used with the various embodiments, and the other combinations and permutations of conditions and translated recommendations may be substituted in the various examples.

In various embodiments, the live uplink streaming source computing device may receive the requested action message and may determine whether a reason indicated in the requested action message supports taking an action indicated in the action message. For example, the live uplink streaming source computing device may receive the requested action message and determine whether the reason indicated by the action/reason pair supports taking the action indicated by the action/reason pair. As a specific example, the live uplink streaming source computing device may compare the reason indicated by the action/reason pair to a listing of authorized reasons for changing behavior stored in a memory and a match between the reason indicating by the action/reason pair and a reason in the listing of authorized reasons may indicate the action/reasons pair does support taking the action indicated by the action/reason pair. Example reasons may include network congestion, QoS requirements, viewership absence, viewership presence, current (or expected) engagement presence, availability of excess bandwidth on a non-guaranteed bit rate (non-GBR) bearer, etc.

In response to determining that the reason indicated in the requested action message supports taking the action indicated in the requested action message, the live uplink streaming source computing device may implement one or more changes in one or more uplink associated behaviors according to the action. Example changes in the one or more uplink associated behaviors according to the action the live uplink streaming source computing device may implement may include one or more of caching encoded media, transmitting cached encoded media, changing a quality level of encoding used for media, changing a bit rate of transmission of encoded media, changing a connection attribute used for encoded media, changing a transport technology used for encoded media, etc.

In various embodiments, the live uplink streaming source computing device may monitor one or more conditions associated with live streaming. The live uplink streaming source computing device may combine status information from multiple sources, such as its radio access network, a live uplink streaming sink computing device, a live uplink streaming viewing computing device, the live uplink streaming source computing device itself, etc., to monitor one or more conditions associated with live streaming. The live uplink streaming source computing device may monitor conditions associated with its connections used to upload encoded media to live uplink streaming sink computing devices, such as the type of connection in use, the type of connections available (e.g., Wi-Fi, 3G, 4G, 5G, guaranteed bit rate (GBR), non-guaranteed bit rate (non-GBR), etc.), the cost of a connection, the capacity of a connection, a priority associated with a connection, a capability of a connection, etc. The live uplink streaming source computing device may receive connection data associated with its own connections used to upload encoded media to live uplink streaming sink computing devices. For example, connection data may include cell location information (e.g., cell edge, cell center, etc.), network status information, etc. Additionally, the live uplink streaming source computing device may monitor conditions based on assistance data provided in control messages from a live uplink streaming sink computing device, such as viewership conditions, interactivity conditions, network conditions, processing conditions, and distribution conditions.

In various embodiments, the one or more conditions the live uplink streaming source computing device monitors may be used by the live uplink streaming source computing device to change or modify its uplink behaviors. In various embodiments, the live uplink streaming source computing device may determine whether one or more conditions support changing one or more uplink associated behaviors. In various embodiments, various sources and/or functions of the live uplink streaming source computing device and/or in communication with the live uplink streaming source computing device may indicate one or more conditions and the live uplink streaming source computing device may translate those conditions to change or modify its uplink behaviors. As an example, the live uplink streaming sink computing device may compare the one or more conditions to a table in a memory correlating conditions with changes in uplink behaviors and in response to determining a match between two conditions, the live uplink streaming sink computing device may determine that one or more conditions to change or modify its uplink behaviors are occurring.

In response to determining that one or more conditions support changing one or more uplink associated behaviors, the live uplink streaming source computing device may determine one or more changes in one or more uplink associated behaviors based at least in part on the one or more conditions. For example, based on conditions as monitored or determined by the live uplink source computing device, the live uplink streaming source computing device may modify or change its uplink behavior by implementing changes in one or more behaviors. Non-limiting examples of changes in uplink behavior that a live uplink source computing device may implement include changes in a caching behavior (e.g., start caching, stop caching, cache selected one or more versions or types of media, etc.), changes in an encoding behavior (e.g., use a higher encoding quality, use a lower encoding quality, encode additional versions of a media at additional quality levels, encode less versions of media, etc.), changes in a transmission behavior (e.g., transmit with a higher transmission bit rate, transmit with a lower transmission bit rate, use a non-GBR bearer, use a GBR bearer, etc.), changes in a connection behavior (e.g., use a lower priority connection, use a higher priority connection, us a less costly connection, use a more costly connection, use a higher quality connection, use a lower quality connection, etc.), and changes in a transport behavior (e.g., switch to Wi-Fi, switch to 3G, switch to 4G, switch to 5G, etc.), etc.

As a specific example, the live uplink streaming source computing device monitoring conditions may receive an indication from a live uplink streaming sink computing device of an absence of viewers. and determine from connection data of the live uplink streaming source computing device's radio access network that there is an excess availability of non-GBR bandwidth. Based on the conditions of no viewers and excess available non-GBR bandwidth, the live uplink streaming source computing device may modify its uplink behavior to perform uploading using a non-GBR bearer until viewers arrive, and then change to encoding a higher quality version of the media and transmitting it on a GBR bearer when viewers are indicated.

In various embodiments, the live uplink streaming source computing device may use both reasons in a received requested action message and conditions monitored by the live uplink streaming source computing device to determine whether a reason indicated in the requested action message supports taking an action indicated in the action message. In this manner, the live uplink streaming source computing device may balance conditions as monitored at the live uplink streaming source computing device (e.g., its own radio access network connection status, connection costs, connection capabilities, etc.) with the conditions impacting the uplink streaming service at the live uplink streaming sink computing device (e.g., processing delays, network congestion, etc.)

In response to determining that the monitored conditions and the reason indicated in the requested action message supports taking the action indicated in the requested action message, the live uplink streaming source computing device may implement one or more changes in one or more uplink associated behaviors according to the action. Example changes in the one or more uplink associated behaviors according to the action the live uplink streaming source computing device may implement may include one or more of caching encoded media, transmitting cached encoded media, changing a quality level of encoding used for media, changing a bit rate of transmission of encoded media, changing a connection attribute used for encoded media, changing a transport technology used for encoded media, etc.

In response to determining that the monitored conditions and the reason indicated in the requested action message do not support taking the action indicated in the requested action message, the live uplink streaming source computing device may determine whether the one or more conditions and the reason indicated in the action message support taking an alternative action. An alternative action may be an action different from the action indicated in the requested action message. An alternative action may be an action selected to achieve a same or similar implied goal associated with the reason indicated in the requested action message, but in a different manner than the action indicated in the requested action message. The live uplink streaming source computing device may implement one or more changes in one or more uplink behaviors according to the alternative action. Example changes in the one or more uplink associated behaviors according to the alternative action that the live uplink streaming source computing device may implement may include one or more of caching encoded media, transmitting cached encoded media, changing a quality level of encoding used for media, changing a bit rate of transmission of encoded media, changing a connection attribute used for encoded media, changing a transport technology used for encoded media, etc.

Various examples of different transport protocols, delivery methods, and network architectures are discussed herein, specifically FLUS, HTTP, IMS, RTMP, MPEGDASH, CMAF, HLS, MMTP, UDP, MTSI, PPS, MBMS, 3GPP, etc. The discussions of specifically FLUS, HTTP, IMS, RTMP, MPEGDASH, CMAF, HLS, MMTP, UDP, MTSI, PPS, MBMS, and 3GPP are provided merely as examples to better illustrate the aspects of the various embodiments, and are not intended to limit the various embodiments in any way. Other transport protocols, delivery methods, and network architectures may be used with the various embodiments, and the other transport protocols, delivery methods, and network architectures may be substituted in the various examples.

FIG. 1 illustrates a network system 100 suitable for use with the various embodiments. The network system 100 may include multiple devices, such as one or more live uplink streaming source computing device 102, one or more cellular towers or base stations 104, 115, one or more live uplink streaming sink computing devices 108, 112 connected to the Internet 110, and one or more live uplink streaming viewing computing devices 116, 119. The live uplink streaming source computing device 102 may exchange data via one or more cellular connections 106, including Code Division Multiple Access (CDMA), Time Division Multiple Access (TDMA), Global System for Mobile Communications (GSM), Personal Communication Service (PCS), Third Generation (3G), Fourth Generation (4G), Long Term Evolution (LTE), or any other type connection, with the cellular tower or base station 104. The live uplink streaming viewing computing devices 116, 119 may exchange data via one or more cellular connections 118, 120, including CDMA, TDMA, GSM, PCS, 3G, 4G, LTE, or any other type connection, with the cellular tower or base station 115. Additionally, the live uplink streaming source computing device 102 and the live uplink streaming viewing computing devices 116, 119 may connect to the same cellular tower or base station 104, 115.

The cellular tower or base stations 104, 115 may be in communication with respective routers that may connect to the Internet 110. In this manner, via the connections to the cellular tower or base stations 104, 115, and/or Internet 110, data may be exchanged between the live uplink streaming source computing device 102, the live uplink streaming viewing computing devices 116, 119, and the live uplink streaming sink computing devices 108, 112. In an embodiment, live uplink streaming sink computing device 108 may be a server of a live uplink streaming service provider. In an embodiment, the live uplink streaming sink computing device 112 may be a network server of a network operator, such as a BM-SC server.

The live uplink streaming source computing device 102 may capture media content itself, for example through an on-board camera, microphone, etc., and/or may be connected wired or wirelessly to one or more capture devices 103, such as cameras, microphones, etc., that may capture media content and output that media content to the live uplink streaming source computing device 102. The captured media content may be encoded by the live uplink streaming source computing device 102 and transmitted via the connection to the cellular tower or base station 104 and the Internet 110 to one or both of the live uplink streaming sink computing devices 108, 112. In some embodiments, the live uplink streaming sink computing device 108 may be a server of a live uplink streaming service and may offload the handling of the live uplink streaming service to the live uplink streaming sink computing device 112 that may be a network server, such as a BM-SC, by redirecting the live uplink streaming source computing device 102 to route encoded media content for the live uplink streaming service to the live uplink streaming sink computing device 112. In some embodiments, the live uplink streaming source computing device 102 may be using a live uplink streaming service of the network operating the live uplink streaming sink computing device 112 and the live uplink streaming source computing device 102 may be configured to route encoded media content to the live uplink streaming sink computing device 112 directly.

The live uplink streaming sink computing device 112 may process the encoded media content received from the live uplink streaming source computing device 102 and distribute the processed media content to the live uplink streaming viewing computing devices 116, 119 via the Internet 110 and cellular tower or base station 115. Alternatively, the live uplink streaming sink computing device 112 may elect to directly distribute the encoded media content received from the live uplink streaming source computing device 102, without performing additional media processing, to the live uplink streaming viewing computing devices 116, 119 via the Internet 110 and cellular tower or base station 115. The live uplink streaming viewing computing devices 116, 119 may be subscribed to live uplink streaming sessions of the live uplink streaming service via messaging with one or both of the live uplink streaming sink computing devices 108, 112. Additionally, live uplink streaming viewing computing devices 116, 119 may transmit assistance data to one or both of the live uplink streaming sink computing devices 108, 112.

Figure 2A:
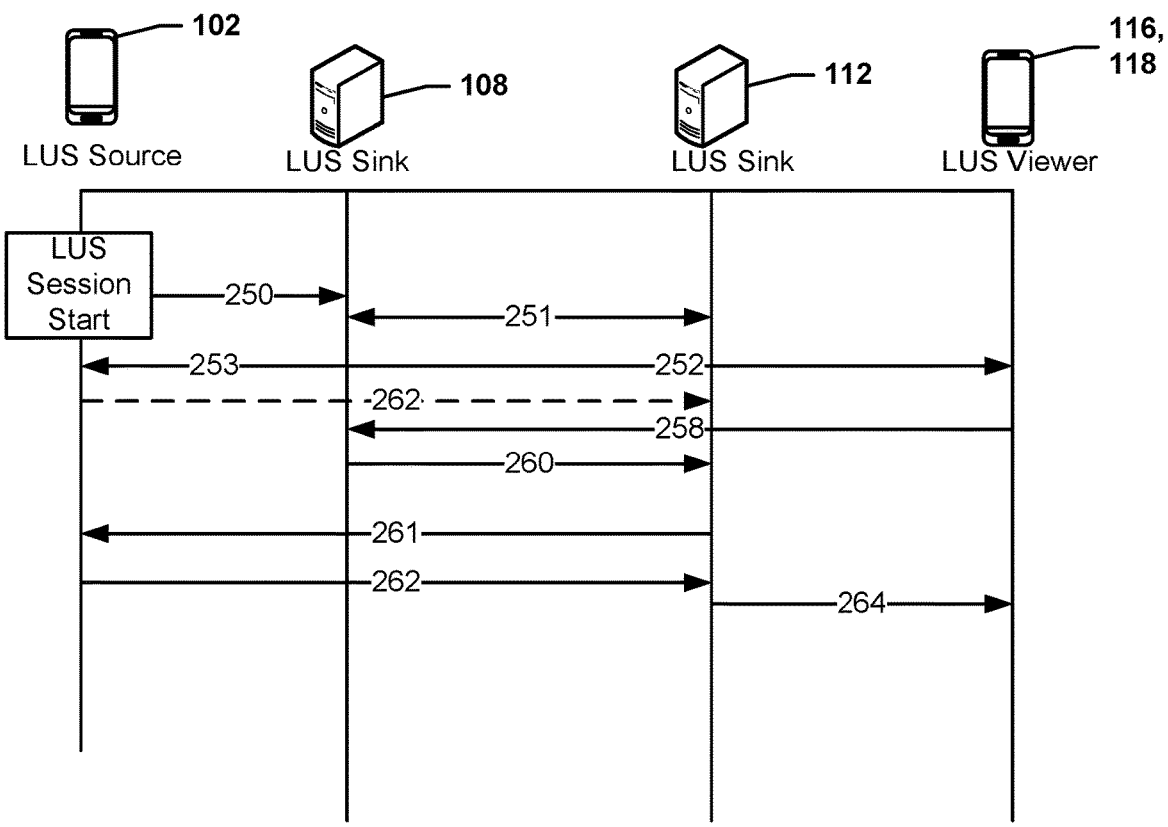
FIG. 2A is a call flow diagram illustrating signaling between a live uplink streaming source computing device, live uplink streaming sink computing devices, and a live uplink streaming viewing computing device to provision a live uplink streaming service according to various embodiments.

FIG. 2A is a call flow diagram illustrating signaling between a live uplink streaming source computing device, such as live uplink source computing device 102, live uplink streaming sink computing devices, such as live uplink streaming sink computing devices 108, 112, and a live uplink streaming viewing computing device, such as live uplink streaming viewing computing device 116, 119 to provision a live uplink streaming service according to various embodiments. The operations illustrated in FIG. 2A may be example operations that may occur when a provider of a third-party live uplink streaming service, such as Facebook Live or YouTube Live, relies on a mobile operator to handle downlink delivery of user-generated streaming content.

With reference to FIGS. 1 and 2A, upon a live uplink streaming session start by a live uplink source computing device 102, the live uplink source computing device 102 may transmit an indication of the live uplink media stream to be offered in the live uplink streaming session to the live uplink streaming sink computing device 108 of the live uplink streaming service provider in operation 250. In operation 251, the live uplink streaming sink computing device 108 of the live uplink streaming service provider and the live uplink streaming sink computing device 112 of the mobile network operator may negotiate the routing of one or more live uplink streaming sessions for the live uplink streaming service to the live uplink streaming sink computing device 112 of the mobile network operator. The live uplink streaming sink computing device 108 of the live uplink streaming service provider may rely on the live uplink streaming sink computing device 112 of the mobile network operator for downlink delivery based on predicted demand for the content. For example, the live uplink streaming sink computing device 108 of the live uplink streaming service provider may rely on the live uplink streaming sink computing device 112 of the mobile network operator to handle downlink delivery of user-generated streaming content for a venue-based event, such as a football game or a rock music concert, whereby the live uplink streaming viewing computing devices 116, 119 will receive the media content via mobile network distribution technologies, such as PSS or MBMS. In such environments, the live uplink streaming sink computing device 108 of the live uplink streaming service provider may determine that the live uplink source computing device 102 will be uploading video pertaining to the live event, and furthermore, predict that a sizeable number of its users will be/are present at the same venue (e.g., stadium or concert arena) with interest in watching such content. Such viewership could be attributed to "buddies" of the live uplink source computing device 102 and/or affinity group members (e.g., local followers of a sports team, or fan club members of a music performer) interested in watching user-generated live footage at the venue.

In operation 252, the live uplink streaming sink computing device 108 of the live uplink streaming service provider may advertise the live uplink streaming session to live uplink streaming viewing computing devices 116, 119. In operation 253, the live uplink streaming sink computing device 108 of the live uplink streaming service provider may redirect the live uplink streaming source computing device 102 to transmit its encoded media content for the live uplink streaming session to the live uplink streaming sink computing device 112 of the mobile network operator for downlink delivery. In optional operation 262, the live uplink streaming source computing device 102 may begin transmitting encoded media content to the live uplink streaming sink computing device 112.

In operation 258, the one or more of the live uplink streaming viewing computing devices 116, 119 may subscribe to the live uplink streaming session with the live uplink streaming sink computing device 108 of the live uplink streaming service provider. The live uplink streaming sink computing device 108 of the live uplink streaming service provider may indicate the subscription of the one or more of the live uplink streaming viewing computing devices 116, 119 to the live uplink streaming sink computing device 112 of the mobile network operator in operation 260. In operation 261, the live uplink streaming sink computing device 112 of the mobile network operator may transmit a viewership indication to the live uplink streaming source computing device 102. In response to receiving an indication of sufficient viewership for distribution, the live uplink streaming source computing device 102 may transmit encoded media content to the live uplink streaming sink computing device 112 of the mobile network operator in operation 262. The live uplink streaming sink computing device 112 of the mobile network operator may process the received content and distribute the media content to one or more of the live uplink streaming viewing computing devices 116, 119 in operation 264.

Figure 2B:
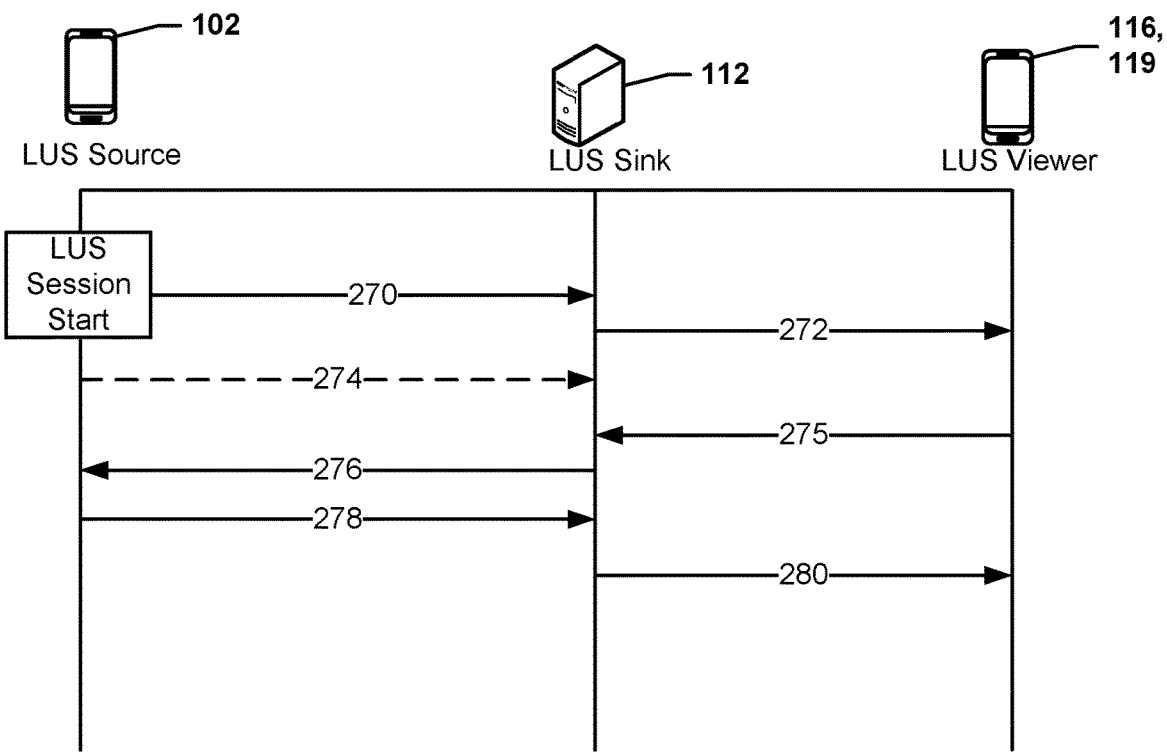
FIG. 2B is a call flow diagram illustrating signaling between a live uplink streaming source computing device, a live uplink streaming sink computing device, and a live uplink streaming viewing computing device to provision a live uplink streaming service according to various embodiments.

FIG. 2B is a call flow diagram illustrating signaling between a live uplink streaming source computing device, a live uplink streaming sink computing device, and a live uplink streaming viewing computing device to provision a live uplink streaming service according to various embodiments, such as live uplink source computing device 102, a live uplink streaming sink computing device, such as live uplink streaming sink computing device 112, and a live uplink streaming viewing computing device, such as live uplink streaming viewing computing device 116, 119 to provision a live uplink streaming service according to various embodiments. The operations illustrated in FIG. 2B may be example operations that may occur when a mobile operator provides its own live uplink streaming service.

With reference to FIGS. 1 and 2B, upon a live uplink streaming session start by a live uplink source computing device 102, the live uplink source computing device 102 may transmit an indication of the live uplink media stream to be offered in the live uplink streaming session to the live uplink streaming sink computing device 112 of the mobile network operator in operation 270.

In operation 272, the live uplink streaming session to the live uplink streaming sink computing device 112 of the mobile network operator may advertise the live uplink streaming session to live uplink streaming viewing computing devices 116, 119. In optional operation 274, the live uplink streaming source computing device 102 may begin transmitting encoded media content to the live uplink streaming sink computing device 112.

In operation 275, the one or more of the live uplink streaming viewing computing devices 116, 119 may subscribe to the live uplink streaming session with the live uplink streaming session to the live uplink streaming sink computing device 112 of the mobile network operator. In operation 276, the live uplink streaming sink computing device 112 of the mobile network operator may transmit a viewership indication to the live uplink streaming source computing device 102. In response to receiving an indication of sufficient viewership for distribution, the live uplink streaming source computing device 102 may transmit encoded media content to the live uplink streaming sink computing device 112 of the mobile network operator in operation 278. The live uplink streaming sink computing device 112 of the mobile network operator may process the received content and distribute the media content to one or more of the live uplink streaming viewing computing devices 116, 119 in operation 280.

Figure 2C:
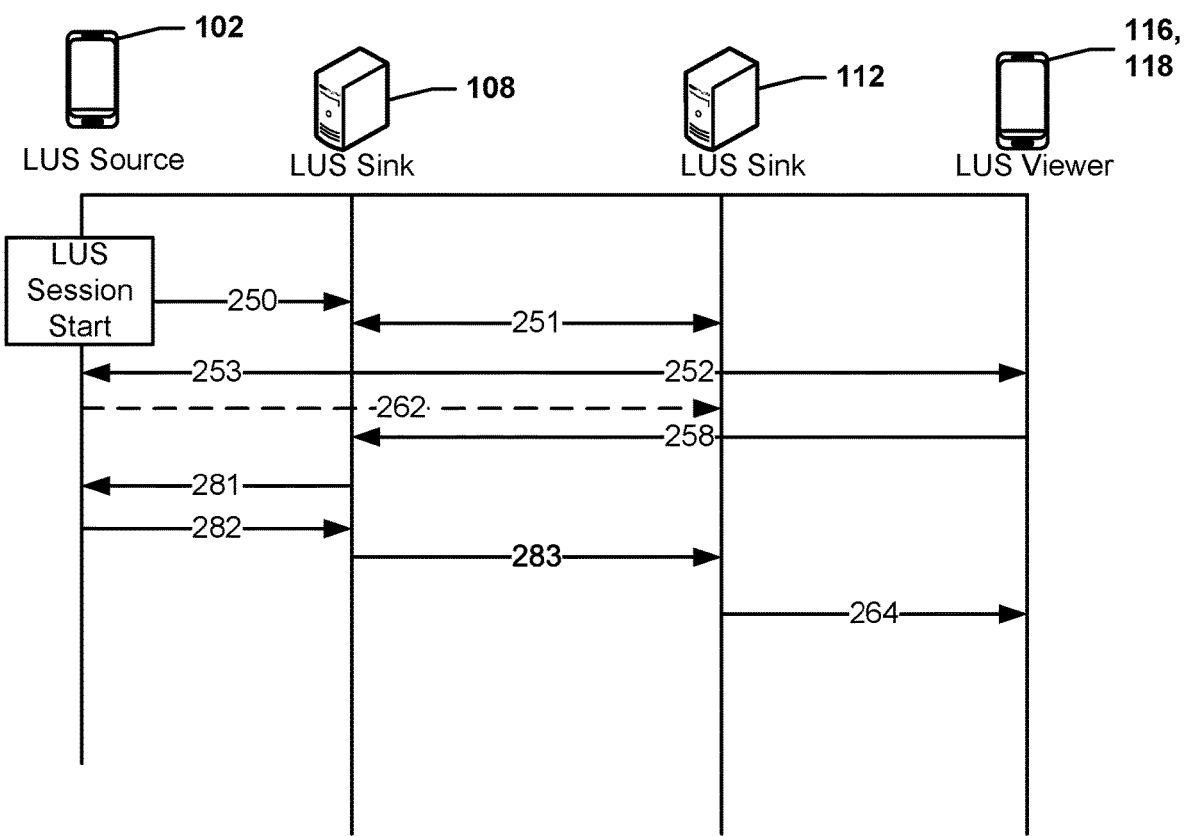
FIG. 2C is a call flow diagram illustrating signaling between a live uplink streaming source computing device, live uplink streaming sink computing devices, and a live uplink streaming viewing computing device to provision a live uplink streaming service according to various embodiments.

FIG. 2C is a call flow diagram illustrating signaling between a live uplink streaming source computing device, such as live uplink source computing device 102, live uplink streaming sink computing devices, such as live uplink streaming sink computing devices 108, 112, and a live uplink streaming viewing computing device, such as live uplink streaming viewing computing device 116, 119 to provision a live uplink streaming service according to various embodiments. The operations illustrated in FIG. 2C are intended as examples of operations that may occur when a provider of a third-party live uplink streaming service, such as Facebook Live or YouTube Live, relies on a mobile operator to handle downlink delivery of user-generated streaming content. The operations illustrated in FIG. 2C may be similar to the operations described with reference to FIG. 2A, except that the live uplink streaming source computing device 102 may transmit the uplink content to the live uplink streaming sink computing device 108, which may forward the uploaded content to the live uplink streaming sink computing device 112 for distribution to the live uplink streaming viewing computing device 116, 119.

With reference to FIGS. 1, 2A, and 2C, in operation 258, the one or more of the live uplink streaming viewing computing devices 116, 119 may subscribe to the live uplink streaming session with the live uplink streaming sink computing device 108 of the live uplink streaming service provider. The live uplink streaming sink computing device 108 of the live uplink streaming service provider may indicate the subscription of the one or more of the live uplink streaming viewing computing devices 116, 119 to the live uplink streaming source computing device 102 in operation 281. In response to receiving an indication of sufficient viewership for distribution, the live uplink streaming source computing device 102 may transmit encoded media content to the live uplink streaming sink computing device 108 of the live uplink streaming service provider in operation 282. In response to receiving the encoded media content, the live uplink streaming sink computing device 108 of the live uplink streaming service provider may transmit the encoded media content to the live uplink streaming sink computing device 112 of the mobile network operator in operation 283. The live uplink streaming sink computing device 112 of the mobile network operator may process the received content and distribute the media content to one or more of the live uplink streaming viewing computing devices 116, 119 in operation 264.

Figure 3A:
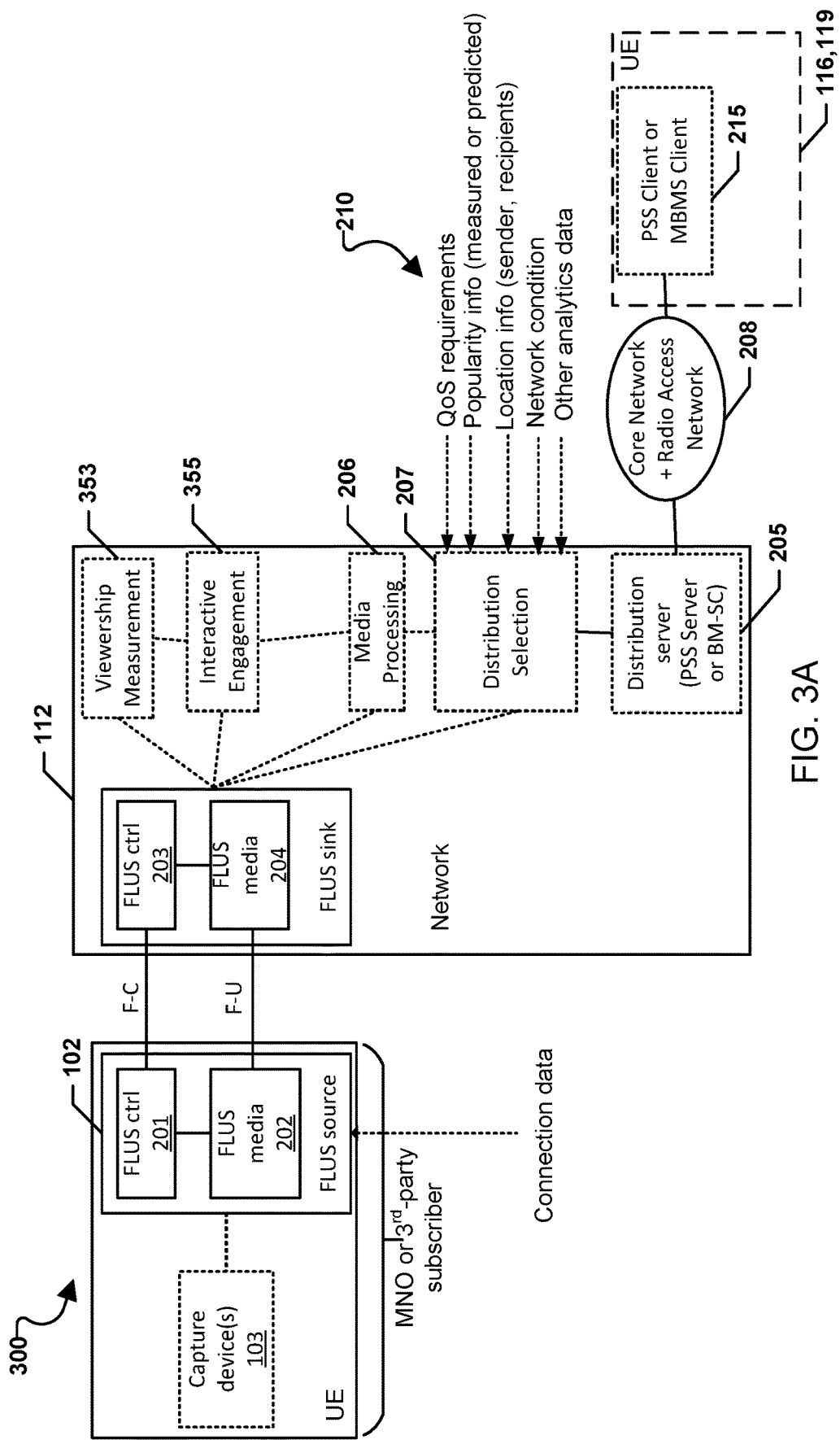
FIG. 3A is a block diagram illustrating an embodiment live uplink streaming service architecture.

FIG. 3A is a block diagram illustrating an embodiment live uplink streaming service architecture 300. With reference to FIGS. 1-3A, a processor of the live uplink streaming source computing device 102 may include a FLUS control function 201 and a FLUS media function 202. The live uplink streaming source computing device 102 may initiate a live uplink streaming session for a live uplink streaming service provided by a network operator or a third-party live uplink streaming service provider, for example according to the operations of FIG. 2A, 2B, or 2C. The FLUS control function 201 may exchange control messages with the FLUS control function 203 of a processor of a live uplink streaming sink computing device 112 of a network operator. The FLUS control functions 201 and 203 may exchange control messages indicating various information, such as attributes of live uplink streaming sessions, viewership indications, etc. As a further example, the FLUS control function 203 may transmit control messages to the FLUS control function 201 including assistance data 210 (also alternatively referred to as "downlink data"). FLUS media function 202 may receive captured media content from connected capture devices 103 (and/or onboard devices, such as cameras, microphones, etc.) and may encode the media content for transport to the FLUS media function 204 of the live uplink streaming sink computing device 112 of a network operator. The encoded media content may be transmitted to the live uplink streaming sink computing device 112 of a network operator by any one of different HTTP based and/or IMS multimedia telephony technology based streaming technologies, including RTMP, MPEGDASH, CMAF, HLS, MMTP, UDP, MTSI, etc.

In various embodiments, one type of control message that may be exchanged between the FLUS control functions 201 and 203 may be a requested action message. A requested action message may be a message transmitted from the FLUS control function 203 to the FLUS control function 201 to control or guide the live uplink streaming source computing device's 102 behavior in transmission of encoded media content. In various embodiments, the requested action message may be a message indicating one or more requested actions for the live uplink streaming source computing device 102 to take and one or more associated reasons for the live uplink streaming sink computing device 112 requesting the live uplink streaming source computing device 102 take the one or more requested actions.

In various embodiments, the live uplink streaming source computing device 102 may monitor conditions associated with live streaming. The live uplink streaming source computing device 102 may combine status information from multiple sources, such as its radio access network, the live uplink streaming sink computing device 112, a live uplink streaming viewing computing device 116, 119, the live uplink streaming source computing device 102 itself, etc., to monitor one or more conditions associated with live streaming. The live uplink streaming source computing device 102 may monitor conditions associated with connections used to upload encoded media to the live uplink streaming sink computing device 112, such as the type of connection in use, the type of connections available (e.g., Wi-Fi, 3G, 4G, 5G, guaranteed bit rate (GBR), non-guaranteed bit rate (non-GBR), etc.), the cost of a connection, the capacity of a connection, a priority associated with a connection, a capability of a connection, etc. The live uplink streaming source computing device 102 may receive connection data associated with the connections used to upload encoded media to the live uplink streaming sink computing device 112. For example, connection data may include cell location information (e.g., cell edge, cell center, etc.), network status information, etc. Additionally, the live uplink streaming source computing device 102 may monitor conditions based on assistance data 210 provided in control messages from the FLUS control function 203 to the FLUS control function 201, such as viewership conditions, interactivity conditions, network conditions, processing conditions, and distribution conditions.

The live uplink streaming sink computing device 112 of the network operator may receive the encoded media content and process the received encoded media content in a media processing function 206. The processing performed by the media processing function 206 may include transcoding, media re-formatting, media combining, applying codecs, changing codec profiles or levels, changing resolution, changing frame rates, changing bitrates, media stitching, mixing, and/or other type processing.

The live uplink streaming sink computing device 112 of the network operator may include a distribution selection function 207. In various embodiments, the live uplink streaming sink computing device 112 of the network operator may include a viewership measurement function 353. In various embodiments, the live uplink streaming sink computing device 112 of the network operator may include an interactive engagement function 355. In various embodiments, distribution selection function 207, the viewership measurement function 353, and/or the interactive engagement function 355 may receive assistance data 210 from one or more sources. As examples, the source of assistance data 210 may be a network entity belonging to the same network operator providing the live uplink streaming sink computing device 112, the source of assistance data 210 may be server of a third-party live uplink streaming service provider, such as live uplink streaming sink computing device 108, and/or the source of assistance data may be live uplink streaming viewing computing devices 116, 119.

Assistance data 210 may be transmitted over various network interfaces. As examples, in the case of 3GPP networks, when the assistance data originates from a third-party application service provider, such interfaces may be the T8 reference point as defined in 3GPP TS 29.122, the xMB reference point as defined in 3GPP TS 29.116, the N33 reference point as defined in 3GPP TS 23.501, etc. Assistance data 210 may include popularity information for the live uplink streaming service and/or one or more live uplink streaming sessions. Assistance data 210 may include viewership/interaction information for a live uplink streaming session, such as a number of subscribed live uplink streaming viewing computing devices, an indication of an engagement level of subscribed live uplink streaming viewing computing devices, an indication that one or more live uplink streaming viewing computing devices subscribed to a live uplink streaming session, an indication that one or more live uplink streaming viewing computing devices unsubscribed from the live uplink streaming session, etc. Assistance data 210 may include location information, such as the location data (e.g., latitude and longitude, country, zip code, geographic area, zone, civic location, such as street, block, neighborhood, building, and/or landmark, etc.) of the live uplink streaming source computing device, location data of one or more live uplink streaming viewing computing devices, etc. Assistance data 210 may include network condition data, such as unicast network load information, error rate, network equipment status, delivery times, end-to-end delay estimates, etc. Assistance data 210 may include content characteristics, such as perceived reception demand, actual reception demand, viewership history, estimated audience size, estimated audience size based on correlated location and viewership history, etc. Assistance data 210 may include input metadata regarding QoS requirements for the live uplink streaming service and/or one or more live uplink streaming sessions, such as permissible end-to-end delivery latency, target data rate, target error rate, required data rate, delay settings, network policy information, viewing quality settings, etc. Assistance data 210 may include application level data from one or more live uplink streaming viewing computing devices 116, 119.

In various embodiments, the viewership measurement function 353, the interactive engagement function 355, the media processing function 206, and/or the distribution selection function 207 may exchange information with one another. In various embodiments, the viewership measurement function 353, the interactive engagement function 355, the media processing function 206, and/or the distribution selection function 207 may provide information to the FLUS control function 203. For example, such information may include processing information, distribution information, viewership information, engagement information, etc. In various embodiments, the information provided by the viewership measurement function 353, the interactive engagement function 355, the media processing function 206, and/or the distribution selection function 207 to the FLUS control function 203 or exchange among one or more of the viewership measurement function 353, the interactive engagement function 355, the media processing function 206, and/or the distribution selection function 207 may be assistance data 210 itself and/or derived at least in part from assistance data 210. In various embodiments, the FLUS control function 203 may provide the information it receives to the FLUS control function 201 of the live uplink streaming source computing device 102, such as in control messages. As a specific example, the information may be application level data received from one or more live uplink streaming viewing computing devices 116, 119 as assistance data 210, and the FLUS control function 203 may transmit the application level data to the FLUS control function 201 of the live uplink streaming source computing device 102.

In various embodiments, the FLUS control function 203 may be configured to guide or control the sending behavior of the FLUS control function's 201 behavior in transmission of encoded media content by generating and transmitting requested action messages. The FLUS control function 203 may monitor conditions associated with live streaming. The conditions associated with live streaming may include various conditions that impact live streaming, such as one or more of viewership conditions, interactivity conditions, network conditions, processing conditions, connection conditions, and/or distribution conditions. An example of a network condition may be an indication that one or wireless access technologies (e.g., WiFi, 3G, 4G and 5G) are currently available to a live uplink streaming source computing device. An example of a connection condition may be the bandwidth/transmission bit-rate available to, or expected delay to be incurred by, a computing device (e.g., alive uplink streaming source computing device, live uplink streaming sink computing device, etc.), for transmitting media content. An example of a distribution condition may be an indication of whether the downlink delivery of streaming content, transmitted by the live uplink streaming source device to recipient viewers, employs unicast, multicast, or broadcast technology. The conditions may be monitored, at least in part, based on assistance data 210 and/or other information received and/or generated by various sources, such as the viewership measurement function 353, the interactive engagement function 355, the media processing function 206, the distribution selection function 207, etc. The FLUS control function 203 may determine whether a condition for controlling uplink behavior is occurring based on the one or more monitored conditions. In response to determining that one or more conditions for controlling and/or guiding the sending behavior of a live uplink streaming source computing device are occurring, the FLUS control function 203 may generate and transmit a requested action message to the FLUS control function 201.

In various embodiments, the FLUS control function 201 may receive the requested action message and may determine whether a reason indicated in the requested action message supports taking an action indicated in the action message. In response to determining that the reason indicated in the requested action message supports taking the action indicated in the requested action message, the FLUS control function 201 may implement one or more changes in one or more uplink associated behaviors. Example changes in the one or more uplink associated behaviors the FLUS control function 201 may implement may include one or more of caching encoded media, transmitting cached encoded media, changing a quality level of encoding used for media, changing a bit rate of transmission of encoded media, changing a connection attribute used for encoded media, changing a transport technology used for encoded media, etc. In various embodiments, the one or more conditions the FLUS control function 201 monitors may be used by the FLUS control function 201 to change or modify the uplink behaviors of the live uplink streaming source computing device 102. In various embodiments, the FLUS control function 201 may use both reasons in a received requested action message and the conditions the live uplink streaming source computing device 102 may be monitoring to modify the uplink behaviors of the live uplink streaming source computing device 102.

In various embodiments, distribution selection function 207 may perform static selection of the downlink delivery method and provide the processed media content to a distribution server function 205 for delivery to the live uplink streaming viewing computing devices 116, 119. Delivery may be via unicast (e.g., PSS) or broadcast (e.g., MBMS) and once the type of delivery is selected that delivery method may be used for the entire live uplink streaming session. The distribution server function 205 may transmit the processed media content to a streaming client 215, such as a PSS client or MBMS client, running on a processor of the live uplink streaming viewing computing device 116, 119 via a core network and radio access network 208 using the selected delivery method. The streaming client 215 running on the processor of the live uplink streaming viewing computing device 116, 119 may receive the processed media content and make the processed media content available for display to a user of the live uplink streaming viewing computing device 116, 119.

Figure 3B:
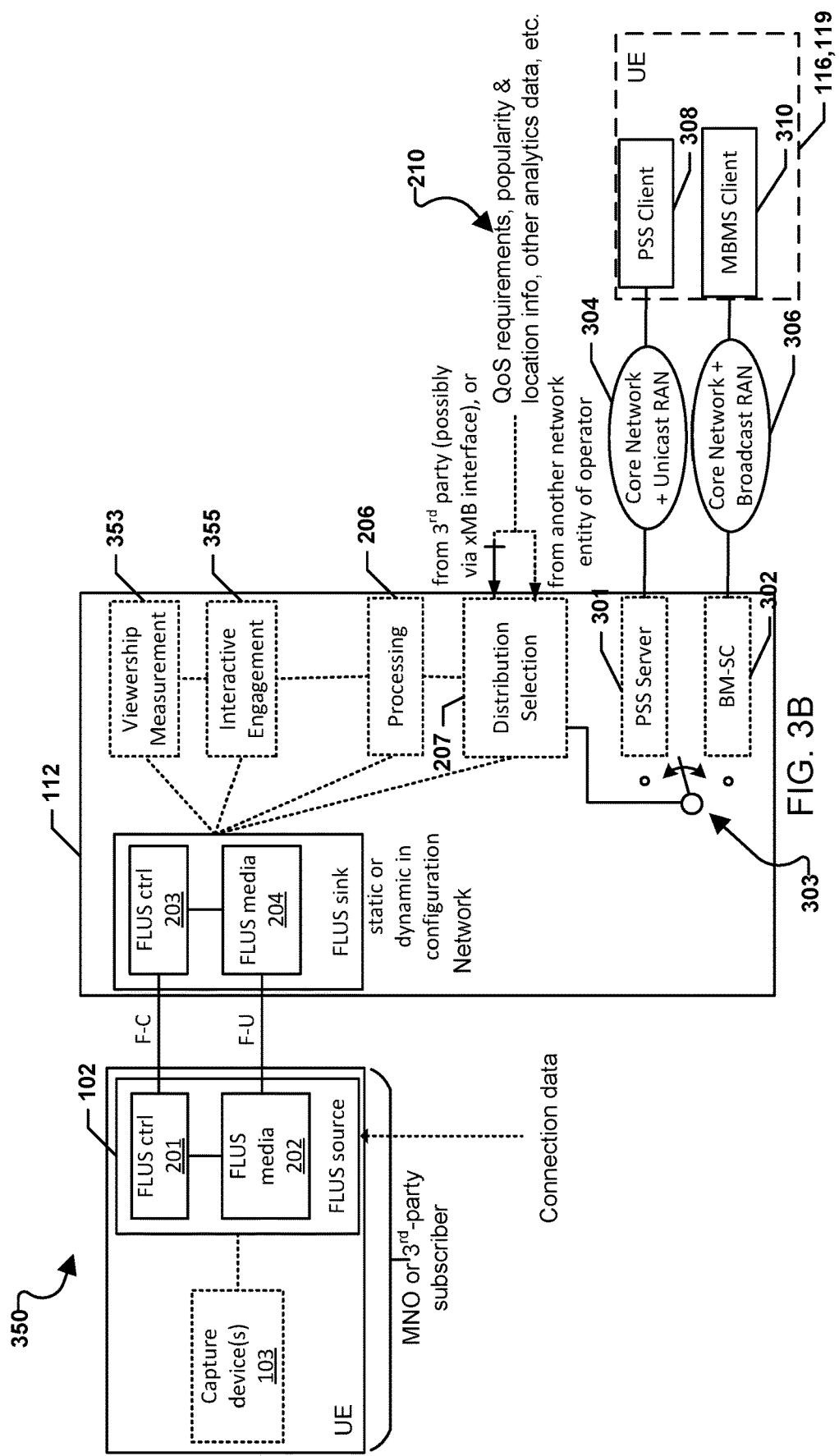
FIG. 3B is a block diagram illustrating another embodiment live uplink streaming service architecture.

FIG. 3B is a block diagram illustrating another embodiment live uplink streaming service architecture 350. Architecture 350 is similar to architecture 300 described with reference to FIG. 3A, except that rather than a single distribution server function 205, the live uplink streaming sink computing device 112 of the network operator may include both a unicast server function 301, such as a PSS server function, and a broadcast server function 302, such as a BM-SC function. With reference to FIGS. 1-3B, the unicast server function 301 may transmit processed media content to a unicast streaming client 308, such as a PSS client, running on a processor of the live uplink streaming viewing computing device 116, 119 via a core network and unicast radio access network 304. The broadcast server function 302 may transmit processed media content to a broadcast streaming client 310, such as a MBMS client, running on a processor of the live uplink streaming viewing computing device 116, 119 via a core network and broadcast radio access network 306. The distribution selection function 207 may control a switching function 303 to dynamically select between the unicast server function 301 and the broadcast server function 302 as the selected delivery method. Switching between unicast and broadcast delivery methods may be done in a manner similar to the switching supporting MooD as defined in 3GPP TS 26.346.

Figure 4:
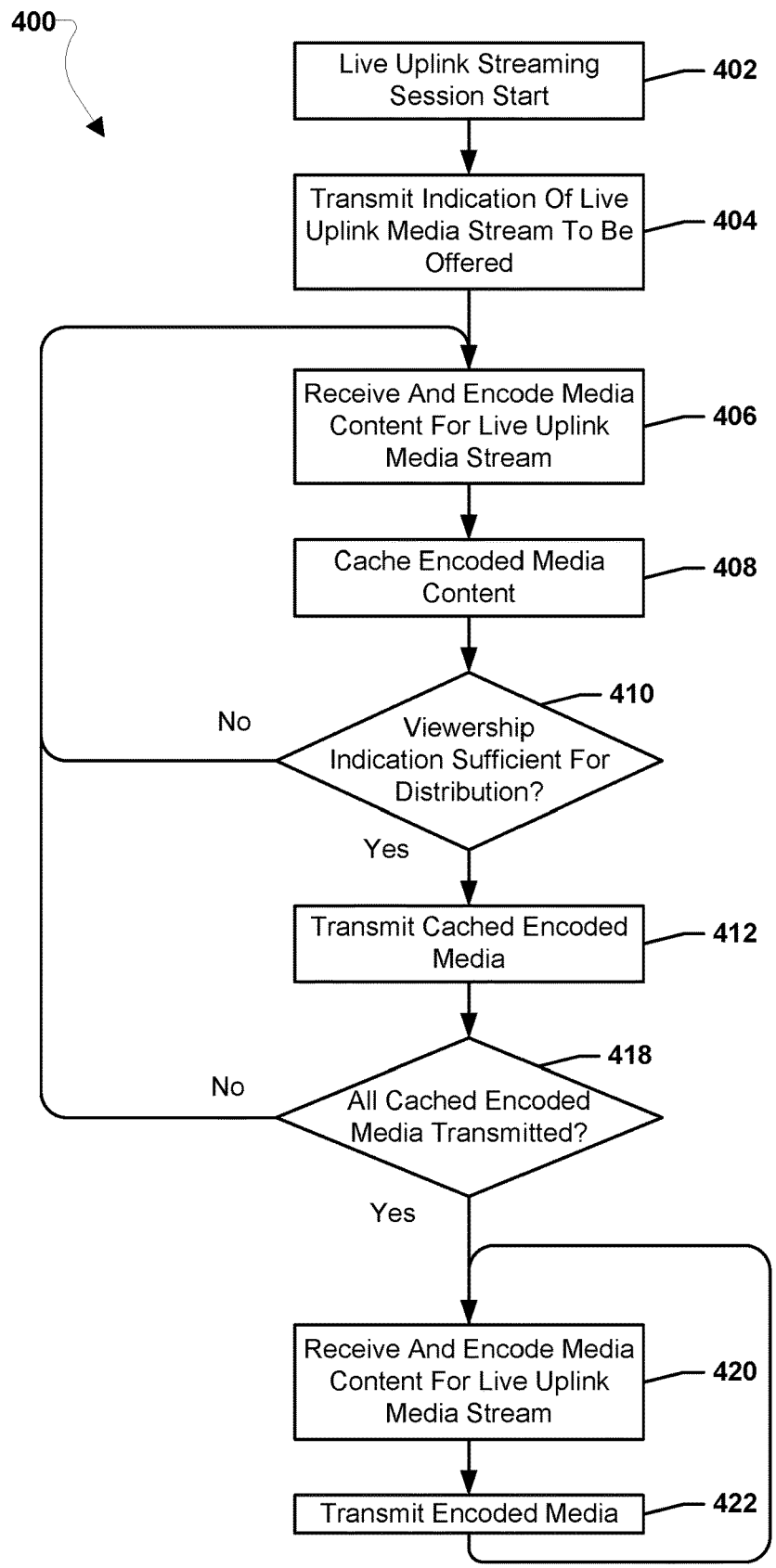
FIG. 4 is a process flow diagram illustrating an embodiment method for uplink delivery in a live uplink streaming service.

FIG. 4 illustrates an embodiment method 400 for uplink delivery in a live uplink streaming service. With reference to FIGS. 1-4, the operations of the method 400 may be performed by a processor of a live uplink streaming source computing device, such as live uplink streaming source computing device 102.

In block 402, the processor may start a live uplink streaming session. For example, a user of the live uplink streaming source computing device may select a live uplink streaming service application, and may enter information related to the live uplink media stream to be offered and/or select attributes of the live uplink streaming session to be offered to live uplink streaming viewing computing devices. For example, the user may select a latency requirement for the live uplink streaming session (e.g., an end-to-end latency requirement, a processing latency requirement, a downlink latency requirement, an uplink latency requirement, etc.), indicate a subject matter of the live uplink streaming session, select a QoS requirement for the live uplink streaming session, etc. Additionally, the user may select a transmission and/or caching scheme to be used for the live uplink streaming session. Further, the user may indicate that a live uplink streaming sink computing device distributing the live uplink streaming session should cache a copy of the processed media content of the session for distribution to viewers requesting the content after the live uplink streaming session is complete.

In block 404, the processor may transmit an indication of a live uplink media stream to be offered. The indication of the live uplink media stream to be offered may identify one or more attributes of the live uplink streaming session, may identify characteristics of the media content to be uploaded in the live uplink streaming session, may indicate the location of the live uplink streaming source computing device, may indicate a latency requirement for the live uplink streaming session, may indicate a transmission and/or caching scheme to be used for the live uplink streaming session, etc.

In block 406, the processor may receive and encode media content for the live uplink media stream. The media content may be received from a capture device connected to the live uplink streaming source computing device, such as capture device 103, and/or may be received from a capture device on board the live uplink streaming source computing device, such as a built-in camera. Encoding the media content may include sampling the media content at one or more selected bit rate, preparing the media content for transport, formatting the media content, etc.

In block 408, the processor may cache the encoded media content. Caching the captured and encoded content may include storing the encoded content in a memory of the live uplink streaming source computing device, such as a transport buffer.

In determination block 410, the processor may determine whether a viewership is sufficient for distribution. In various embodiments, a viewership indication may be generated and transmitted from a live uplink streaming sink computing device, such a live uplink streaming sink computing device 112, to the live uplink streaming source computing device. The viewership indication may be a message indicating that one or more live uplink streaming viewing computing devices have subscribed to a live uplink streaming session associated with the live uplink streaming source computing device. As one example, the viewership indication may be a message, such as a control message, indicating that at least one live uplink streaming viewing computing device has subscribed to the live uplink streaming session. The viewership indication may include an attribute indicating the total number of subscribed live uplink streaming viewing computing devices. In some embodiments, sufficient viewership for distribution may be a single viewer. In such embodiments, reception of a viewership indication may enable the processor to determine viewership is sufficient for distribution. In some embodiments, the processor may compare a total viewership indicated in the viewership indication to a viewership threshold to determine whether a viewership is sufficient for distribution. Total viewership being at or above the threshold may indicate viewership is sufficient for distribution. In some embodiments, the threshold may be one viewer. In some embodiments, the threshold may be more than one viewer.

In response to determining that a viewership indication is not sufficient for distribution (i.e., determination block 410="No"), the processor may continue to receive and encode media content for the live uplink media stream in block 406.

In response to determining that a viewership indication is sufficient for distribution (i.e., determination block 410="Yes"), the processor may transmit the cached encoded media to the live uplink streaming sink computing device in block 412. In this manner, upstream transmission of the cached encoded media from the live uplink streaming source computing device to a live uplink streaming sink computing device may commence immediately upon the live uplink streaming source computing device determining a viewership indication is sufficient for distribution. The live uplink streaming source computing device may transmit the cached encoded media content on a first-in-first-out basis from the memory of the live uplink streaming source computing device, such as the transport buffer. The cached encoded media content may be transmitted to the live uplink streaming sink computing device by any one of different HTTP based and/or IMS multimedia telephony technology based streaming technologies, including RTMP, MPEGDASH, CMAF, HLS, MMTP, UDP, MTSI, etc.

In determination block 418, the processor may determine whether all the cached encoded media is transmitted. For example, the processor may check the status of a transport buffer to determine whether all the cached encoded media is transmitted. The transport buffer being empty may indicate all the encoded media was transmitted. The transport buffer including data may indicate all the encoded media was not transmitted. In response to determining that all the cached encoded media was not transmitted (i.e., determination block 418="No"), the processor may receive and encode media content for the live uplink media stream in block 406 and cache the encoded media content in block 408.

In response to determining that all the cached encoded media is transmitted (i.e., determination block 418="Yes"), the processor may receive and encode the media content for the live uplink media stream in block 420. The operations to receive and encode the media content for the live uplink media stream in block 420 may be similar to the operation discussed in relation to block 406 to receive and encode the media content for the live uplink media stream. In block 422, the processor may transmit the encoded media to a live uplink streaming sink computing device. The encoded media content may be transmitted to the live uplink streaming sink computing device by any one of different HTTP based and/or IMS multimedia telephony technology based streaming technologies, including RTMP, MPEGDASH, CMAF, HLS, MMTP, UDP, MTSI, etc. As the cache may be empty, the processor may continuously encode and transmit media content as it is received by continuously performing operations of blocks 420 and 422.

Figure 5:
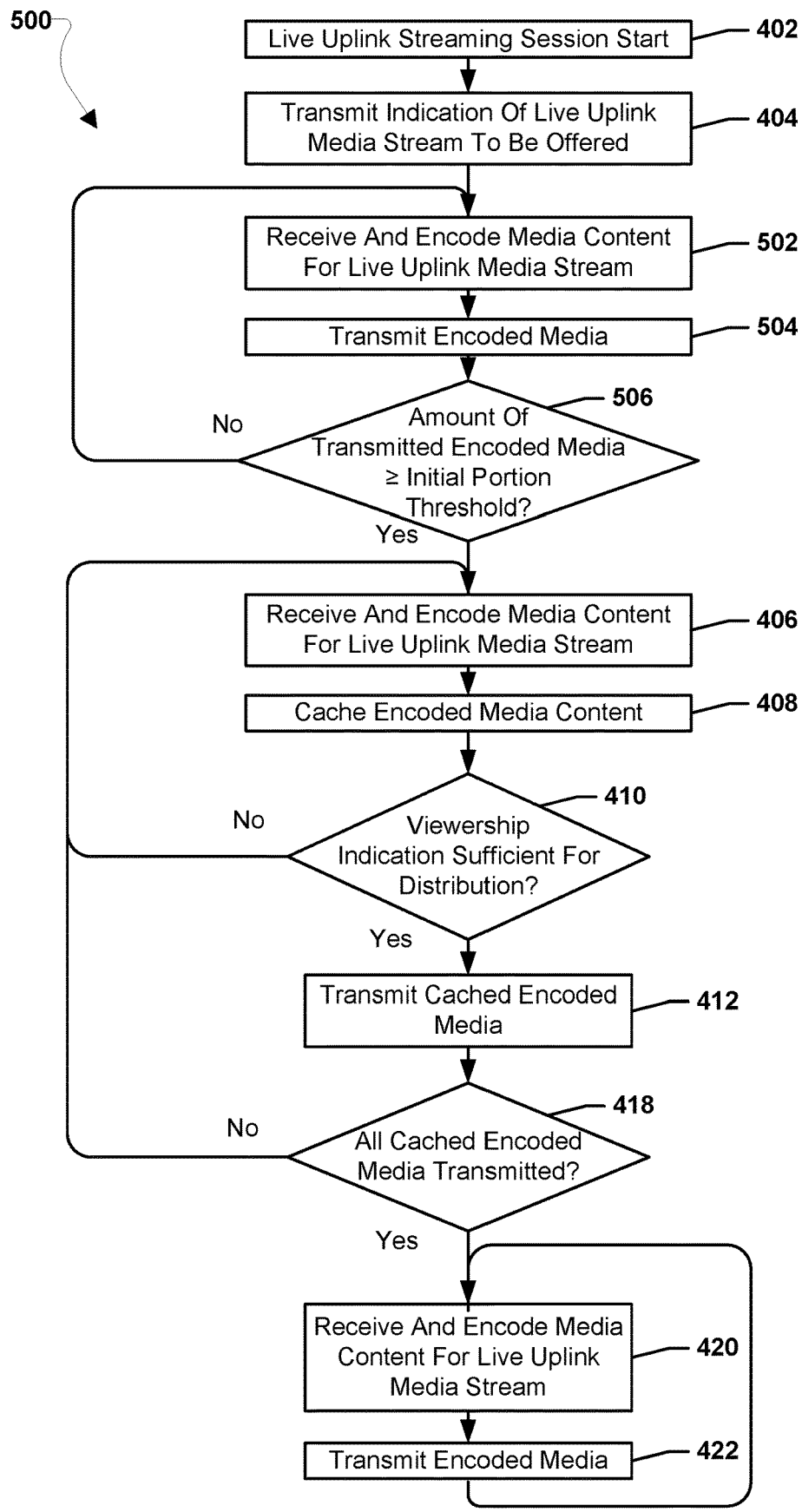
FIG. 5 is a process flow diagram illustrating another embodiment method for uplink delivery in a live uplink streaming service.

FIG. 5 illustrates an embodiment method 500 for uplink delivery in a live uplink streaming service. With reference to FIGS. 1-5, the operations of the method 500 may be performed by a processor of a live uplink streaming source computing device, such as live uplink streaming source computing device 102.

In blocks 402 and 404, the processor may perform operations of like numbered blocks of the method 400 as described. In block 502, the processor may receive and encode media content for the live uplink media stream. The operations to receive and encode the media content for the live uplink media stream in block 502 may be similar to the operation discussed in relation to block 406 to receive and encode the media content for the live uplink media stream. In block 504, the processor may transmit the encoded media to a live uplink streaming sink computing device. The encoded media content may be transmitted to the live uplink streaming sink computing device by any one of different HTTP based and/or IMS multimedia telephony technology based streaming technologies, including RTMP, MPEG-DASH, CMAF, HLS, MMTP, UDP, MTSI, etc.

In determination block 506, the processor may determine whether the amount of transmitted encoded media is greater than or equal to an initial portion threshold. In various embodiments, a live uplink streaming source computing device may transmit only an initial portion of media, such as a first few seconds or minutes of streaming content, to a live uplink streaming sink computing device. The initial portion threshold may be a value corresponding to a time, such as seconds, minutes, etc., or may be a value corresponding to a size, such as a number of bits, bytes, etc. The processor may track the amount, such as amount of time, size, etc., of the transmitted encoded media and compare that amount to the initial portion threshold to determine whether the amount of transmitted encoded media is greater than or equal to an initial portion threshold. The initial portion threshold may be a value pre-configured and stored on the live uplink streaming source computing device, may be a user selected value, may be set by the live uplink streaming sink computing device, etc.

In response to determining that the amount of transmitted encoded media is less than the initial portion threshold (i.e., determination block 506="No"), the processor may continue to receive and encode media content in block 502.

In response to determining that the amount of transmitted encoded media is greater than or equal to the initial portion threshold (i.e., determination block 506="Yes"), the processor may perform operations of blocks 406-422 of the method 400 as described with reference to FIG. 4.

Figure 6:
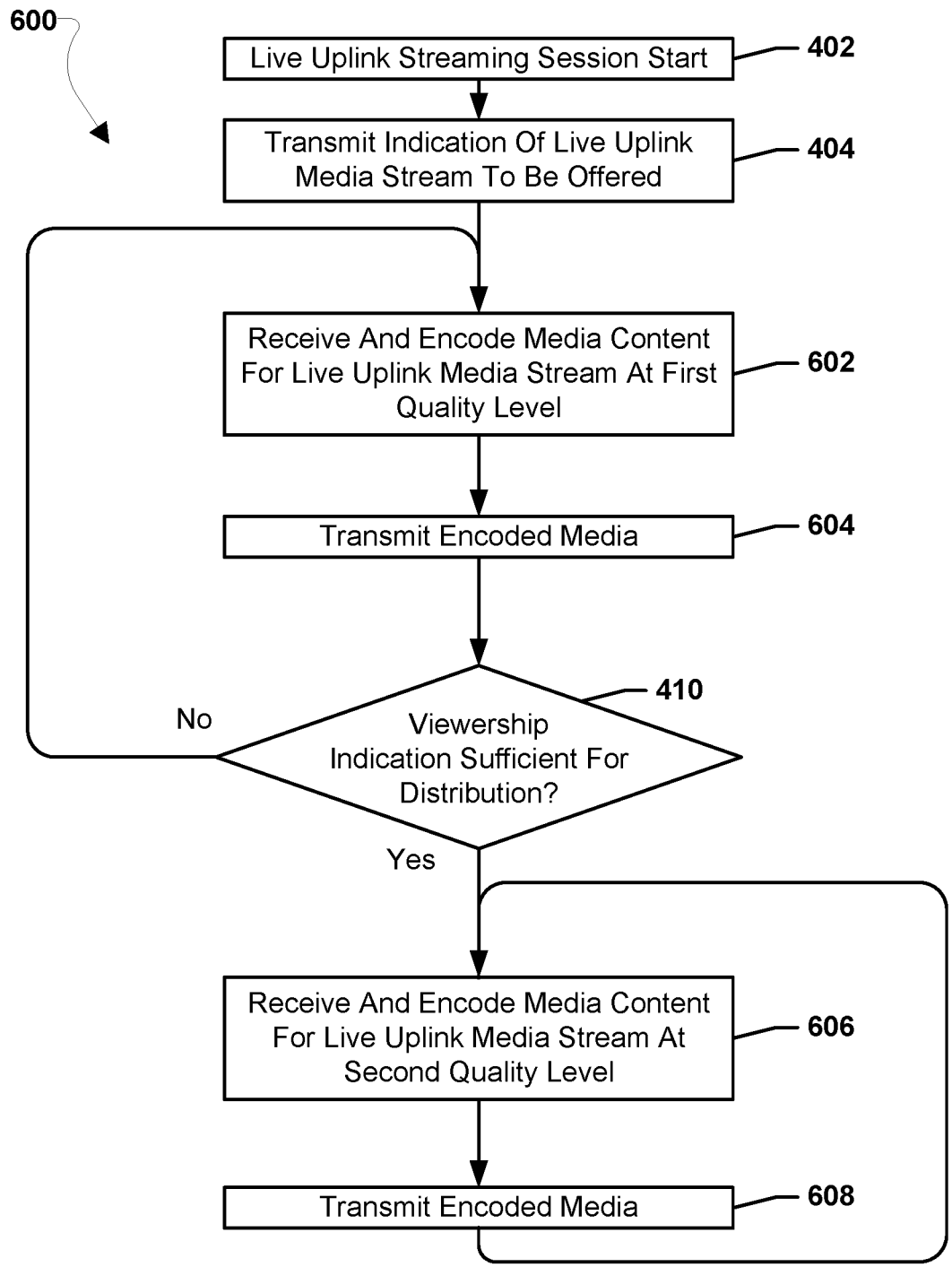
FIG. 6 is a process flow diagram illustrating another embodiment method for uplink delivery in a live uplink streaming service.

FIG. 6 illustrates an embodiment method 600 for uplink delivery in a live uplink streaming service. With reference to FIGS. 1-6, the operations of the method 600 may be performed by a processor of a live uplink streaming source computing device, such as live uplink streaming source computing device 102.

In blocks 402 and 404, the processor may perform operations of like numbered blocks of the method 400 as described. In block 602, the processor may receive and encode media content for the live uplink media stream at a first quality level. The media content may be received from a capture device connected to the live uplink streaming source computing device, such as capture device 103, and/or may be received from a capture device on board the live uplink streaming source computing device, such as a built-in camera. Encoding the media content may include sampling the media content at one or more selected bit rate, preparing the media content for transport, formatting the media content, etc. The first quality level may be a high quality level or a low quality level. In some embodiments, the first quality level may be a high quality level and the processor may have indicated to the live uplink streaming sink computing device that there is a relaxed latency requirement for the media content while viewership is absent, for example in the signaling to transmit an indication of the live uplink media stream to be offered in block 404. As examples, the relaxed latency requirement may be a relaxed end-to-end latency requirement, a relaxed processing latency requirement, a relaxed uplink latency requirement, a relaxed downlink latency requirement, etc. In this manner, the live uplink streaming sink computing device may prioritize the processing of the media content relative to other media content for other media streams. In some embodiments, the first quality level may be a high bit rate encoding of the media content.

In block 604, the processor may transmit the encoded media to a live uplink streaming sink computing device. The encoded media content may be transmitted to the live uplink streaming sink computing device by any one of different HTTP based and/or IMS multimedia telephony technology based streaming technologies, including RTMP, MPEG-DASH, CMAF, HLS, MMTP, UDP, MTSI, etc.

In determination block 410, the processor may perform operations of like numbered blocks of the method 400 as described. In response to determining that the viewership indication is not sufficient for distribution (i.e., determination block 410="No"), the processor may continue to receive and encode media content for the live uplink media stream at a first quality level in block 602.

In response to determining that the viewership indication is sufficient for distribution (i.e., determination block 410="Yes"), the processor may receive and encode media content for the live uplink media stream at a second quality level in block 606. The second quality level may be a high quality level or a low quality level. The second quality level may be different than the first quality level used in block 602. In some embodiments, the second quality level may be a lower quality level than the first quality level and the processor may have indicated to the live uplink streaming sink computing device that there is a lower latency requirement (i.e., less allowed delay) for the media content once viewership is present, for example in the signaling to transmit an indication of the live uplink media stream to be offered in block 404. As examples, the lower latency requirement may be a lower end-to-end latency requirement, a lower processing latency requirement, a lower uplink latency requirement, a lower downlink latency requirement, etc. In this manner, the live uplink streaming source computing device may exchange a decrease in quality level of the media content for a lower delay guarantee on delivery of media to live uplink streaming viewing computing devices. In some embodiments, the second quality level may be a low bit rate encoding of the media content.

In block 608, the processor may transmit the encoded media to a live uplink streaming sink computing device. The encoded media content may be transmitted to the live uplink streaming sink computing device by any one of different HTTP based and/or IMS multimedia telephony technology based streaming technologies, including RTMP, MPEG-DASH, CMAF, HLS, MMTP, UDP, MTSI, etc.

Figure 7:
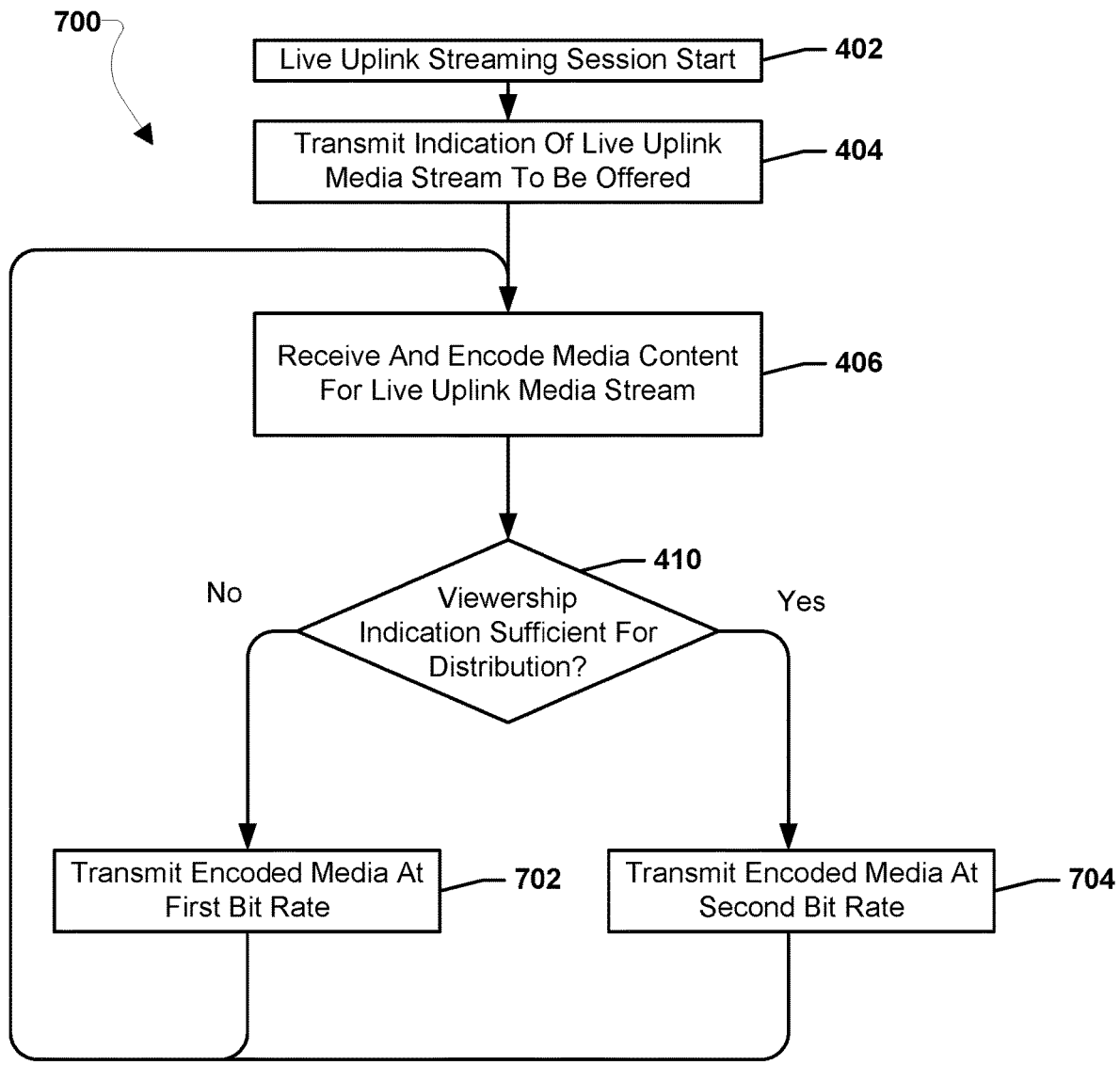
FIG. 7 is a process flow diagram illustrating another embodiment method for uplink delivery in a live uplink streaming service.

FIG. 7 illustrates an embodiment method 700 for uplink delivery in a live uplink streaming service. The operations of the method 700 may be performed by a processor of a live uplink streaming source computing device, such as live uplink streaming source computing device 102.

With reference to FIGS. 1-7, in blocks 402, 404, 406, and 422, the processor may perform operations of like numbered blocks of the method 400 as described. In response to determining that a viewership indication is not sufficient for distribution (i.e., determination block 410="No"), the processor may transmit the encoded media at a first bit rate in block 702. In response to determining that a viewership indication is sufficient for distribution (i.e., determination block 410="Yes"), the processor may transmit the encoded media at a second bit rate in block 704. In some embodiments, the first bit rate may be higher than the second bit rate. The live uplink streaming source computing device may initially upload the media content using the first bit rate, e.g., the higher bit rate, and may signal the live uplink streaming sink computing device that there is a relaxed latency requirement for the media content while viewership is absent. As examples, the relaxed latency requirement may be a relaxed end-to-end latency requirement, a relaxed processing latency requirement, a relaxed uplink latency requirement, a relaxed downlink latency requirement, etc. In response determining that at least one or more live uplink streaming viewing computing devices are subscribing to the live uplink streaming session, the live uplink streaming source computing device may use the second bit rate, e.g., the lower bit rate, for uploading and may signal the live uplink streaming sink computing device to use a lower latency requirement for the media content. As examples, the lower latency requirement may be a lower end-to-end latency requirement, a lower processing latency requirement, a lower uplink latency requirement, a lower downlink latency requirement, etc. In this manner, the live uplink streaming source computing device may exchange a decrease in uploading bit rate for a lower delay guarantee on delivery of media to live uplink streaming viewing computing devices.

Figure 8:
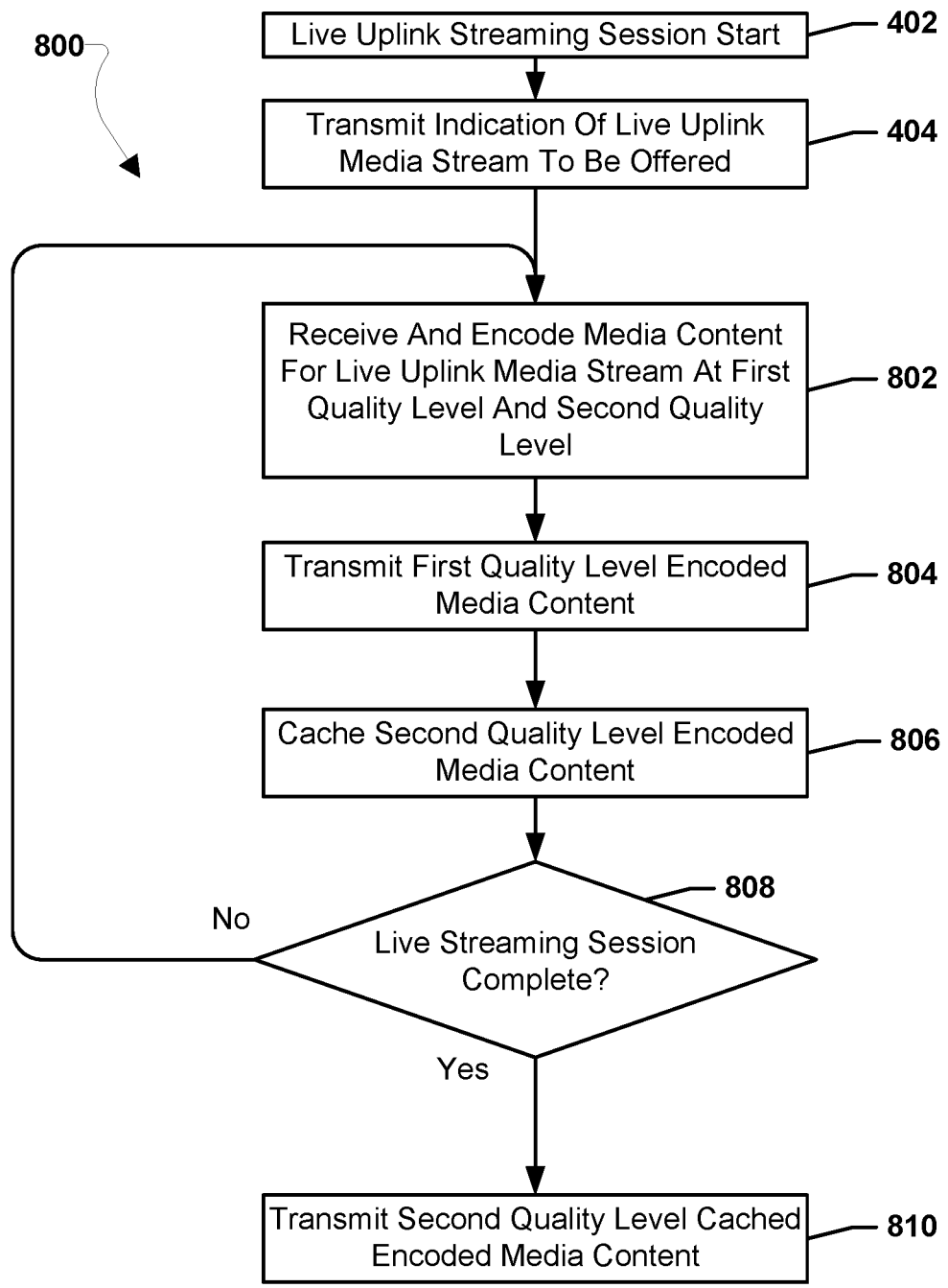
FIG. 8 is a process flow diagram illustrating another embodiment method for uplink delivery in a live uplink streaming service.

FIG. 8 illustrates an embodiment method 800 for uplink delivery in a live uplink streaming service. The operations of the method 800 may be performed by a processor of a live uplink streaming source computing device, such as live uplink streaming source computing device 102.

With reference to FIGS. 1-8, in blocks 402 and 404, the processor may perform operations of like numbered blocks of the method 400 as described. In block 802, the processor may receive and encode media content for the live uplink media stream at a first quality level and a second quality level. Encoding the media content may include sampling the media content at one or more selected bit rate, preparing the media content for transport, formatting the media content, etc. In an embodiment, the first quality level may be lower quality level and second quality level may be a higher quality level. For example, the first quality level may be a lower encoding bit rate than the encoding bit rate of the second quality level.

In block 804, the processor may transmit the first quality level encoded media content. The first quality level encoded media content may be transmitted to the live uplink streaming sink computing device by any one of different HTTP based and/or IMS multimedia telephony technology based streaming technologies, including RTMP, MPEGDASH, CMAF, HLS, MMTP, UDP, MTSI, etc. In block 806, the processor may cache the second quality level encoded media content. Caching the second quality level encoded media content may include storing the second quality level encoded media content in a memory of the live uplink streaming source computing device, such as a transport buffer.

In determination block 808, the processor may determine whether the live streaming session is complete. For example, the processor may determine whether a user has stopped media capture to determine whether the live streaming session is complete. In response to determining the live streaming session is on-going (i.e., determination block 808="No"), the processor may continue to receive and encode media content for the live uplink media stream at a first quality level and a second quality level in block 802. In response to determining that the live streaming session is complete (i.e., determination block 808="Yes"), the processor may transmit the second quality level cached encoded media content in block 810. The second quality level cached encoded media content may be transmitted to the live uplink streaming sink computing device by any one of different HTTP based and/or IMS multimedia telephony technology based streaming technologies, including RTMP, MPEG-DASH, CMAF, HLS, MMTP, UDP, MTSI, etc. In various embodiments, the second quality level cached encoded media content may be transmitted on a non-guaranteed bit rate (non-GBR) bearer.

Figure 9:
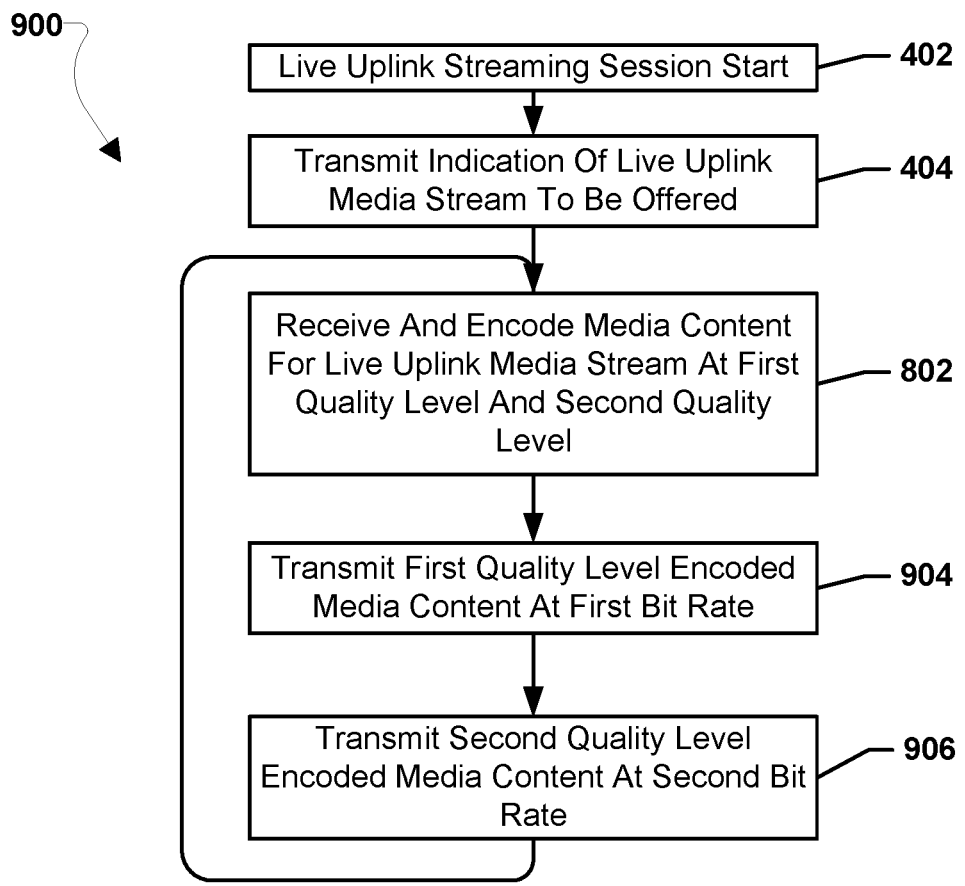
FIG. 9 is a process flow diagram illustrating another embodiment method for uplink delivery in a live uplink streaming service.

FIG. 9 illustrates an embodiment method 900 for uplink delivery in a live uplink streaming service. With reference to FIGS. 1-9, the operations of the method 900 may be performed by a processor of a live uplink streaming source computing device, such as live uplink streaming source computing device 102.

In blocks 402 and 404, the processor may perform operations of like numbered blocks of the method 400 as described, and in block 802 the processor may perform operations of like numbered blocks of the method 800 as described. In block 904, the processor may transmit the first quality level encoded media content at a first bit rate. In block 906, the processor may transmit the second quality level encoded media content at a second bit rate. In this manner, the first and second quality level encoded mediate content may be transmitted in parallel. The first and second quality level encoded media content may be transmitted to the live uplink streaming sink computing device by any one of different HTTP based and/or IMS multimedia telephony technology based streaming technologies, including RTMP, MPEGDASH, CMAF, HLS, MMTP, UDP, MTSI, etc. The first bit rate may be a transmission bit rate that is higher than, lower than, or equal to the transmission bit rate that is the second bit rate. The transmission bit rate that is the first bit rate may be higher than, lower than, or equal to the transmission bit rate that is the second bit rate based on the different treatment of each media flow by the network and the loading cell used for the transmissions. In some embodiments, transmission of the second quality level encoded media content may be part of a background process. In various embodiments, transmission of the second quality level encoded media content may be on a non-guaranteed bit rate (non-GBR) bearer or another best-effort type bearer.

Figure 10:
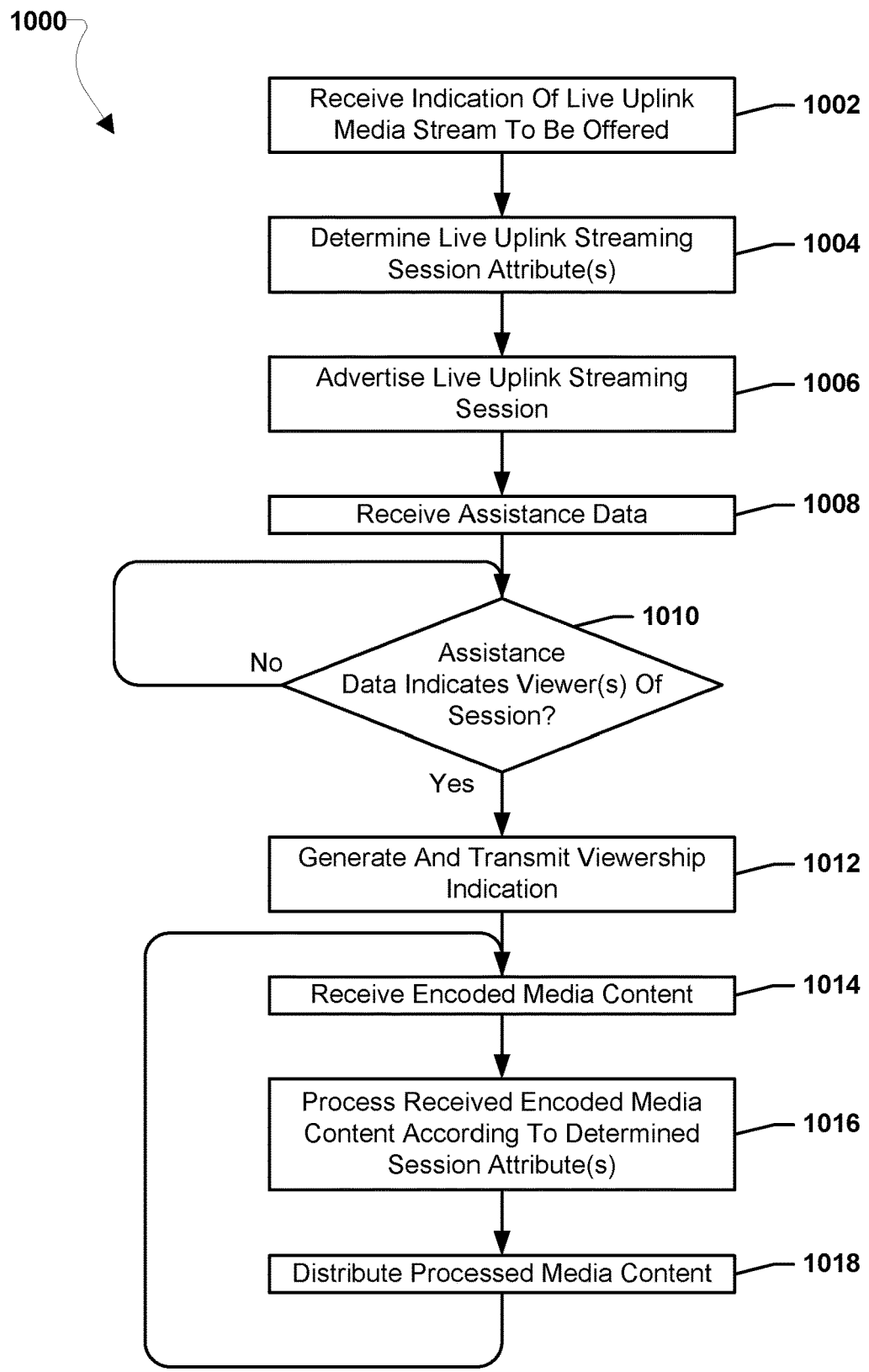
FIG. 10 is a process flow diagram illustrating an embodiment method for live uplink streaming.

FIG. 10 illustrates an embodiment method 1000 for live uplink streaming. The operations of the method 1000 may be performed by a processor of a live uplink streaming sink computing device, such as live uplink streaming sink computing device 112. In various embodiments, the operations of the method 1000 may be performed in conjunction with the operations of any of the methods 400 (FIG. 4), 500 (FIG. 5), 600 (FIG. 6), 700 (FIG. 7), 800 (FIG. 8), and 900 (FIG. 9).

With reference to FIGS. 1-10, the processor may receive an indication of a live uplink media stream to be offered. The indication of a live uplink media stream to be offered may be received from a live uplink streaming source computing device and/or from a server, such as a server of a live uplink streaming service provider. The indication of the live uplink media stream to be offered may identify one or more attributes of the live uplink streaming session, may identify characteristics of the media content to be uploaded in the live uplink streaming session, may indicate the location of the live uplink streaming source computing device, may indicate a latency requirement for the live uplink streaming session (e.g., end-to-end latency requirement, processing latency requirement, uplink latency requirement, downlink latency requirement, uplink latency requirement, etc.), may indicate a transmission and/or caching scheme to be used for the live uplink streaming session, etc.

In block 1004, the processor may determine one or more live uplink streaming session attributes. Live uplink streaming session attributes may be requirements indicating how media content for the uplink streaming session are to be handled by the live uplink streaming sink computing device. For example, live uplink streaming session attributes may indicate a latency requirement for the live uplink streaming session, may indicate a subject matter of the live uplink streaming session, may indicate QoS requirement for the live uplink streaming session, may indicate a transmission and/or caching scheme to be used for the live uplink streaming session by the live uplink streaming source computing device, may indicate format to be used for the live uplink streaming session, may indicate resolutions to be used for the live uplink streaming session, may indicating image stitching to be used for the live uplink streaming session, etc. The processor may determine one or more live uplink streaming session attributes based on settings at the live uplink streaming sink computing device, signaling from the live uplink streaming source computing device, and/or signaling from another computing device, such as a server of a live uplink streaming service provider, etc.

In block 1006, the processor may advertise the live uplink streaming session. For example, the processor may indicate the live uplink streaming session is available for viewing to one or more live uplink streaming viewing computing devices.

In block 1008, the processor may receive assistance data. Assistance data may be data received by the live uplink streaming sink computing device associated with a live uplink streaming service. Assistance data may include popularity information for the live uplink streaming service and/or one or more live uplink streaming sessions. Assistance data may include viewership/interaction information for a live uplink streaming session, such as a number of subscribed live uplink streaming viewing computing devices, an indication of an engagement level of subscribed live uplink streaming viewing computing devices, an indication that one or more live uplink streaming viewing computing devices subscribed to a live uplink streaming session, an indication that one or more live uplink streaming viewing computing devices unsubscribed from the live uplink streaming session, etc. Assistance data may include location information, such as the location data (e.g., latitude and longitude, country, zip code, geographic area, zone, civic location, such as street, block, neighborhood, building, and/or landmark, etc.) of the live uplink streaming source computing device, location data of one or more live uplink streaming viewing computing devices, etc. Assistance data may include network condition data, such as unicast network load information, error rate, network equipment status, delivery times, end-to-end delay estimates, etc. Assistance data may include content characteristics, such as perceived reception demand, actual reception demand, viewership history, estimated audience size, estimated audience size based on correlated location and viewership history, etc. Assistance data may include input metadata regarding QoS requirements for the live uplink streaming service and/or one or more live uplink streaming sessions, such as permissible end-to-end delivery latency, target data rate, target error rate, required data rate, delay settings, network policy information, viewing quality settings, etc. Assistance data may include application level data from one or more live uplink streaming viewing computing devices. In various embodiments, assistance data may be received at a live uplink streaming sink computing device from one or more sources. As examples, the source of assistance data may be a network entity belonging to the same network operator providing the live uplink streaming sink computing device, the source assistance data may be a third party application server of a live uplink streaming service provider and/or the source of assistance data may be live uplink streaming viewing computing devices. Assistance data may be transmitted over various network interfaces. As examples, in the case of 3GPP networks, when the assistance data originates from a third-party application service provider, such interfaces may be the T8 reference point as defined in 3GPP TS 29.122, the xMB reference point as defined in 3GPP TS 29.116, the N33 reference point as defined in 3GPP TS 23.501, etc.

In determination block 1010, the processor may determine whether the assistance data indicates one or more viewers of the session. For example, the processor may determine whether the assistance data indicates at least one live uplink streaming viewing computing device subscribed or otherwise tuned to the live uplink streaming session to determine whether the assistance data indicates one or more viewers of the session. In response to determining the assistance data does not indicate any viewers of the session (i.e., determination block 1010="No"), the processor may continue to determine whether the assistance data indicates one or more viewers of the session in block 1010.

In response to determining the assistance data does indicate one or more viewers of the session (i.e., determination block 1010="Yes"), the processor may generate and transmit a viewership indication in block 1012. In various embodiments, a viewership indication may be generated and transmitted from a live uplink streaming sink computing device to a live uplink streaming source computing device. The viewership indication may be a message indicating that one or more live uplink streaming viewing computing devices have subscribed to a live uplink streaming session associated with the live uplink streaming source computing device. As one example, the viewership indication may be a message, such as a control message, indicating that at least one live uplink streaming viewing computing device has subscribed to the live uplink streaming session. The viewership indication may include an attribute indicating the total number of subscribed live uplink streaming viewing computing devices.

In block 1014, the processor may receive encoded media content from a live uplink streaming source computing device associated with the live uplink streaming session. The encoded media content may be received via any one of different HTTP based and/or IMS multimedia telephony technology based streaming technologies, including RTMP, MPEGDASH, CMAF, HLS, MMTP, UDP, MTSI, etc.

In block 1016, the processor may process the received encoded media content according to the determined one or more session attributes. Processing performed on the received encoded media content may include transcoding, media re-formatting, media combining, applying codecs, changing codec profiles or levels, changing resolution, changing frame rates, changing bitrates, media stitching, mixing, and/or other type processing. The determined session attributes may define the priority for the processing. For example, low latency requirements may result in encoded media content for some streams being processed before encoded media content for streams with higher latency requirements.

In block 1018, the processor may distribute the processed media content. The processor may distribute the processed media content using one or more delivery methods. For example, the processor may distribute the processed media content via unicast delivery methods, broadcast delivery methods, and/or both unicast delivery methods and broadcast delivery methods. In some embodiments, the delivery method for distributing the processed media content may be preselected for the media stream. In some embodiments, the delivery method for distributing the processed media content may be dynamically selected. For example, the live uplink streaming sink computing device may switch between unicast and broadcast delivery methods. Switching between unicast and broadcast delivery methods may be done in a manner similar to switching for MooD as defined in 3GPP TS 26.346. In various embodiments, a live uplink streaming sink computing device may distribute processed media to one or more live uplink streaming viewing computing devices using one or more selected delivery method. Unicast delivery methods may include PSS delivery. Broadcast delivery methods may include MBMS delivery. In various embodiments, a live uplink streaming sink computing device may distribute the processed media content according to one or more determined sessions attributes, such as a latency requirement (e.g., an end-to-end latency requirement, a downlink latency requirement, etc.), QoS requirement, etc. For example, low latency requirements may result in processed media content for some streams being transmitted by the live uplink streaming sink computing device to live uplink streaming viewing computing devices before processed media content for streams with higher latency requirements.

The processor may continuously receive, process, and distribute media content by continuously performing operations of blocks 1014, 1016, and 1018.

Figure 11:
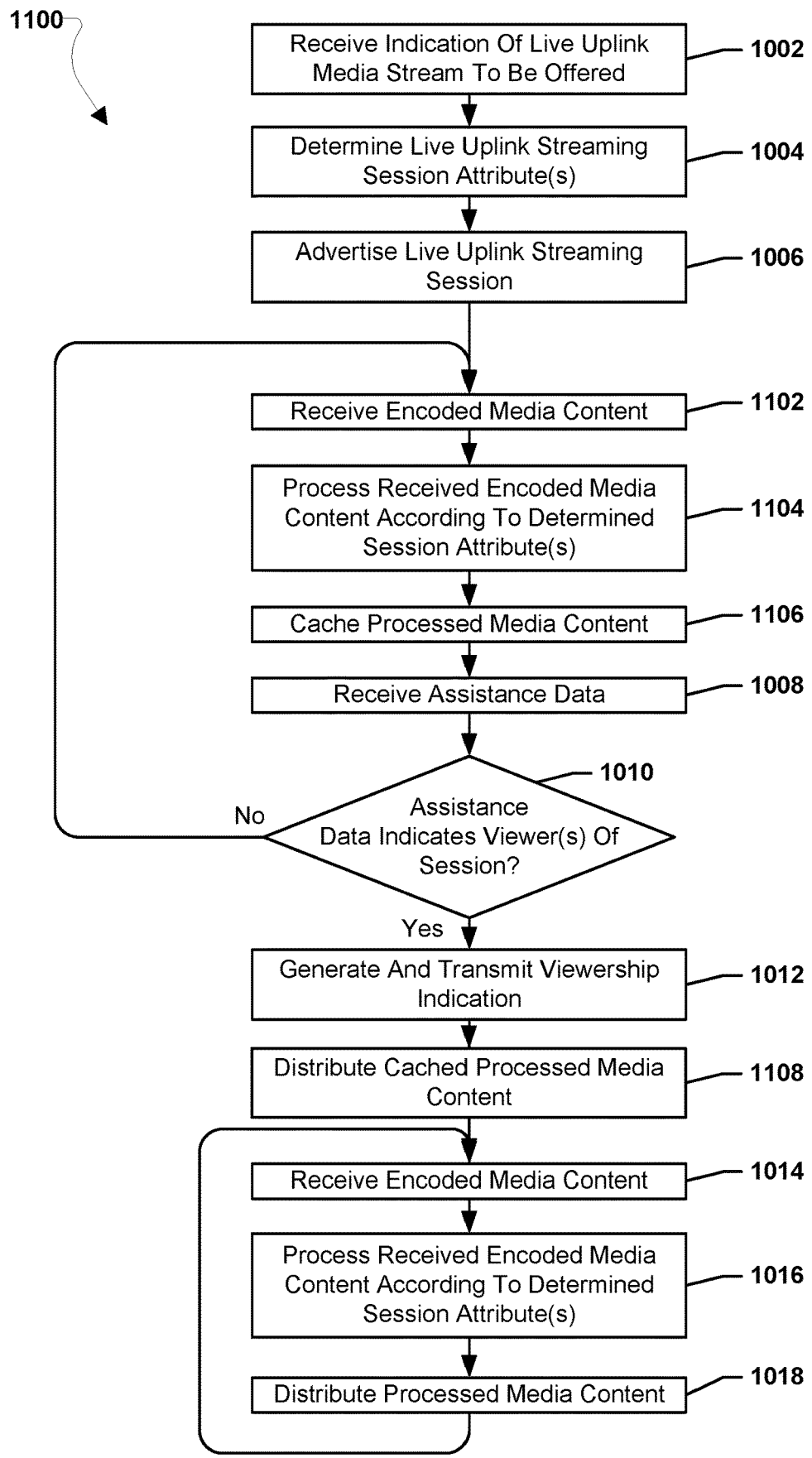
FIG. 11 is a process flow diagram illustrating another embodiment method for live uplink streaming.

FIG. 11 illustrates an embodiment method 1100 for live uplink streaming. The operations of the method 1100 may be performed by a processor of a live uplink streaming sink computing device, such as live uplink streaming sink computing device 112. In various embodiments, the operations of the method 1100 may be performed in conjunction with the operations of any of the methods 400 (FIG. 4), 500 (FIG. 5), 600 (FIG. 6), 700 (FIG. 7), 800 (FIG. 8), and 900 (FIG. 9).

With reference to FIGS. 1-11, in blocks 1002, 1004, and 1006, the processor may perform operations of like numbered blocks of the method 1000 as described. In block 1102, the processor may receive encoded media content from a live uplink streaming source computing device associated with the live uplink streaming session. The encoded media content may be received via any one of different HTTP based and/or IMS multimedia telephony technology based streaming technologies, including RTMP, MPEGDASH, CMAF, HLS, MMTP, UDP, MTSI, etc.

In block 1104, the processor may process the received encoded media content according to the determined one or more session attributes. Processing performed on the received encoded media content may include transcoding, media re-formatting, media combining, applying codecs, changing codec profiles or levels, changing resolution, changing frame rates, changing bitrates, media stitching, mixing, and/or other type processing. The determined session attributes may define the priority for the processing. For example, low latency requirements may result in encoded media content for some streams being processed before encoded media content for streams with higher latency requirements.

In block 1106, the processor may cache the processed media content. Caching the processed media content may include storing the processed media content in a memory of the live uplink streaming sink computing device, such as a buffer.

In blocks 1008, 1010, and 1012, the processor may perform operations of like numbered blocks of the method 1000 as described. In block 1108, the processor may distribute the cached processed media content. The processor may distribute the cached processed media content using one or more delivery methods. For example, the processor may distribute the cached processed media content via unicast delivery methods, broadcast delivery methods, and/or both unicast delivery methods and broadcast delivery methods. In some embodiments, the delivery method for distributing the cached processed media content may be preselected for the media stream. In some embodiments, the delivery method for distributing the cached processed media content may be dynamically selected. For example, the live uplink streaming sink computing device may switch between unicast and broadcast delivery methods. Switching between unicast and broadcast delivery methods may be done in a manner similar to switching for MooD as defined in 3GPP TS 26.346. In various embodiments, a live uplink streaming sink computing device may distribute cached processed media to one or more live uplink streaming viewing computing devices using one or more selected delivery method. Unicast delivery methods may include PSS delivery. Broadcast delivery methods may include MBMS delivery. In various embodiments, a live uplink streaming sink computing device may distribute the cached processed media content according to one or more determined sessions attributes, such as a latency requirement (e.g., an end-to-end latency requirement, a downlink latency requirement, etc.), QoS requirement, etc. For example, low latency requirements may result in the media content for some streams being transmitted by the live uplink streaming sink computing device to live uplink streaming viewing computing devices before media content for streams with higher latency requirements.

In blocks 1014, 1016, and 1018, the processor may perform operations of like numbered blocks of the method 1000 as described.

Figure 12:
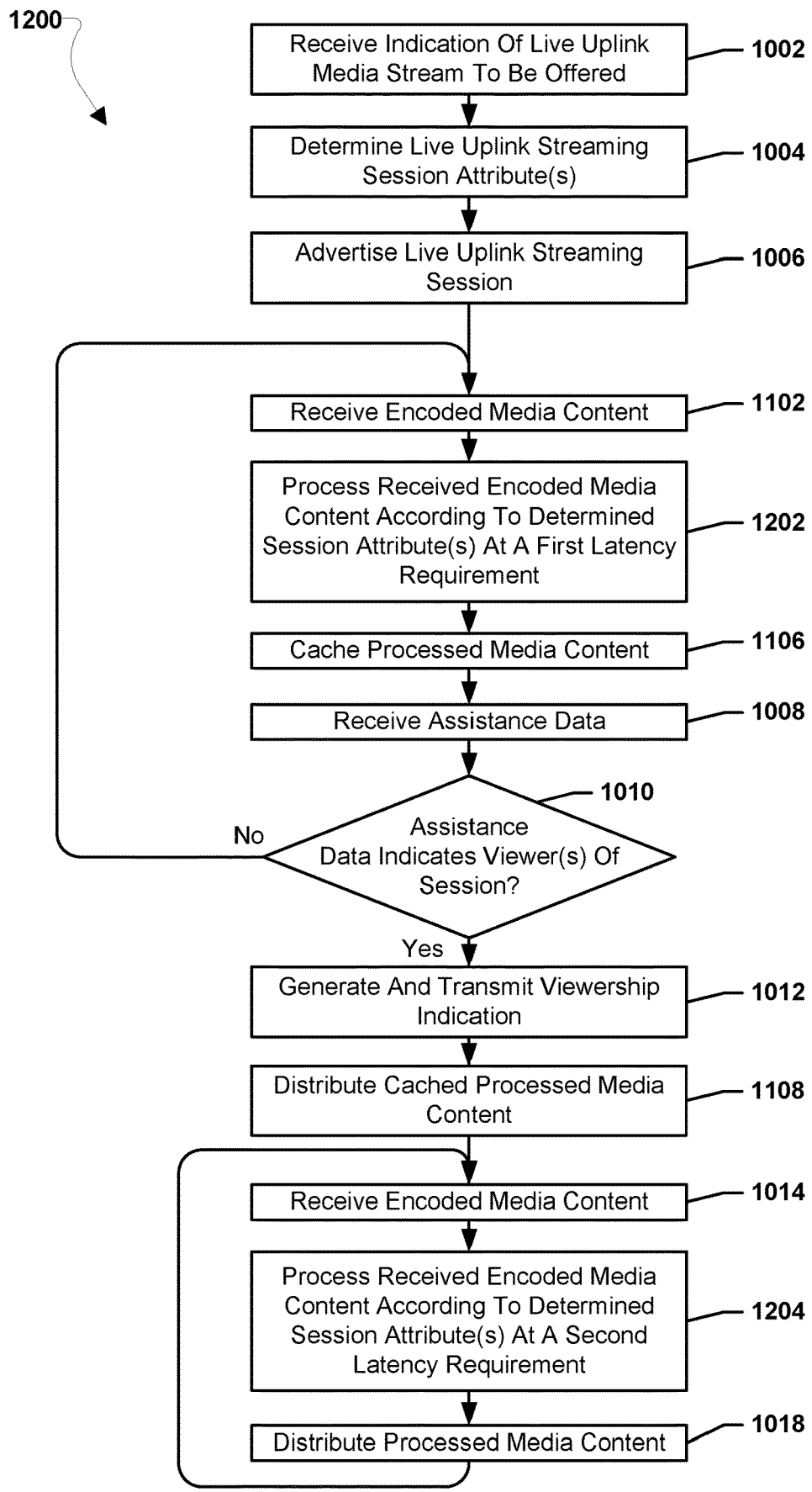
FIG. 12 is a process flow diagram illustrating another embodiment method for live uplink streaming.

FIG. 12 illustrates an embodiment method 1200 for live uplink streaming. With reference to FIGS. 1-12, the operations of the method 1200 may be performed by a processor of a live uplink streaming sink computing device, such as live uplink streaming sink computing device 112. In various embodiments, the operations of the method 1200 may be performed in conjunction with the operations of any of the methods 400 (FIG. 4), 500 (FIG. 5), 600 (FIG. 6), 700 (FIG. 7), 800 (FIG. 8), and 900 (FIG. 9).

In blocks 1002, 1004, 1006, and 1102 the processor may perform operations of like numbered blocks of the method 1100 as described. In block 1202, the processor may process the received encoded media content according to one or more determined session attributes at a first latency requirement. Processing performed on the received encoded media content may include transcoding, media re-formatting, media combining, applying codecs, changing codec profiles or levels, changing resolution, changing frame rates, changing bitrates, media stitching, mixing, and/or other type processing. The determined session attributes may define the priority for the processing. For example, low latency requirements may result in encoded media content for some streams being processed before encoded media content for streams with higher latency requirements. In various embodiments, the first latency requirement may be a higher latency requirement defining the priority for processing of the received encoded media content as of lower priority than streams with lower latency requirements. In this manner, the processor may initially apply less processing resources to the encoded media content.

In blocks 1008, 1010, 1012, 1108, and 1014 the processor may perform operations of like numbered blocks of the method 1100 as described. In block 1204, the processor may process the received encoded media content according to one or more determined session attributes at a second latency requirement. Processing performed on the received encoded media content may include transcoding, media re-formatting, media combining, applying codecs, changing codec profiles or levels, changing resolution, changing frame rates, changing bitrates, media stitching, mixing, and/or other type processing. The determined session attributes may define the priority for the processing. For example, low latency requirements may result in encoded media content for some streams being processed before encoded media content for streams with higher latency requirements. In various embodiments, the second latency requirement may be a different latency requirement than used in the processing of block 1202. In some embodiments, the second latency requirement may be a lower latency requirement defining the priority for processing of the received encoded media content as of higher priority than that of the first latency requirement. In this manner, the processor may apply more processing resources to the encoded media content after assistance data analytics (or downlink data analytics) indicate actual viewers for the session.

In block 1018, the processor may perform like numbered operations of the method 1000.

Figure 13A:
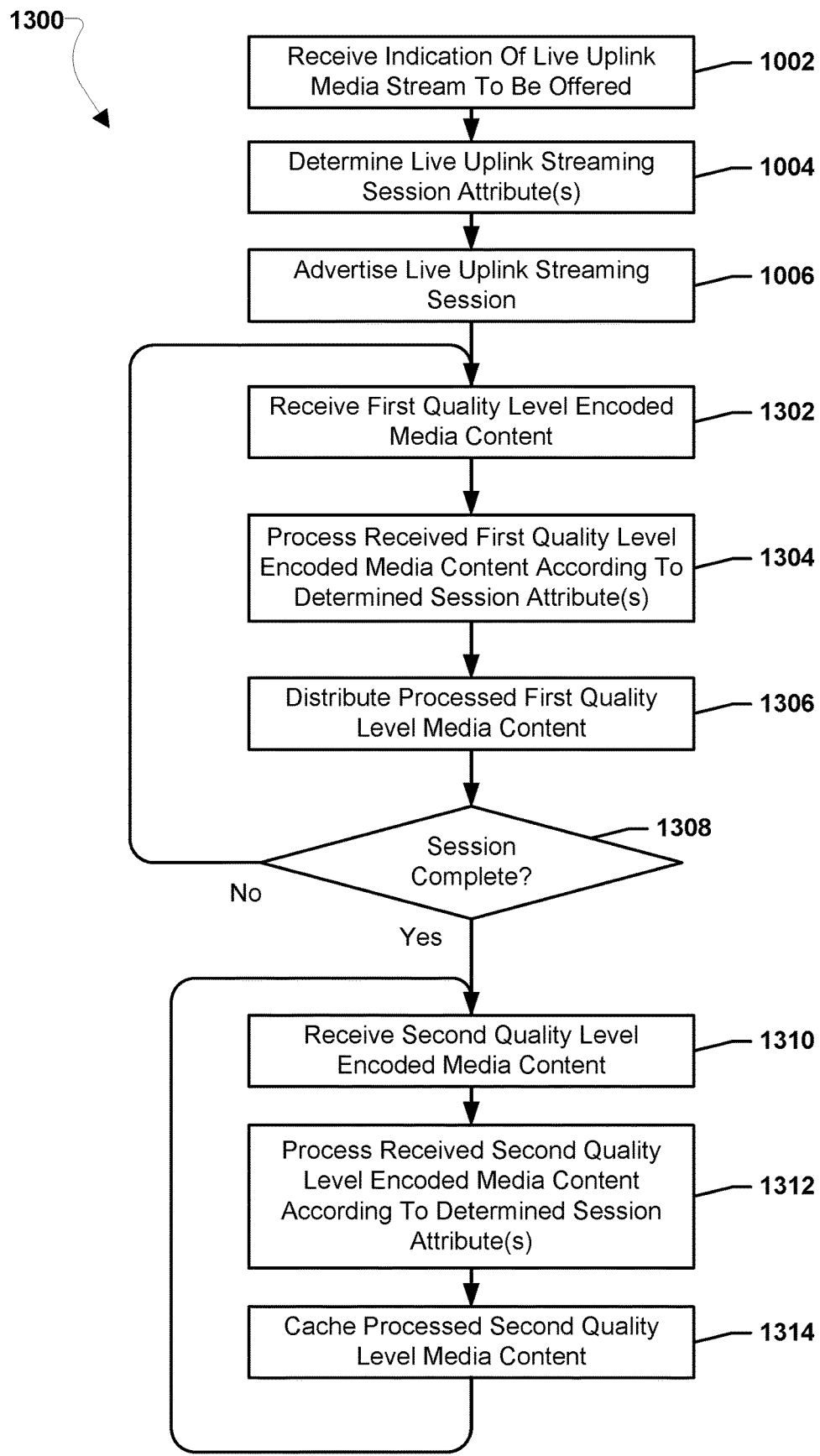
FIG. 13A is a process flow diagram illustrating another embodiment method for live uplink streaming.

FIG. 13A illustrates an embodiment method 1300 for live uplink streaming. The operations of the method 1300 may be performed by a processor of a live uplink streaming sink computing device, such as live uplink streaming sink computing device 112. In various embodiments, the operations of the method 1300 may be performed in conjunction with the operations of any of the methods 400 (FIG. 4), 500 (FIG. 5), 600 (FIG. 6), 700 (FIG. 7), 800 (FIG. 8), and 900 (FIG. 9).

With reference to FIGS. 1-13A, in blocks 1002, 1004, and 1006, the processor may perform operations of like numbered blocks of the method 1000 as described. In block 1302, the processor may receive first quality level encoded media content from a live uplink streaming source computing device associated with the live uplink streaming session. The first quality level encoded media content may be received via any one of different HTTP based and/or IMS multimedia telephony technology based streaming technologies, including RTMP, MPEGDASH, CMAF, HLS, MMTP, UDP, MTSI, etc.

In block 1304, the processor may process the received first quality encoded media content according to the determined one or more session attributes. Processing performed on the received first quality level encoded media content may include transcoding, media re-formatting, media combining, applying codecs, changing codec profiles or levels, changing resolution, changing frame rates, changing bitrates, media stitching, mixing, and/or other type processing. The determined session attributes may define the priority for the processing. For example, low latency requirements may result in encoded media content for some streams being processed before encoded media content for streams with higher latency requirements.

In block 1306, the processor may distribute the processed first quality level media content. The processor may distribute the processed first quality level media content using one or more delivery methods. For example, the processor may distribute the processed media content via unicast delivery methods, broadcast delivery methods, and/or both unicast delivery methods and broadcast delivery methods. In some embodiments, the delivery method for distributing the processed media content may be preselected for the media stream. In some embodiments, the delivery method for distributing the processed media content may be dynamically selected. For example, the live uplink streaming sink computing device may switch between unicast and broadcast delivery methods. Switching between unicast and broadcast delivery methods may be done in a manner similar to switching for MooD as defined in 3GPP TS 26.346. In various embodiments, a live uplink streaming sink computing device may distribute processed media to one or more live uplink streaming viewing computing devices using one or more selected delivery method. Unicast delivery methods may include PSS delivery. Broadcast delivery methods may include MBMS delivery. In various embodiments, a live uplink streaming sink computing device may distribute the processed first quality level media content according to one or more determined sessions attributes, such as a latency requirement (e.g., an end-to-end latency requirement, a downlink latency requirement, etc.), QoS requirement, etc. For example, low latency requirements may result in the media content for some streams being transmitted by the live uplink streaming sink computing device to live uplink streaming viewing computing devices before media content for streams with higher latency requirements.

In determination block 1308, the processor may determine whether the session is complete. For example, the processor may determine whether an end session indication was received to determine whether the session was complete. In response to determining that the session is on-going (i.e., determination block 1308="No"), the processor may continue to receive first quality level encoded media content at block 1302.

In response to determining that the session is complete (i.e., determination block 1308="Yes"), the processor may receive second quality level encoded media content from a live uplink streaming source computing device associated with the live uplink streaming session in block 1310. The second quality level encoded media content may be media content encoded at a different quality level (e.g., a different encoding bit rate, etc) than the first quality encoded media content. In some embodiments, the second quality level may be a higher quality level than the first quality level. The second quality level encoded media content may be received via any one of different HTTP based and/or IMS multimedia telephony technology based streaming technologies, including RTMP, MPEGDASH, CMAF, HLS, MMTP, UDP, MTSI, etc.

In block 1312, the processor may process the received second quality level encoded media content according to the determined one or more session attributes. Processing performed on the received second quality level encoded media content may include transcoding, media re-formatting, media combining, applying codecs, changing codec profiles or levels, changing resolution, changing frame rates, changing bitrates, media stitching, mixing, and/or other type processing. The determined session attributes may define the priority for the processing. For example, low latency requirements may result in encoded media content for some streams being processed before encoded media content for streams with higher latency requirements. In embodiments in which the second quality level is lower than the first quality level, processing the second quality level encoded media may take less time than the processing of the first quality level encoded media. In embodiments in which the second quality level is higher than the first quality level, processing the second quality level encoded media may take more time than the processing of the first quality level encoded media. In some embodiments, processing the second quality level encoded media content may be given less priority than processing the first quality level encoded media content data.

In block 1314, the processor may cache the processed second quality level media content. Caching the processed second quality level media content may include storing the processed second quality level media content in a memory of the live uplink streaming sink computing device, such as a buffer. In this manner, the cached processed second quality level media content may be provided at a later time as video-on-demand content.

Figure 13B:
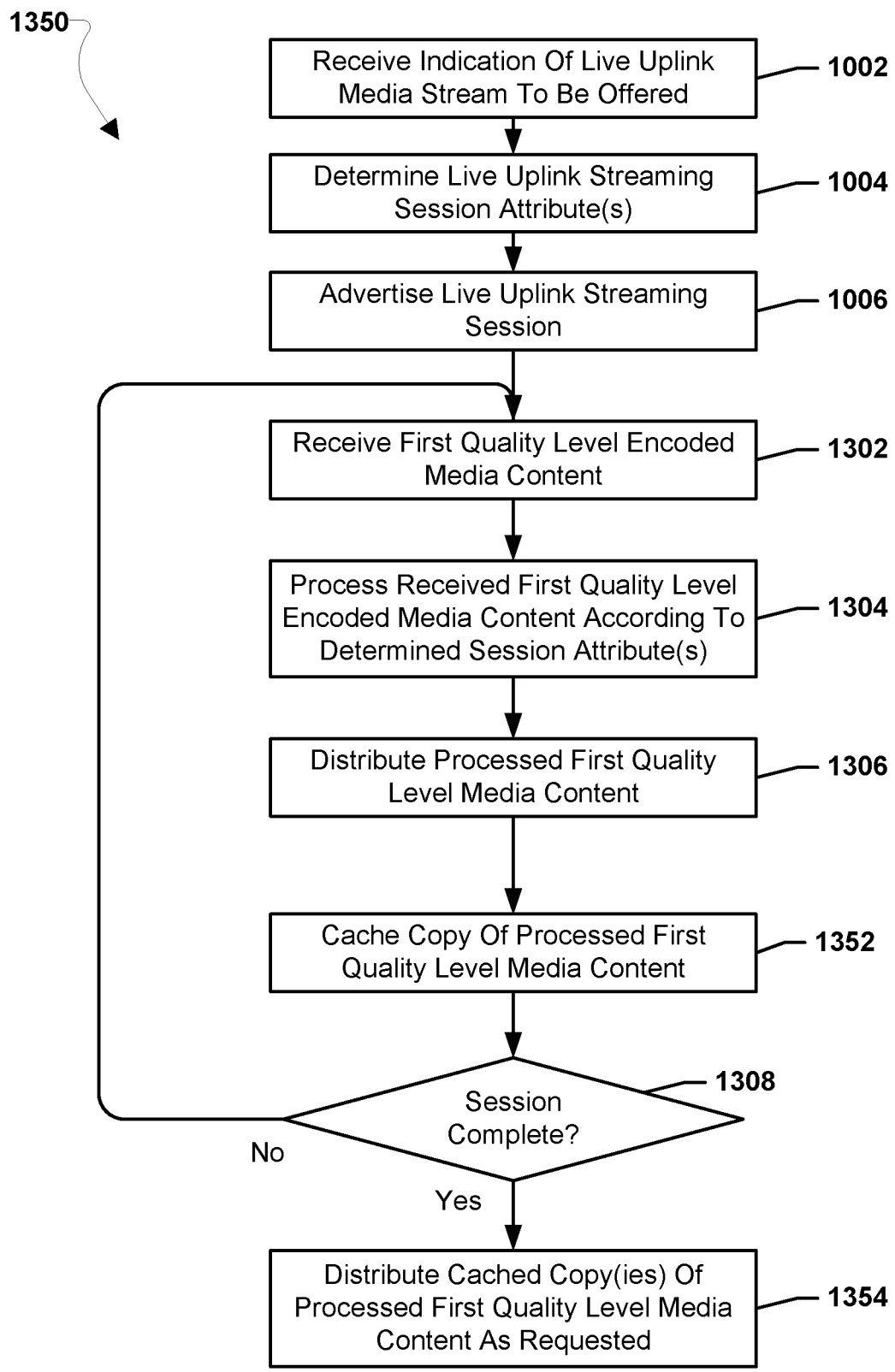
FIG. 13B is a process flow diagram illustrating another embodiment method for live uplink streaming.

FIG. 13B illustrates an embodiment method 1350 for live uplink streaming. The operations of the method 1350 may be performed by a processor of a live uplink streaming sink computing device, such as live uplink streaming sink computing device 112. In various embodiments, the operations of the method 1350 may be performed in conjunction with the operations of any of the methods 400 (FIG. 4), 500 (FIG. 5), 600 (FIG. 6), 700 (FIG. 7), 800 (FIG. 8), and 900 (FIG. 9).

With reference to FIGS. 1-13B, in blocks 1002, 1004, and 1006, the processor may perform operations of like numbered blocks of the method 1000 as described. In some embodiments, the indication of the live uplink media stream to be offered and/or the live uplink streaming session attributes may indicate that the live uplink streaming source computing device is requesting that the live uplink streaming source computing device store a copy of the processed media content for the live uplink streaming session for distribution to viewers requesting the content after the live uplink streaming session is complete. In such embodiments, the live uplink streaming sink computing device may cache a copy of the media content as it is processed for distribution to viewers after the live streaming session is complete.

In blocks 1302, 1304, and 1306, the processor may perform operations like numbered blocks of the method 1300 as described. In block 1352, the processor may cache a copy of the processed first quality level media content.

Caching the processed first quality level media content may include storing the processed first quality level media content in a memory of the live uplink streaming sink computing device, such as a buffer. In this manner, the cached processed first quality level media content may be provided at a later time to viewers requesting the content after the completion of the session. For example, the cached processed first quality level media content may be provided as video-on-demand content to viewers after the session is completed.

In determination block 1308, the processor may perform operations of the like numbered block of the method 1300 as described. In response to determining that the session is complete (i.e., determination block 1308="Yes"), the processor may distribute one or more cached copies of the processed first quality level media content as requested in block 1354. In this manner, the cached processed first quality level media content may be provided at a later time to viewers requesting the content after the completion of the session. For example, the cached processed first quality level media content may be provided as video-on-demand content to viewers after the session is completed. In various embodiments, a live uplink streaming sink computing device may distribute the cached copies of the processed media content according to one or more determined sessions attributes, such as a latency requirement (e.g., an end-to-end latency requirement, a downlink latency requirement, etc.), QoS requirement, etc. For example, low latency requirements may result in the media content for some streams being transmitted by the live uplink streaming sink computing device to live uplink streaming viewing computing devices before media content for streams with higher latency requirements.

Figure 14:
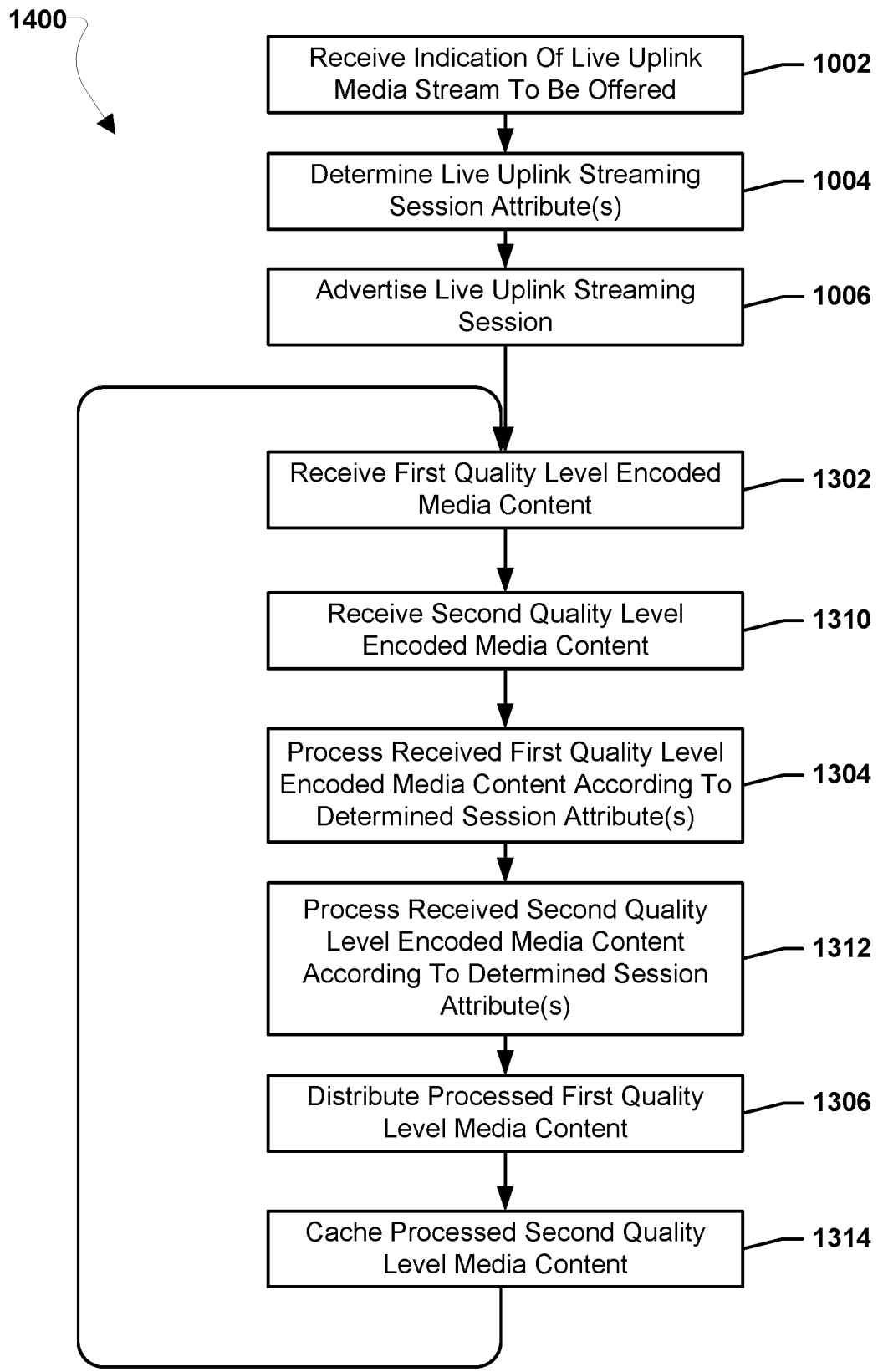
FIG. 14 is a process flow diagram illustrating another embodiment method for live uplink streaming.

FIG. 14 illustrates an embodiment method 1400 for live uplink streaming. The operations of the method 1400 may be performed by a processor of a live uplink streaming sink computing device, such as live uplink streaming sink computing device 112. In various embodiments, the operations of the method 1400 may be performed in conjunction with the operations of any of the methods 400 (FIG. 4), 500 (FIG. 5), 600 (FIG. 6), 700 (FIG. 7), 800 (FIG. 8), and 900 (FIG. 9). The method 1400 may be similar to method 1300 described with reference to FIG. 13A, except that in method 1400 the processor may not wait for the completion of the session to process and cache the second quality level media content.

With reference to FIGS. 1-14, in blocks 1302, 1310, 1304, 1312, 1306, and 1314, the processor may perform operations of like numbered blocks of the method 1300 as described.

Figure 15:
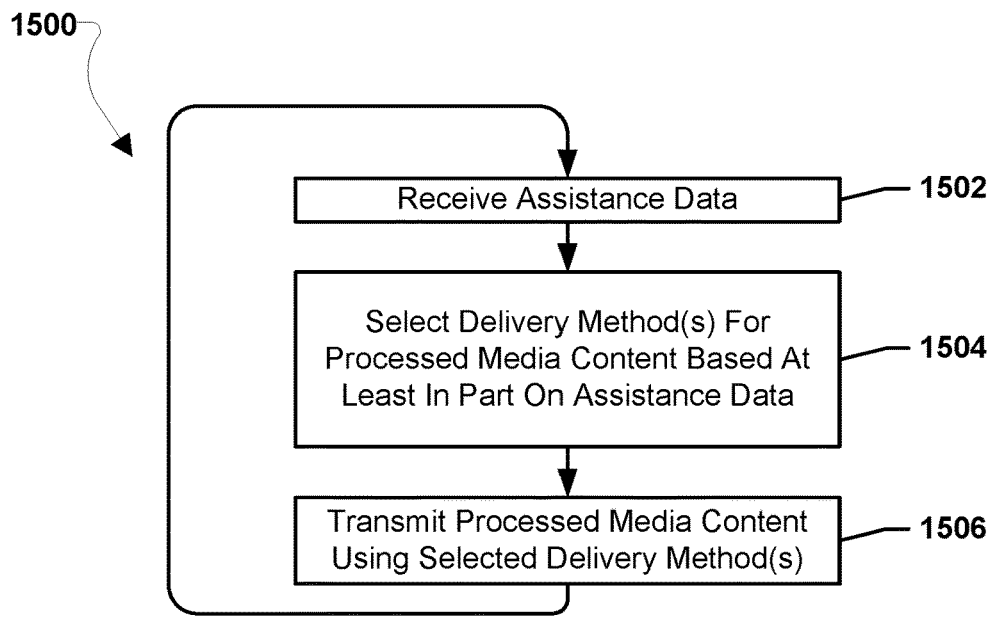
FIG. 15 is a process flow diagram illustrating an embodiment method for distributing media in a live uplink streaming service.

FIG. 15 illustrates an embodiment method 1500 for distributing media in a live uplink streaming service. With reference to FIGS. 1-15, the operations of the method 1400 may be performed by a processor of a live uplink streaming sink computing device, such as live uplink streaming sink computing device 112. In various embodiments, the operations of the method 1500 may be performed as part of operations to distribute processed media content in any of the methods 1000 (FIG. 10), 1100 (FIG. 11), 1200 (FIG. 12), 1300 (FIG. 13A), 1350 (FIG. 13B), and 1400 (FIG. 14).

In block 1502, the processor may receive assistance data. Assistance data may be data received by the live uplink streaming sink computing device associated with a live uplink streaming service. Assistance data may include popularity information for the live uplink streaming service and/or one or more live uplink streaming sessions. Assistance data may include viewership/interaction information for a live uplink streaming session, such as a number of subscribed live uplink streaming viewing computing devices, an indication of an engagement level of subscribed live uplink streaming viewing computing devices, an indication that one or more live uplink streaming viewing computing devices subscribed to a live uplink streaming session, an indication that one or more live uplink streaming viewing computing devices unsubscribed from the live uplink streaming session, etc. Assistance data may include location information, such as the location data (e.g., latitude and longitude, country, zip code, geographic area, zone, civic location, such as street, block, neighborhood, building, and/or landmark, etc.) of the live uplink streaming source computing device, location data of one or more live uplink streaming viewing computing devices, etc. Assistance data may include network condition data, such as unicast network load information, error rate, network equipment status, delivery times, end-to-end delay estimates, etc. Assistance data may include content characteristics, such as perceived reception demand, actual reception demand, viewership history, estimated audience size, estimated audience size based on correlated location and viewership history, etc. Assistance data may include input metadata regarding QoS requirements for the live uplink streaming service and/or one or more live uplink streaming sessions, such as permissible end-to-end delivery latency, target data rate, target error rate, required data rate, delay settings, network policy information, viewing quality settings, etc. Assistance data may include application level data from one or more live uplink streaming viewing computing devices. In various embodiments, assistance data may be received at a live uplink streaming sink computing device from one or more sources. As examples, the source of assistance data may be a network entity belonging to the same network operator providing the live uplink streaming sink computing device, the source assistance data may be a third party application server of a live uplink streaming service provider and/or the source of assistance data may be live uplink streaming viewing computing devices. Assistance data may be transmitted over various network interfaces. As examples, in the case of 3GPP networks, when the assistance data originates from a third-party application service provider, such interfaces may be the T8 reference point as defined in 3GPP TS 29.122, the xMB reference point as defined in 3GPP TS 29.116, the N33 reference point as defined in 3GPP TS 23.501, etc.

In block 1504, the processor may select one or more delivery method for the processed media content based at least in part on the assistance data. In various embodiments, the one or more delivery methods may be unicast delivery methods, broadcast delivery methods, and/or both unicast and broadcast delivery methods. In some embodiments, selection of unicast delivery methods or broadcast delivery methods for distribution of content to live uplink streaming viewing computing devices may be a static selection, such as a selection made at the start of a live uplink streaming session based on pre-configuration of the live uplink streaming sink computing device. In some embodiments, selection of unicast delivery methods or broadcast delivery methods for distribution of content to live uplink streaming viewing computing devices may be a dynamic selection, such as a selection made more than once during a live uplink streaming session. For example, the live uplink streaming sink computing device may switch between unicast and broadcast delivery methods. Switching between unicast and broadcast delivery methods may be done in a manner similar to MBMS operation on Demand (MooD) as defined in 3GPP Technical Specification (TS) 26.346. In some embodiments, unicast delivery may be via PSS. In some embodiments, broadcast delivery may be via MBMS. As one example, when the number of live uplink streaming viewing computing devices subscribed to a session is low, the processor may select unicast delivery methods as the unicast delivery to a few computing devices may not strain the unicast capacity. As another example, when the number of live uplink streaming viewing computing devices subscribed to a session is high, the processor may select broadcast delivery methods as the unicast capacity in the network may not be conducive to supporting the high number of viewing computing devices while meeting QoS goals for the session.

In block 1506, the processor may transmit the processed media content using the one or more selected delivery methods. In various embodiments, a live uplink streaming sink computing device may transmit the processed media content using the one or more selected delivery methods according to one or more determined sessions attributes, such as a latency requirement (e.g., an end-to-end latency requirement, a downlink latency requirement, etc.), QoS requirement, etc. For example, low latency requirements may result in the media content for some streams being transmitted by the live uplink streaming sink computing device to live uplink streaming viewing computing devices before media content for streams with higher latency requirements.

Figure 16:
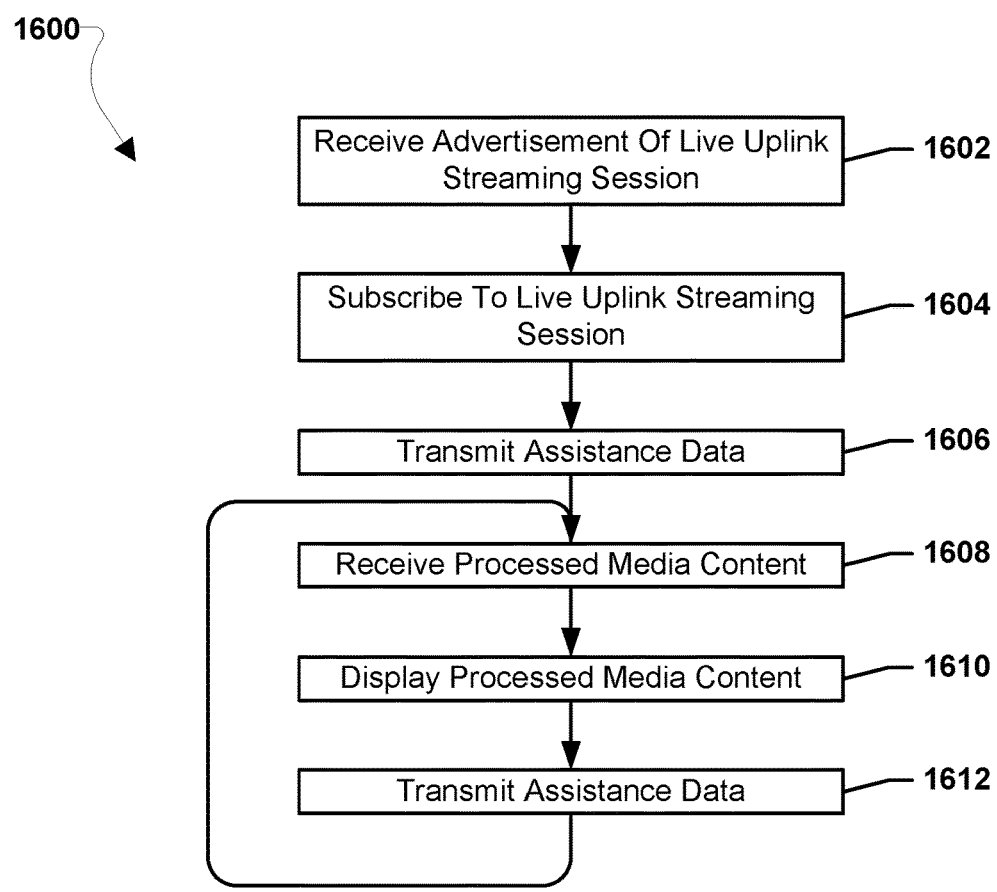
FIG. 16 is a process flow diagram illustrating an embodiment method for live uplink streaming.

FIG. 16 is a process flow diagram illustrating an embodiment method 1600 for live uplink streaming. With reference to FIGS. 1-16, the operations of the method 1600 may be performed by a processor of a live uplink streaming viewing computing device, such as live uplink streaming viewing computing device 116, 119. In various embodiments, the operations of the method 1600 may be performed in conjunction with any of the methods 400 (FIG. 4), 500 (FIG. 5), 600 (FIG. 6), 700 (FIG. 7), 800 (FIG. 8), 900 (FIG. 9), 1000 (FIG. 10), 1100 (FIG. 11), 1200 (FIG. 12), 1300 (FIG. 13A), 1350 (FIG. 13B), 1400 (FIG. 14), and 1500 (FIG. 15).

In block 1602, the processor may receive an advertisement of a live uplink streaming session. For example, the advertisement may be a message indicating the live uplink streaming session is available to subscribe or otherwise tune to.

In block 1604, the processor may subscribe to the live uplink streaming session. For example, the processor may transmit a message requesting media content for the streaming session. In block 1606, the processor may transmit assistance data. Assistance data may include data location information, such as the location data (e.g., latitude and longitude, country, zip code, geographic area, zone, civic location, such as street, block, neighborhood, building, and/or landmark, etc.) of the live uplink streaming viewing computing device. Assistance data may include viewership history data for the live uplink streaming viewing computing device.

In block 1608, the processor may receive processed media content from the live uplink streaming sink computing device. The processed media content may be received via unicast delivery methods or broadcast delivery methods. For example, the processed media content may be received via unicast PSS delivery or may be received via broadcast MBMS delivery. In some embodiments, the delivery method may change during a live uplink streaming session. For example, the delivery method may transition from unicast to broadcast or broadcast to unicast.

In block 1610, the processor may display the processed media on the live uplink streaming sink computing device.

In block 1612, the processor may transmit assistance data. Assistance data may include data location information, such as the location data (e.g., latitude and longitude, country, zip code, geographic area, zone, civic location, such as street, block, neighborhood, building, and/or landmark, etc.) of the live uplink streaming viewing computing device. Assistance data may include viewership history data for the live uplink streaming viewing computing device, such as whether the play out of the media was paused, etc. Assistance data may include indicates of user engagement with the media content. Assistance data may include QoS metrics about the reception and/or play out of the media content, such as error rate, etc.

Figure 17:
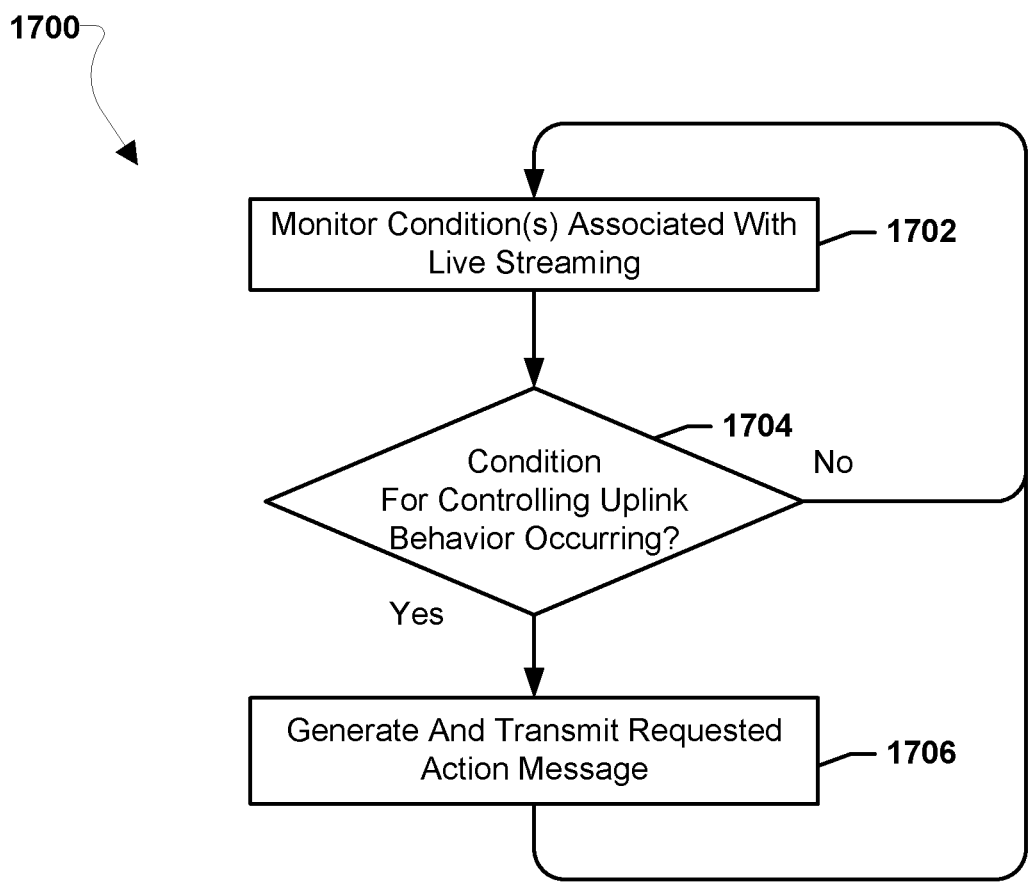
FIG. 17 is a process flow diagram illustrating an embodiment method for live uplink streaming.

FIG. 17 illustrates an embodiment method 1700 for live uplink streaming. With reference to FIGS. 1-17, the operations of the method 1700 may be performed by a processor of a live uplink streaming sink computing device, such as live uplink streaming sink computing device 112. In various embodiments, the operations of the method 1700 may be performed in conjunction with any of the methods 400 (FIG. 4), 500 (FIG. 5), 600 (FIG. 6), 700 (FIG. 7), 800 (FIG. 8), 900 (FIG. 9), 1000 (FIG. 10), 1100 (FIG. 11), 1200 (FIG. 12), 1300 (FIG. 13A), 1350 (FIG. 13B), 1400 (FIG. 14), 1500 (FIG. 15), and 1600 (FIG. 16).

In block 1702, the processor may monitor one or more conditions associated with live streaming. The conditions associated with live streaming may include various conditions that impact live streaming, such as one or more of viewership conditions, interactivity conditions, network conditions, processing conditions, connection conditions, and/or distribution conditions. An example of a connection condition may be the bandwidth/transmission bit-rate available to, or expected delay to be incurred by, a live uplink streaming sink computing device, for transmitting media content. An example of a distribution condition may be an indication of whether the downlink delivery of streaming content, transmitted by the live uplink streaming sink device to recipient viewers, employs unicast, multicast, or broadcast technology. The conditions may be monitored at least in part based on assistance data and/or other information received and/or generated by various sources.

In determination block 1704, the processor may determine whether a condition for controlling uplink behavior is occurring. The live uplink streaming sink computing device may determine whether a condition for controlling uplink behavior is occurring based on the one or more monitored conditions. In various embodiments, various sources and/or functions of the live uplink streaming sink computing device and/or in communication with the live uplink streaming sink computing device may indicate one or more conditions and the live uplink streaming sink computing device may translate those conditions into action/reason pairs to control and/or guide the sending behavior of a live uplink streaming source computing device. As an example, the live uplink streaming sink computing device may compare the one or more conditions to a table in a memory correlating conditions with requested actions and reasons, and in response to determining a match between two conditions, the live uplink streaming sink computing device may determine that one or more conditions for controlling and/or guiding the sending behavior of a live uplink streaming source computing device are occurring.

In response to determining that a condition for controlling uplink behavior is not occurring (i.e., determination block 1704="No"), the processor may continue to monitor conditions associated with live streaming in block 1702.

In response to determining that a condition for controlling uplink behavior is occurring (i.e., determination block 1704="Yes"), the processor may generate and transmit a requested action message in block 1706. A requested action message may be a type of control message transmitted from a live uplink streaming sink computing device to a live uplink streaming source computing device to control or guide the live uplink streaming source computing device's behavior in transmission of encoded media content. In various embodiments, a requested action message may be a message indicating one or more requested actions for a live uplink streaming source computing device to take and one or more associated reasons for the live uplink streaming sink computing device requesting the live uplink streaming source computing device take the one or more requested actions. Example actions that may be indicated in a requested action message may include caching encoded media content at the live uplink streaming source computing device, transmitting encoded media content from the live uplink streaming source computing device, changing a quality level at which media content is encoded at by the live uplink streaming source computing device, changing a transmission bit rate used for transmitting encoded media content by the live uplink streaming source computing device, etc. Example reasons that may be indicated in a requested action message may include network congestion, QoS requirements, viewership absence, viewership presence, current (or expected) engagement presence, availability of excess bandwidth on a non-guaranteed bit rate (non-GBR) bearer, etc. A requested action and the associated reason for that requested action may be an action/reason pair. In various embodiments, a requested action message may include an indication of an action/reason pair, such as in a message body, in a message header, etc. In various embodiments, the indication of an action/reason pair may be an action and reason code. In various embodiments, the indication of the action/reason pair may be indicated as optional or mandatory in the requested action message. For example, optional action/reason pairs may be identified as assistance type messages. As another example, mandatory messages may be identified as enforcement type messages. As an example, the requested action message may include an indication of an action/reason pair associated/correlated with the one or more conditions determined to be occurring. In various embodiments, a requested action message may indicate more than one action for a reason, more than one reason for an action, and/or more than one action and more than one reason pairing. In embodiments in which more than one action are indicated in a requested action message, one action may be indicated as mandatory while another action is indicated as optional. In embodiments in which two or more actions are indicated in a requested action message, mandatory actions may be given preference for implementation over optional actions.

As a specific example, a processing function of a live uplink streaming sink computing device may provide information to a FLUS control function of the live uplink streaming sink computing device that a high media processing load in being experienced. The high media processing load condition may imply that the live uplink streaming sink computing device temporarily cannot handle additional incoming streams and that media streams with non-stringent delay requirements will be de-prioritized for processing. Based on the high media processing load condition, the FLUS control function may generate and transmit a requested action message with an action indication that when no viewer is present the live uplink streaming source computing device should transmit encoded media using a lower transmission bit rate and a reason indication of network congestion.

As another specific example, a distribution function of a live uplink streaming sink computing device may provide information to a FLUS control function of the live uplink streaming sink computing device that a broadcast is to be employed for delivery to live uplink viewing computing devices. Broadcast delivery may imply guaranteed high-quality delivery to recipients. Based on the broadcast delivery condition, the FLUS control function may generate and transmit a requested action message with an action indication to transmit media with a high quality encoding and a high transmission bit rate and a reason indication of guaranteed high quality edge to edge delivery.

As another specific example, a viewership measurement function of a live uplink streaming sink computing device may provide information to a FLUS control function of the live uplink streaming sink computing device that there is an absence of viewers or a presence of viewers. Absence of viewers may imply that it is wasteful for the FLUS source to upload entire video clips. Presence of viewers may imply that uploading is necessary to provide a low-latency "live" experience. Based on an absence of viewers, the FLUS control may generate and transmit a requested action message with an action indication to defer uplink streaming or only upload initial chunks until viewership is present and a reason indication of viewership absence. Based on a presence of viewers, the FLUS control function may generate and transmit a requested action message with an action indication to upload the entire or remaining contents of a cache and a reason indication of viewership presence.

As another specific example, an interactive engagement function of a live uplink streaming sink computing device may provide information to a FLUS control function of the live uplink streaming sink computing device that there is a presence of live engagement and an expectation of non-real time engagement with the content in the future. The presence of live engagement and an expectation of non-real time engagement with the content in the future may imply a requirement for low latency in uploading and edge to edge delivery and a desirability for high quality stored versions for future viewing and engagement. Based on the presence of live engagement and an expectation of non-real time engagement with the content in the future, the FLUS control function may generate and transmit a requested action message with an action indication to upload a lower quality if necessary while requesting low latency edge to edge delivery and in parallel to upload the same content at a high quality by relaxed delay requirement with a reason indication of engagement presence now and expected in the future.

As another specific example, network information may be provided to a FLUS control function that there is an availability of excess non-GBR bandwidth. The excess bandwidth may imply that in the absence of viewers, uploading is possible using a non-GBR bearer. Based on the excess bandwidth, the FLUS control function may generate and transmit a requested action message with an action indication to upload at lower-quality on a non-GBR bearer prior to awareness of active viewership and upload at a higher quality on a GBR bearer when aware of viewership presence with a reason indication of availability of non-GBR bandwidth.

The foregoing specific examples, are merely some combinations and permutations of conditions and translated recommendations that a FLUS control function may identify and make, and are provided merely as examples to better illustrate the aspects of the various embodiments, and are not intended to limit the various embodiments in any way. Other combinations and permutations of conditions and translated recommendations may be used with the various embodiments, and the other combinations and permutations of conditions and translated recommendations may be substituted in the various examples.

Figure 18A:
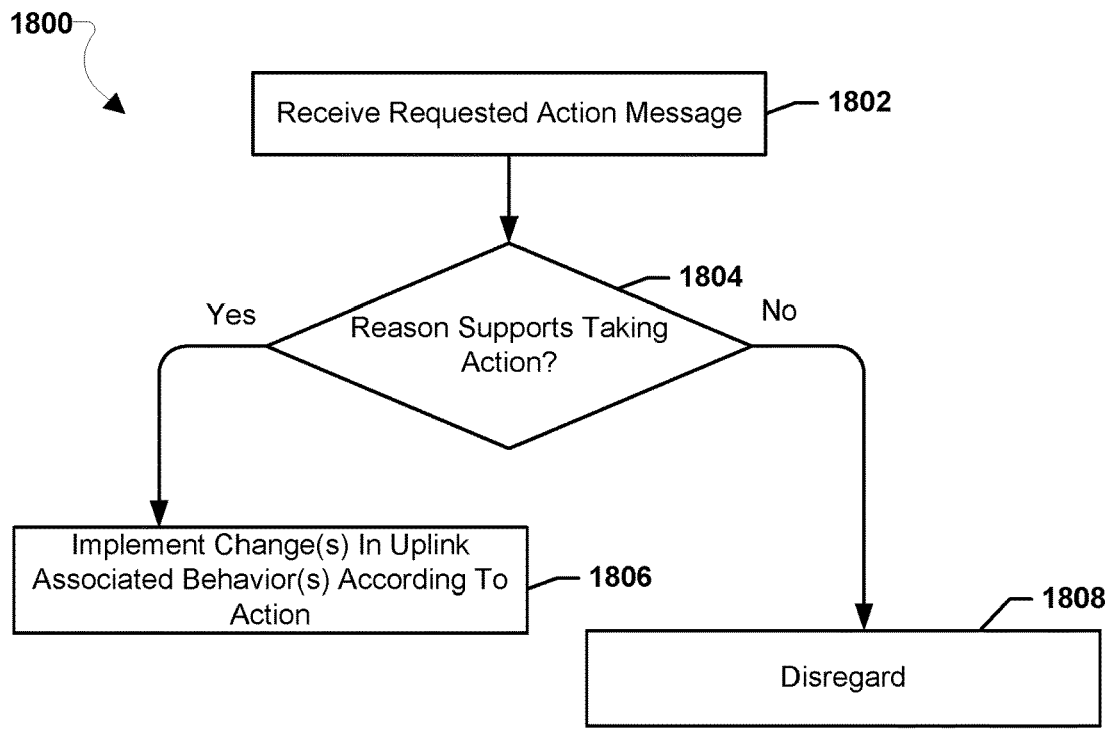
FIG. 18A is a process flow diagram illustrating an embodiment method for live uplink streaming.

FIG. 18A illustrates an embodiment method 1800 for live uplink streaming. With reference to FIGS. 1-18A, the operations of the method 1800 may be performed by a processor of a live uplink streaming source computing device, such as live uplink streaming source computing device 102. In various embodiments, the operations of the method 1800 may be performed in conjunction with any of the methods 400 (FIG. 4), 500 (FIG. 5), 600 (FIG. 6), 700 (FIG. 7), 800 (FIG. 8), 900 (FIG. 9), 1000 (FIG. 10), 1100 (FIG. 11), 1200 (FIG. 12), 1300 (FIG. 13A), 1350 (FIG. 13B), 1400 (FIG. 14), 1500 (FIG. 15), 1600 (FIG. 16), and 1700 (FIG. 17).

In block 1802, the processor may receive a requested action message. A requested action message may be a type of control message transmitted from a live uplink streaming sink computing device to a live uplink streaming source computing device to control or guide the live uplink streaming source computing device's behavior in transmission of encoded media content. In various embodiments, a requested action message may be a message indicating one or more requested actions for a live uplink streaming source computing device to take and one or more associated reasons for the live uplink streaming sink computing device requesting the live uplink streaming source computing device take the one or more requested actions.

Example actions that may be indicated in a requested action message may include caching encoded media content at the live uplink streaming source computing device, transmitting encoded media content from the live uplink streaming source computing device, changing a quality level at which media content is encoded at by the live uplink streaming source computing device, changing a transmission bit rate used for transmitting encoded media content by the live uplink streaming source computing device, etc. Example reasons that may be indicated in a requested action message may include network congestion, QoS requirements, viewership absence, viewership presence, current (or expected) engagement presence, availability of excess bandwidth on a non-guaranteed bit rate (non-GBR) bearer, etc. A requested action and the associated reason for that requested action may be an action/reason pair. In various embodiments, a requested action message may include an indication of an action/reason pair, such as in a message body, in a message header, etc. In various embodiments, the indication of an action/reason pair may be an action and reason code. In various embodiments, the indication of the action/reason pair may be indicated as optional or mandatory in the requested action message. For example, optional action/reason pairs may be identified as assistance type messages. As another example, mandatory messages may be identified as enforcement type messages. In various embodiments, a requested action message may indicate more than one action for a reason, more than one reason for an action, and/or more than one action and more than one reason pairing. In embodiments in which more than one action are indicated in a requested action message, one action may be indicated as mandatory while another action is indicated as optional. In embodiments in which two or more actions are indicated in a requested action message, mandatory actions may be given preference for implementation over optional actions.

In determination block 1804, the processor may determine whether the reason indicated in the requested action message supports taking the action indicated in the requested action message. For example, the live uplink streaming source computing device may receive the requested action message and determine whether the reason indicated by the action/reason pair supports taking the action indicated by the action/reason pair. As a specific example, the live uplink streaming source computing device processor may compare the reason indicated by the action/reason pair to a listing of authorized reasons for changing behavior stored in a memory, and determine that the action/reasons pair supports taking the action indicated by the action/reason pair in response to the reason indicating by the action/reason pair matching a reason in the listing of authorized reasons.

In response to determining that the reason does not support the action (i.e., determination block 1804="No"), the processor may disregard the received action message in block 1808.

In response to determining that the reason does support taking the action (i.e., determination block 1804="Yes"), the processor may implement one or more changes in one or more uplink behaviors according to the action in block 1806.

Figure 18B:
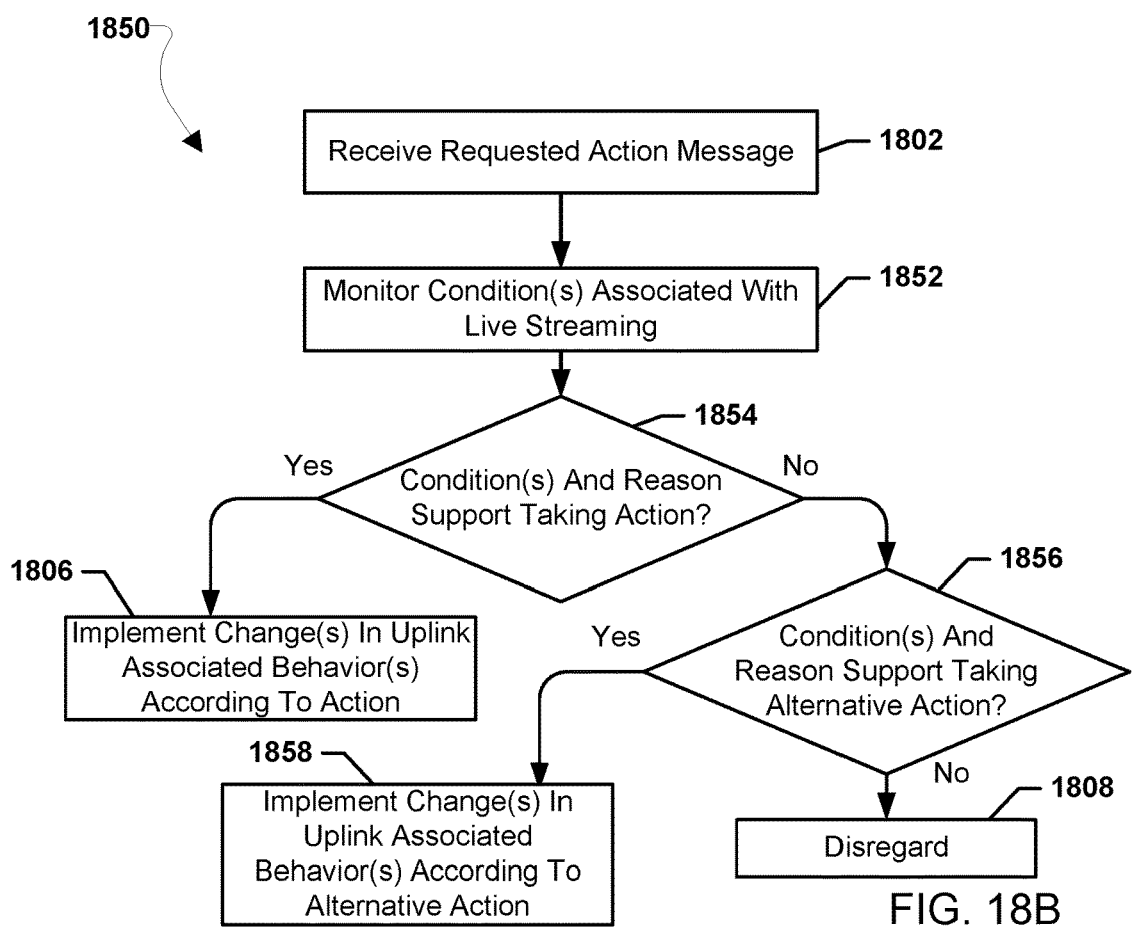
FIG. 18B is a process flow diagram illustrating an embodiment method for live uplink streaming.

FIG. 18B illustrates an embodiment method 1850 for live uplink streaming With reference to FIGS. 1-18B, the operations of the method 1850 may be performed by a processor of a live uplink streaming source computing device, such as live uplink streaming source computing device 102. In various embodiments, the operations of the method 1850 may be performed in conjunction with any of the methods 400 (FIG. 4), 500 (FIG. 5), 600 (FIG. 6), 700 (FIG. 7), 800 (FIG. 8), 900 (FIG. 9), 1000 (FIG. 10), 1100 (FIG. 11), 1200 (FIG. 12), 1300 (FIG. 13A), 1350 (FIG. 13B), 1400 (FIG. 14), 1500 (FIG. 15), 1600 (FIG. 16), and 1700 (FIG. 17).

As described with reference to method 1800 (FIG. 18A), the processor may receive a requested action message in block 1802. In block 1852, the processor may monitor one or more conditions associated with live streaming. The live uplink streaming source computing device processor may combine status information from multiple sources, such as its radio access network, a live uplink streaming sink computing device, a live uplink streaming viewing computing device, the live uplink streaming source computing device itself, etc., to monitor one or more conditions associated with live streaming. The processor may monitor conditions associated with connections used to upload encoded media to live uplink streaming sink computing devices, such as the type of connection in use, the type of connections available (e.g., Wi-Fi, 3G, 4G, 5G, guaranteed bit rate (GBR), non-guaranteed bit rate (non-GBR), etc.), the cost of a connection, the capacity of a connection, a priority associated with a connection, a capability of a connection, etc. The live uplink streaming source computing device processor may receive connection data associated with its own connections used to upload encoded media to live uplink streaming sink computing devices. For example, connection data may include cell location information (e.g., cell edge, cell center, etc.), network status information, etc. Additionally, the live uplink streaming source computing device processor may monitor conditions based on assistance data provided in control messages from a live uplink streaming sink computing device, such as viewership conditions, interactivity conditions, network conditions, processing conditions, and distribution conditions.

In determination block 1854, the processor may determine whether the one or more conditions and the reason indicated in the requested action message support taking the action indicated in the requested action message. The operations to determine whether the one or more conditions and the reason indicated support taking the action may be similar to the operations performed in block 1804 of method 1800 (FIG. 18A), except that the conditions may also be considered along with the reason. In this manner, the live uplink streaming source computing device processor may balance conditions as monitored at the live uplink streaming source computing device (e.g., own radio access network connection status, connection costs, connection capabilities, etc.) against the conditions impacting the uplink streaming service at the live uplink streaming sink computing device (e.g., processing delays, network congestion, etc.)

In response to determining that the one or more conditions and the reason indicated in the requested action message support taking the action indicated in the requested action message (i.e., determination block 1854="Yes"), the processor may implement one or more changes in one or more uplink behaviors according to the action in block 1806 as described with reference to method 1800 (FIG. 18A).

In response to determining that the one or more conditions and the reason indicated in the requested action message do not support taking the action indicated in the requested action message (i.e., determination block 1854="Yes"), the processor may determine whether the one or more conditions and the reason indicated in the requested action message support taking an alternative action in determination block 1856. An alternative action may be an action different from the action indicated in the requested action message. An alternative action may be an action selected to achieve a same or similar implied goal associated with the reason indicated in the requested action message, but in a different manner than the action indicated in the requested action message.

In response to determining that the one or more conditions and the reason indicated in the requested action message do not support taking an alternative action (i.e., determination block 1804="No"), the processor may disregard the received action message in block 1808 as described with reference to method 1800 (FIG. 18A).

In response to determining that the one or more conditions and the reason indicated in the requested action message support taking an alternative action (i.e., determination block 1804="Yes"), the processor may implement one or more changes in one or more uplink behaviors according to the alternative action in block 1858. Example changes in the one or more uplink associated behaviors according to the alternative action the live uplink streaming source computing device may implement may include one or more of caching encoded media, transmitting cached encoded media, changing a quality level of encoding used for media, changing a bit rate of transmission of encoded media, changing a connection attribute used for encoded media, changing a transport technology used for encoded media, etc.

Figure 19:
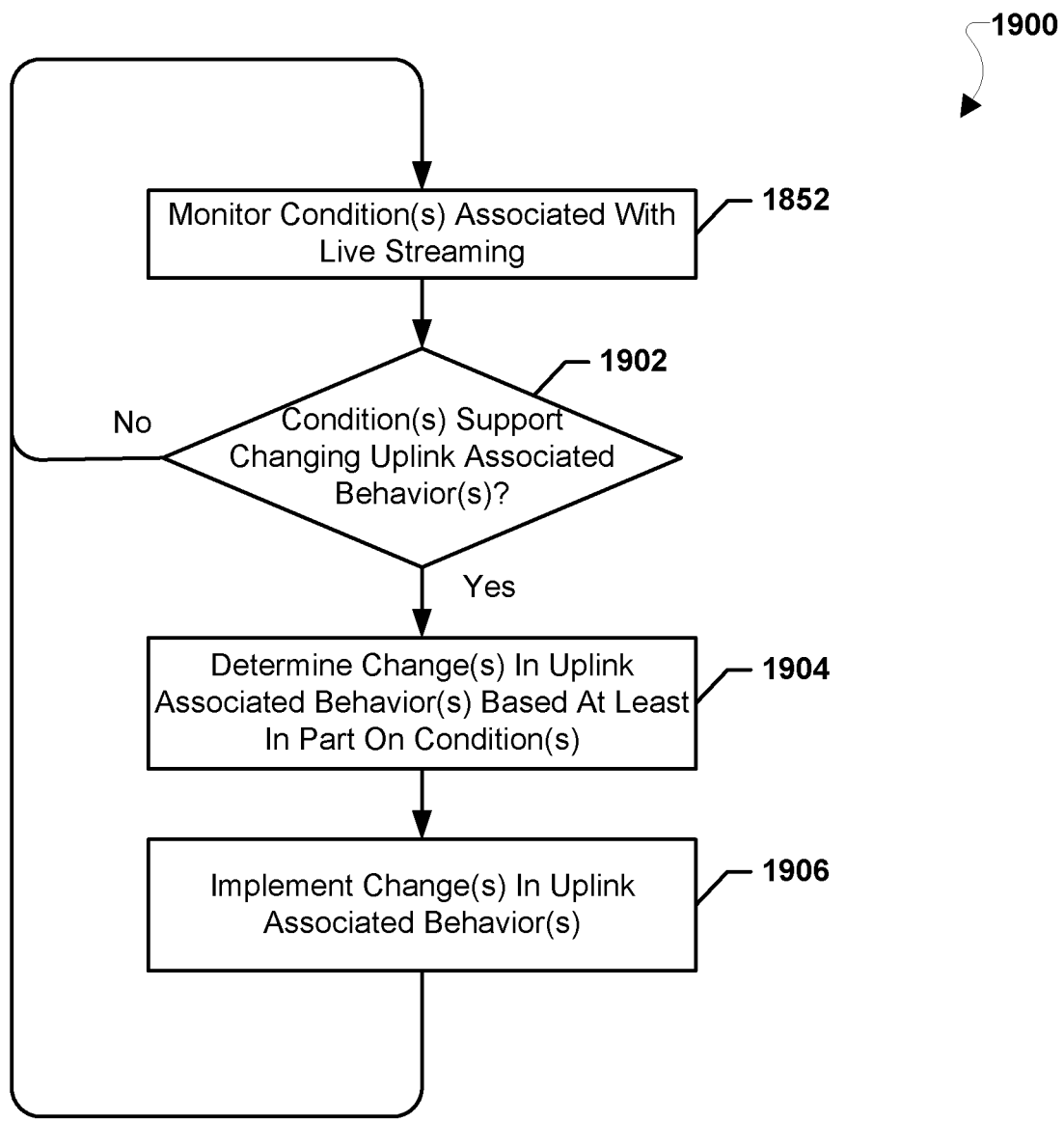
FIG. 19 is a process flow diagram illustrating an embodiment method for live uplink streaming.

FIG. 19 illustrates an embodiment method 1900 for live uplink streaming. With reference to FIGS. 1-19, the operations of the method 1900 may be performed by a processor of a live uplink streaming source computing device, such as live uplink streaming source computing device 102. In various embodiments, the operations of the method 1900 may be performed in conjunction with any of the methods 400 (FIG. 4), 500 (FIG. 5), 600 (FIG. 6), 700 (FIG. 7), 800 (FIG. 8), 900 (FIG. 9), 1000 (FIG. 10), 1100 (FIG. 11), 1200 (FIG. 12), 1300 (FIG. 13A), 1350 (FIG. 13B), 1400 (FIG. 14), 1500 (FIG. 15), 1600 (FIG. 16), 1700 (FIG. 17), 1800 (FIG. 18A), and 1850 (FIG. 18B).

As described with reference to method 1850 (FIG. 18B), the processor may monitor one or more conditions associated with live streaming in block 1852.

In determination block 1902, the processor may determine whether one or more conditions support changing one or more uplink associated behaviors. In various embodiments, various sources and/or functions of the live uplink streaming source computing device and/or in communication with the live uplink streaming source computing device may indicate one or more conditions and the live uplink streaming source computing device may translate those conditions to change or modify its uplink behaviors. As an example, the live uplink streaming sink computing device may compare the one or more conditions to a table in memory correlating conditions with changes in uplink behaviors. and in response to determining a match between two conditions. the live uplink streaming sink computing device may determine that one or more conditions to change or modify its uplink behaviors are occurring.

In response to determining that one or more conditions do not support changing one or more uplink behaviors (i.e., determination block 1902="No"), the processor may continue to monitor conditions in block 1852 as described in the method 1850 with reference to FIG. 18B.

In response to determining that one or more conditions support changing one or more uplink behaviors (i.e., determination block 1902="Yes"), the processor may determine one or more changes in uplink associated behaviors based at least in part on the one or more conditions in block 1904. As a specific example, a table in memory of the live uplink streaming source computing device may correlate conditions with changes in uplink behaviors and in response to determining a match between two conditions the live uplink streaming sink computing device may determine those changes correlated with the matching conditions are the changes to be implemented in uplink associated behaviors.

In block 1906, the processor may implement the one or more changes in the one or more uplink associated behaviors. For example, based on conditions as monitored or determined by the live uplink source computing device, the live uplink streaming source computing device may modify or change its uplink behavior by implementing changes in one or more behaviors, such as a caching behavior (e.g., start caching, stop caching, cache selected one or more versions or types of media, etc.), changes in an encoding behavior (e.g., use a higher encoding quality, use a lower encoding quality, encode additional versions of a media at additional quality levels, encode less versions of media, etc.), changes in a transmission behavior (e.g., transmit with a higher transmission bit rate, transmit with a lower transmission bit rate, use a non-GBR bearer, use a GBR bearer, etc.), a change in a connection behavior (e.g., use a lower priority connection, use a higher priority connection, us a less costly connection, use a more costly connection, use a higher quality connection, use a lower quality connection, etc.), and a change in a transport behavior (e.g., switch to Wi-Fi, switch to 3G, switch to 4G, switch to 5G, etc.), etc. As a specific example, the live uplink streaming source computing device processor may receive an indication from the live uplink streaming sink computing device that there is an absence of viewers, and from monitoring connection data from radio access network determine that there is an excess availability of non-GBR bandwidth. Based on the conditions of no viewers and excess non-GBR bandwidth, the processor may modify behavior of the live uplink streaming source computing device to perform uploading using a non-GBR bearer until viewers arrive, and then change to encoding a higher quality version of the media and transmitting the data on a GBR bearer when viewers are indicated.

Various embodiments may include a method for uplink delivery in a live uplink streaming service, which may be performed by a live uplink streaming source computing device. The live uplink streaming source computing device may be any type of computing device, such as a user equipment (UE) type computing device (e.g., a smart phone, a multimedia Internet enabled cellular telephone, etc.). The method may include caching encoded media content for a live uplink media stream, determining whether a viewership indication for the live uplink media stream is sufficient for distribution, and transmitting the cached encoded media content to a live uplink streaming sink computing device in response to determining that the viewership indication the live uplink media stream is sufficient for distribution. In some embodiments, determining whether the viewership indication for the live uplink media stream is sufficient may include determining whether at least one computing device has requested to receive the live uplink media stream. In some embodiments, the viewership indication may be received in a control message from the live uplink streaming sink computing device. In some embodiments, the method may further include transmitting an initial portion of encoded media content for the live uplink media stream to the live uplink streaming sink computing device prior to the caching of encoded media content for the live uplink media stream.

Various embodiments may include a method for uplink delivery in a live uplink streaming service, which may be performed by a live uplink streaming source computing device. The live uplink streaming source computing device may be any type of computing device, such as a UE type computing device (e.g., a smart phone, a multimedia Internet enabled cellular telephone, etc.). The method may include determining whether a viewership indication for a live uplink media stream is sufficient for distribution, encoding media content for the live uplink media stream at a first quality level in response to determining that the viewership indication for the live uplink media stream is not sufficient for distribution, and encoding media content for the live uplink media stream at a second quality level in response to determining that the viewership indication for the live uplink media stream is sufficient for distribution. In some embodiments, the method may further include transmitting the encoded media content to a live uplink streaming sink computing device. In some embodiments, the first quality level may be higher than the second quality level.

Various embodiments may include a method for uplink delivery in a live uplink streaming service, which may be performed by a live uplink streaming source computing device. The live uplink streaming source computing device may be any type of computing device, such as a UE type computing device (e.g., a smart phone, a multimedia Internet enabled cellular telephone, etc.). The method may include determining whether a viewership indication for the live uplink media stream is sufficient for distribution, transmitting encoded media content for the live uplink media stream at a first bit rate to a live uplink streaming sink computing device in response to determining that the viewership indication for the live uplink media stream is not sufficient for distribution, and transmitting encoded media content for the live uplink media stream at a second bit rate to the live uplink streaming sink computing device in response to determining that the viewership indication for the live uplink media stream is sufficient for distribution. In some embodiments, the first bit rate may be higher than the second bit rate.

Various embodiments may include a method for uplink delivery in a live uplink streaming service, which may be performed by a live uplink streaming source computing device. The live uplink streaming source computing device may be any type of computing device, such as a UE type computing device (e.g., a smart phone, a multimedia Internet enabled cellular telephone, etc.). The method may include encoding media content for a live uplink media stream at a first quality level and a second quality level. In some embodiments, the method may further include transmitting the first quality level encoded media at a first bit rate to a live uplink streaming sink computing device, and transmitting the second quality level encoded media at a second bit rate to the live uplink streaming sink computing device, wherein the first quality level encoded media and the second quality level encoded media are transmitted in parallel to the live uplink streaming sink computing device or sequentially to the live uplink streaming sink computing device. In some embodiments, the first bit rate may be higher than the second bit rate. In some embodiments, the method may further include transmitting the first quality level encoded media to a live uplink streaming sink computing device, and caching the second quality level encoded media content. In some embodiments, the method may further include determining whether a live streaming session associated with the live uplink media stream is complete, and transmitting the cached second quality level encoded media content to the live uplink streaming sink computing device in response to determining that the live streaming session associated with the live uplink media stream is complete. In some embodiments, the first quality level may be lower than the second quality level.

Various embodiments may include a method for live uplink streaming, which may be performed by a live uplink streaming sink computing device. The live uplink streaming sink computing device may be any type of computing device, such as a UE type computing device (e.g., a smart phone, a multimedia Internet enabled cellular telephone, etc.). The method may include determining whether assistance data indicates one or more viewers for a live streaming session, and transmitting a viewership indication to a live uplink streaming sink computing device associated with the live streaming session in response to determining that the assistance data indicates one or more viewers for the live streaming session. In some embodiments, the method may further include receiving encoded media from the live uplink streaming source computing device associated with the live streaming session in response to transmitting the viewership indication to the live uplink streaming sink computing device; processing the encoded media according to one or more determined session attributes for the live streaming session, and distributing the processed media. In some embodiments, the method may further include caching initial processed media for the live streaming session received from the live uplink streaming source computing device prior to any assistance data indicating one or more viewers for the live streaming session, and distributing the cached initial processed media in response to determining that the assistance data indicates one or more viewers for the live streaming session. In some embodiments, the method may further include receiving initial encoded media for the live streaming session from the live uplink streaming source computing device prior to any assistance data indicating one or more viewers for the live streaming session, processing the initial encoded media according to one or more determined session attributes for the live streaming session at a first latency requirement prior to any assistance data indicating one or more viewers for the live streaming session, caching the processed initial media prior to any assistance data indicating one or more viewers for the live streaming session, distributing the cached initial processed media in response to determining that the assistance data indicates one or more viewers for the live streaming session, receiving encoded media from the live uplink streaming source computing device associated with the live streaming session in response to transmitting the viewership indication to the live uplink streaming sink computing device, processing the encoded media according to one or more determined session attributes for the live streaming session at a second latency requirement, and distributing the processed media. In some embodiments, the second latency requirement is a lower latency requirement than the first latency requirement. In some embodiments, the method may further include caching a copy of the distributed processed media, and distributing the cached copy of the distributed processed media to live uplink streaming viewing computing devices after the live streaming session is completed.

Various embodiments may include a method for live uplink streaming, which may be performed by a live uplink streaming sink computing device. The live uplink streaming sink computing device may be any type of computing device, such as a UE type computing device (e.g., a smart phone, a multimedia Internet enabled cellular telephone, etc.). The method may include receiving first quality level encoded media from a live uplink streaming source computing device associated with a live streaming session, processing the first quality level encoded media according to one or more determined session attributes for the live streaming session, receiving second quality level encoded media from a live uplink streaming source computing device associated with a live streaming session, and processing the second quality level encoded media according to one or more determined session attributes for the live streaming session. In some embodiments, the method may further include distributing the processed first quality level media, and caching the processed second quality level media. In some embodiments, the second quality level encoded media is received after the live streaming session is complete or the second quality level encoded media is received in parallel with the first quality level media during the live streaming session. In some embodiments, the first quality level encoded media is of a lower quality level than the second quality level encoded media. In some embodiments, the processing of the first quality level encoded media is performed according to a lower latency requirement than the processing of the second quality level encoded media. In some embodiments, distributing processed media may include receiving assistance data, selecting one or more delivery methods for the processed media based at least in part on the assistance data, and transmitting the processed media using the selected delivery methods. In some embodiments, the selected delivery methods are one unicast delivery method or one broadcast delivery method. In some embodiments, the selected delivery methods include at least one unicast delivery method and one broadcast delivery method. In some embodiments, the unicast delivery method is a Packet-switched Streaming Service and the broadcast delivery method is a Multimedia Broadcast Multicast Service. In some embodiments, transmitting the processed media using the selected delivery methods may include transmitting the processed media based at least in part on a latency requirement associated with the processed media.

Various embodiments may include a method for live uplink streaming, which may be performed by a live uplink streaming viewing computing device. The live uplink streaming viewing computing device may be any type of computing device, such as a UE type computing device (e.g., a smart phone, a multimedia Internet enabled cellular telephone, etc.). The method may include transmitting assistance data for a live streaming session, receiving processed media of the live streaming session from a live uplink streaming sink computing device, and displaying the processed media of the live streaming session. In some embodiments, the processed media may be generated according to one or more of the methods of any of the various embodiment methods described herein.

Various embodiments may include a method for live uplink streaming, which may be performed by a live uplink streaming sink computing device. The live uplink streaming sink computing device may be any type of computing device, such as a UE type computing device (e.g., a smart phone, a multimedia Internet enabled cellular telephone, etc.). The method may include monitoring one or more conditions associated with live streaming, determining whether a condition for controlling uplink behavior is occurring, and generating a requested action message in response to determining that the condition for controlling uplink behavior is occurring. In some embodiments, the method may further include transmitting the requested action message to a live uplink streaming source computing device. In some embodiments, monitoring one or more conditions associated with live streaming may include monitoring one or more conditions associated with live streaming based at least in part on assistance data.

Various embodiments may include a method for live uplink streaming, which may be performed by a live uplink streaming source computing device. The live uplink streaming source computing device may be any type of computing device, such as a UE type computing device (e.g., a smart phone, a multimedia Internet enabled cellular telephone, etc.). The method may include receiving a requested action message, determining whether a reason indicated in the requested action message supports taking an action indicated in the requested action message, and implementing one or more changes in one or more uplink associated behaviors according to the action in response to determining that the reason indicated in the action message supports taking the action indicated in the requested action message. In some embodiments, the method may further include monitoring one or more conditions associated with live streaming, wherein determining whether the reason indicated in the requested action message supports taking the action indicated in the action message includes determining whether the one or more conditions and the reason indicated in the requested action message support taking the action indicated in the action message, and implementing the one or more changes in one or more uplink associated behaviors according to the action in response to determining that the reason indicated in the requested action message supports taking the action indicated in the requested action message includes implementing the one or more changes in one or more uplink associated behaviors according to the action in response to determining that the one or more conditions and the reason indicated in the requested action message support taking the action indicated in the requested action message. In some embodiments, the method may further include determining whether the one or more conditions and the reason indicated in the requested action message support taking an alternative action in response to determining that the one or more conditions and the reason indicated in the requested action message do not support taking the action indicated in the requested action message, and implementing one or more changes in one or more uplink associated behaviors according to the alternative action in response to determining that the one or more conditions and the reason indicated in the requested action message support taking the alternative action. In some embodiments, wherein the requested action message indicates one or more requested actions for the live uplink streaming source computing device and one or more associated reasons for the one or more requested actions. In some embodiments, the indications of the one or more requested actions and the one or more associated reasons are action/reason pair codes. In some embodiments, an action of the one or more actions in the requested action message is indicated as either optional or mandatory.

In some embodiments, among the one or more actions in the requested action message, mandatory actions take precedence over optional actions. In some embodiments, the action or the alternative action is one or more of caching encoded media, transmitting cached encoded media, changing a quality level of encoding used for media, changing a bit rate of transmission of encoded media, changing a connection attribute used for encoded media, and/or changing a transport technology used for encoded media.

Various embodiments may include a method for live uplink streaming, which may be performed by a live uplink streaming source computing device. The live uplink streaming source computing device may be any type of computing device, such as a UE type computing device (e.g., a smart phone, a multimedia Internet enabled cellular telephone, etc.). The method may include monitoring one or more conditions associated with live streaming, determining whether the one or more conditions support changing one or more uplink associated behaviors, and determining one or more changes in one or more uplink associated behaviors based at least in part on the one or more conditions in response to determining that the one or more conditions support changing one or more uplink associated behaviors. In some embodiments, the method may further include implementing the one or more changes in the one or more uplink associated behaviors. In some embodiments, the one or more changes in the one or more uplink associated behaviors are one or more of a change in a caching behavior, a change in an encoding behavior, a change in a transmission behavior, a change in a connection behavior, and/or a change in a transport behavior. In some embodiments, the conditions associated with live streaming are one or more of viewership conditions, interactivity conditions, network conditions, processing conditions, connection conditions, and/or distribution conditions, wherein the latency requirement is one or more of an end-to-end latency requirement, a processing latency requirement, an uplink latency requirement, and/or a downlink latency requirement.

Figure 20:
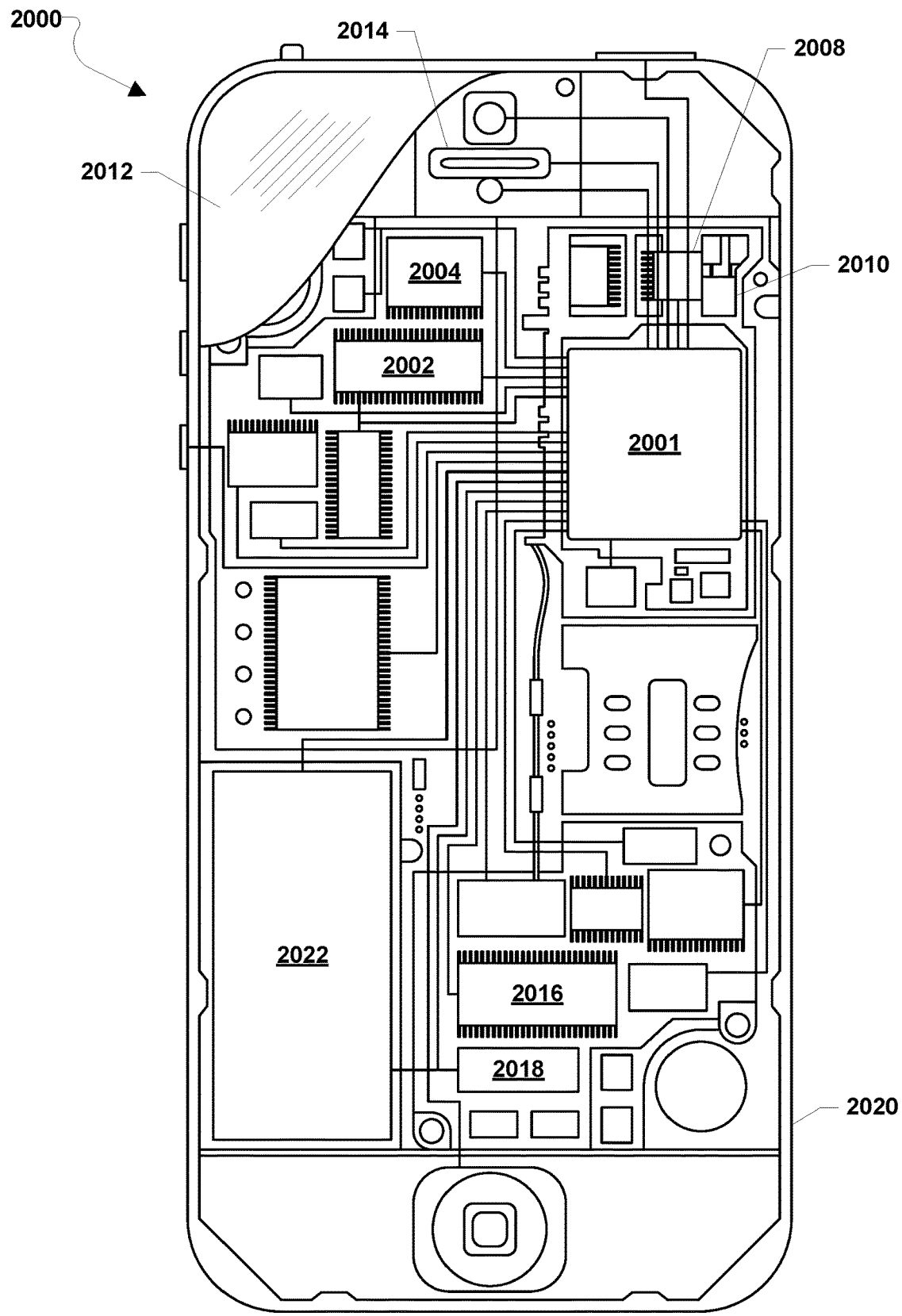
FIG. 20 is a component diagram of an example computing device suitable for use with the various embodiments.

The various embodiments (including, but not limited to, embodiments discussed above with reference to FIGS. 1-19) may be implemented in any of a variety of computing devices (e.g., receiver devices), an example of which is illustrated in FIG. 20. For example, the computing device 2000 may include a processor 2001 coupled to a touch screen controller 2004 and an internal memory 2002. The processor 2001 may be one or more multicore integrated circuits (ICs) designated for general or specific processing tasks. The internal memory 2002 may be volatile or nonvolatile memory, and may also be secure and/or encrypted memory, or unsecure and/or unencrypted memory, or any combination thereof. The touch screen controller 2004 and the processor 2001 may also be coupled to a touch screen panel 2012, such as a resistive-sensing touch screen, capacitive-sensing touch screen, infrared sensing touch screen, etc.

The computing device 2000 may have one or more radio signal transceivers 2008 (e.g., Peanut®, Bluetooth®, ZigBee®, Wi-Fi, cellular, etc.) and antennae 2010, for transmitting and receiving, coupled to each other and/or to the processor 2001. The transceivers 2008 and antennae 2010 may be used with the above-mentioned circuitry to implement the various wireless transmission protocol stacks and interfaces. The computing device 2000 may include a cellular network wireless modem chip 2016 that enables communication via a cellular network and is coupled to the processor.

The computing device 2000 may include a peripheral device connection interface 2018 coupled to the processor 2001. The peripheral device connection interface 2018 may be singularly configured to accept one type of connection, or multiply configured to accept various types of physical and communication connections, common or proprietary, such as USB, FireWire, Thunderbolt, or PCIe. The peripheral device connection interface 2018 may also be coupled to a similarly configured peripheral device connection port (not shown).

The computing device 2000 may also include speakers 2014 for providing audio outputs. The computing device 2000 may also include a housing 2020, constructed of a plastic, metal, or a combination of materials, for containing all or some of the components discussed herein. The computing device 2000 may include a power source 2022 coupled to the processor 2001, such as a disposable or rechargeable battery. The rechargeable battery may also be coupled to the peripheral device connection port to receive a charging current from a source external to the computing device 2000.

Figure 21:
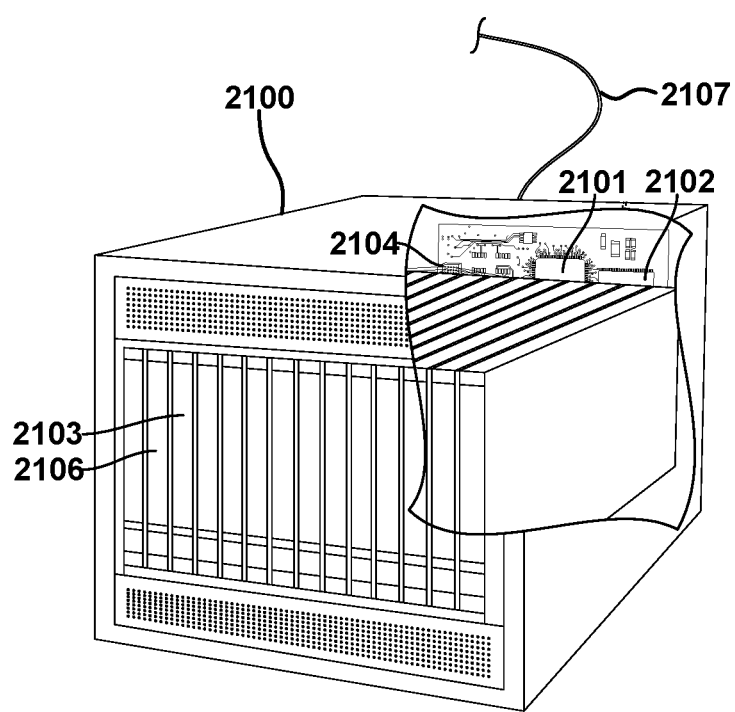
FIG. 21 is a component diagram of an example server suitable for use with the various embodiments.

The various embodiments (including, but not limited to, embodiments discussed above with reference to FIGS. 1-19) may also be implemented on any of a variety of commercially available server devices, such as the server 2100 illustrated in FIG. 21. Such a server 2100 typically includes a processor 2101 coupled to volatile memory 2102 and a large capacity nonvolatile memory, such as a disk drive 2103. The server 2100 may also include a floppy disc drive, compact disc (CD) or digital versatile disc (DVD) drive 2106 coupled to the processor 2101. The server 2100 may also include one or more network transceivers 2104, such as a network access port, coupled to the processor 2101 for establishing network interface connections with a communication network 2107, such as a local area network coupled to other announcement system computers and servers, the Internet, the public switched telephone network, and/or a cellular network (e.g., CDMA, TDMA, GSM, PCS, 3G, 4G, LTE, or any other type of cellular network).

The processors 2001 and 2101 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 2001 and 2101. The processors 2001 and 2101 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 2001 and 2101 including internal memory or removable memory plugged into the device and memory within the processors 2001 and 2101 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects and embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more example embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the various aspects and embodiments. Various modifications to these embodiments will be readily apparent to those skilled in the art, and the generic principles defined herein may be applied to other embodiments without departing from the various aspects and embodiments. Thus, the claims are not intended to be limited to the embodiments shown herein but are to be accorded the widest scope consistent with the following claims and the principles and novel features disclosed herein.

What is claimed is:

1. A method for distributing media in a live uplink streaming service, comprising:
    receiving, by a processor of a live uplink streaming sink computing device, assistance data for a live streaming session;
    processing, by the processor, media of the live streaming session according to a changed latency requirement in response to receiving the assistance data, wherein the changed latency requirement is different than a latency requirement associated with the live streaming session prior to receiving the assistance data;
    selecting, by the processor, one or more delivery methods for the processed media of the live streaming session based at least in part on the assistance data; and
    transmitting, by the processor, the processed media using the selected delivery methods.

2. The method of claim 1, wherein selecting one or more delivery methods for the processed media of the live streaming session based at least in part on the assistance data comprises switching, by the processor, from a first delivery method to a second delivery method for the processed media of the live streaming session based at least in part on the assistance data.

3. The method of claim 2, wherein the first delivery method is a unicast delivery method and the second delivery method is a broadcast delivery method.

4. The method of claim 2, wherein the first delivery method is a broadcast delivery method and the second delivery method is a unicast delivery method.

5. The method of claim 1, wherein the selected delivery methods include a unicast delivery method and a broadcast delivery method.

6. The method of claim 5, wherein the unicast delivery method is a Packet-switched Streaming Service and the broadcast delivery method is a Multimedia Broadcast Multicast Service.

7. The method of claim 5, wherein the assistance data comprises one or more of measured popularity, predicted popularity, location data associated with a live uplink streaming source computing device, location data associated with a live uplink streaming viewing computing device, quality of service requirements, or network condition information.

8. The method of claim 1, further comprising:
determining, by the processor, whether the assistance data indicates one or more viewers for the live streaming session; and
transmitting, by the processor, a viewership indication to a live uplink streaming source computing device associated with the live streaming session in response to determining that the assistance data indicates one or more viewers for the live streaming session.

9. The method of claim 8, further comprising:
receiving, by the processor, encoded media from the live uplink streaming source computing device associated with the live streaming session in response to transmitting the viewership indication to the live uplink streaming sink computing device; and
processing, by the processor, the encoded media according to one or more determined session attributes for the live streaming session.

10. The method of claim 8, further comprising:
caching, by the processor, processed media for the live streaming session generated from encoded media received from the live uplink streaming source computing device prior to receiving assistance data indicating one or more viewers for the live streaming session.

11. The method of claim 8, further comprising:
receiving, by the processor, encoded media for the live streaming session from the live uplink streaming source computing device prior to receiving downlink data indicating one or more viewers for the live streaming session;
processing, by the processor, the encoded media according to one or more determined session attributes for the live streaming session at a first latency requirement prior to any assistance data indicating one or more viewers for the live streaming session; and
receiving, by the processor, additional encoded media from the live uplink streaming source computing device associated with the live streaming session in response to transmitting the viewership indication to the live uplink streaming sink computing device,
wherein processing the media of the live streaming session according to the changed latency requirement in response to receiving the assistance data comprises processing, by the processor, the additional encoded media according to one or more determined session attributes for the live streaming session at a second latency requirement.

12. The method of claim 11, wherein the second latency requirement is a lower latency requirement than the first latency requirement.

13. The method of claim 1, further comprising:
caching, by the processor, a copy of the transmitted processed media; and
distributing, by the processor, the cached copy of the transmitted processed media to live uplink streaming viewing computing devices after the live streaming session is completed.

14. The method of claim 1, further comprising:
receiving, by the processor, an indication of the live uplink media stream to be offered in the live uplink streaming session from a live uplink streaming source computing device prior to receiving the assistance data for the live streaming session.

15. The method of claim 1, wherein the live uplink streaming sink computing device is one of a streaming service computing device or a network operator computing device.

16. A live uplink streaming sink computing device, comprising:
a processor configured with processor-executable instructions to:
receive assistance data for a live streaming session;
process media of the live streaming session according to a changed latency requirement in response to receiving the assistance data, wherein the changed latency requirement is different than a latency requirement associated with the live streaming session prior to receiving the assistance data;
select one or more delivery methods for the processed media of the live streaming session based at least in part on the assistance data; and
transmit the processed media using the selected one or more delivery methods.

17. The device of claim 16, wherein the processor is further configured with processor-executable instructions to select one or more delivery methods for the processed media of the live streaming session based at least in part on the assistance data by switching from a first delivery method to a second delivery method for the processed media of the live streaming session based at least in part on the assistance data.

18. The device of claim 17, wherein from the first delivery method is a unicast delivery method and the second delivery method is a broadcast delivery method.

19. The device of claim 17, wherein from the first delivery method is a broadcast delivery method and the second delivery method is a unicast delivery method.

20. The device of claim 16, wherein the selected delivery methods include a unicast delivery method and a broadcast delivery method.

21. The device of claim 20, wherein the unicast delivery method is a Packet-switched Streaming Service and the broadcast delivery method is a Multimedia Broadcast Multicast Service.

22. The device of claim 20, wherein the assistance data comprises one or more of measured popularity, predicted popularity, location data associated with a live uplink streaming source computing device, location data associated with a live uplink streaming viewing computing device, quality of service requirements, or network condition information.

23. The device of claim 16, wherein the processor is further configured with processor-executable instructions to:
determine whether the assistance data indicates one or more viewers for the live streaming session; and
transmit a viewership indication to a live uplink streaming source computing device associated with the live streaming session in response to determining that the assistance data indicates one or more viewers for the live streaming session.

24. The device of claim 23, wherein the processor is further configured with processor-executable instructions to:
receive encoded media from the live uplink streaming source computing device associated with the live streaming session in response to transmitting the viewership indication to the live uplink streaming sink computing device; and
process the encoded media according to one or more determined session attributes for the live streaming session.

25. The device of claim 23, wherein the processor is further configured with processor-executable instructions to:
cache processed media for the live streaming session received from the live uplink streaming source computing device prior to receiving assistance data indicating one or more viewers for the live streaming session.

26. The device of claim 23, wherein the processor is further configured with processor-executable instructions to:
receive encoded media for the live streaming session from the live uplink streaming source computing device prior to receiving assistance data indicating one or more viewers for the live streaming session;
process the encoded media according to one or more determined session attributes for the live streaming session at a first latency requirement prior to receiving assistance data indicating one or more viewers for the live streaming session;
receive additional encoded media from the live uplink streaming source computing device associated with the live streaming session in response to transmitting the viewership indication to the live uplink streaming sink computing device; and
process the media of the live streaming session according to the changed latency requirement in response to receiving the assistance data by processing the additional encoded media according to one or more determined session attributes for the live streaming session at a second latency requirement.

27. The device of claim 26, wherein the second latency requirement is a lower latency requirement than the first latency requirement.

28. The device of claim 16, wherein the processor is further configured with processor-executable instructions to:
cache a copy of the transmitted processed media; and
distribute the cached copy of the transmitted processed media to live uplink streaming viewing computing devices after the live streaming session is completed.

29. The device of claim 16, wherein the processor is further configured with processor-executable instructions to:
receive an indication of the live uplink media stream to be offered in the live streaming session from a live uplink streaming source computing device prior to receiving the assistance data for the live streaming session.

30. The device of claim 16, wherein the device is one of a streaming service computing device or a network operator computing device.

31. A non-transitory processor readable medium having stored thereon processor-executable instructions configured to cause a processor of a live uplink streaming sink computing device to perform operations comprising:
receiving assistance data for a live streaming session;
processing media of the live streaming session according to a changed latency requirement in response to receiving the assistance data, wherein the changed latency requirement is different than a latency requirement associated with the live streaming session prior to receiving the assistance data;
selecting one or more delivery methods for processed media of the live streaming session based at least in part on the assistance data; and
transmitting the processed media using the selected one or more delivery methods.

32. The non-transitory processor readable medium of claim 31, wherein the stored processor-executable instructions are configured to cause a processor of a live uplink streaming sink computing device to perform operations such that selecting one or more delivery methods for the processed media of the live streaming session based at least in part on the assistance data comprises switching from a first delivery method to a second delivery method for the processed media of the live streaming session based at least in part on the assistance data.

33. The non-transitory processor readable medium of claim 31, wherein the stored processor-executable instructions are configured to cause a processor of a live uplink streaming sink computing device to perform operations further comprising:
determining whether the assistance data indicates one or more viewers for the live streaming session; and
transmitting a viewership indication to a live uplink streaming source computing device associated with the live streaming session in response to determining that the assistance data indicates one or more viewers for the live streaming session.

34. The non-transitory processor readable medium of claim 33, wherein the stored processor-executable instructions are configured to cause a processor of a live uplink streaming sink computing device to perform operations further comprising:
receiving encoded media for the live streaming session from the live uplink streaming source computing device prior to receiving assistance data indicating one or more viewers for the live streaming session;
processing the encoded media according to one or more determined session attributes for the live streaming session at a first latency requirement prior to receiving assistance data indicating one or more viewers for the live streaming session; and
receiving additional encoded media from the live uplink streaming source computing device associated with the live streaming session in response to transmitting the viewership indication to the live uplink streaming sink computing device, and
wherein the stored processor-executable instructions are configured to cause a processor of a live uplink streaming sink computing device to perform operations such that processing the media of the live streaming session according to the changed latency requirement in response to receiving the assistance data comprises processing the additional encoded media according to one or more determined session attributes for the live streaming session at a second latency requirement.

35. A live uplink streaming sink computing device, comprising:
means for receiving assistance data for a live streaming session;
means for processing media of the live streaming session according to a changed latency requirement in response to receiving the assistance data, wherein the changed latency requirement is different than a latency requirement associated with the live streaming session prior to receiving the assistance data;

means for selecting one or more delivery methods for processed media of the live streaming session based at least in part on the assistance data; and means for transmitting the processed media using the selected delivery methods.

36. The device of claim 35, wherein means for selecting one or more delivery methods for the processed media of the live streaming session based at least in part on the assistance data comprises means for switching from a first delivery method to a second delivery method for the processed media of the live streaming session based at least in part on the assistance data.

37. The device of claim 35, further comprising:

means for determining whether the assistance data indicates one or more viewers for the live streaming session; and means for transmitting a viewership indication to a live uplink streaming source computing device associated with the live streaming session in response to determining that the assistance data indicates one or more viewers for the live streaming session.

38. The device of claim 37, further comprising:

means for receiving encoded media for the live streaming session from the live uplink streaming source computing device prior to receiving assistance data indicating one or more viewers for the live streaming session;

means for processing the encoded media according to one or more determined session attributes for the live streaming session at a first latency requirement prior to receiving assistance data indicating one or more viewers for the live streaming session; and means for receiving additional encoded media from the live uplink streaming source computing device associated with the live streaming session in response to transmitting the viewership indication to the live uplink streaming sink computing device, wherein means for processing media of the live streaming session according to a changed latency requirement in response to receiving the assistance data comprises means for processing the additional encoded media according to one or more determined session attributes for the live streaming session at a second latency requirement.

* * * * *